(12) United States Patent
Kondo

(10) Patent No.: US 9,826,194 B2
(45) Date of Patent: *Nov. 21, 2017

(54) IMAGE PROCESSING APPARATUS WITH A LOOK-UP TABLE AND A MAPPING UNIT, IMAGE PROCESSING METHOD USING A LOOK-UP TABLE AND A MAPPING UNIT, AND STORAGE MEDIUM IN WHICH PROGRAM USING A LOOK-UP TABLE AND A MAPPING UNIT IS STORED

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 83 days.

This patent is subject to a terminal disclaimer.

(21) Appl. No.: 14/719,737

(22) Filed: May 22, 2015

(65) Prior Publication Data

US 2016/0021335 A1    Jan. 21, 2016

Related U.S. Application Data

(63) Continuation of application No. 14/116,771, filed as application No. PCT/JP2012/061737 on May 8, 2012, now Pat. No. 9,071,719.

(30) Foreign Application Priority Data

May 11, 2011    (JP) .................................. 2011-106300
May 11, 2011    (JP) .................................. 2011-106302

(Continued)

(51) Int. Cl.
*H04N 5/14*    (2006.01)
*H04N 7/01*    (2006.01)
(Continued)

(52) U.S. Cl.
CPC ............. *H04N 7/0135* (2013.01); *G06T 3/40* (2013.01); *H04N 13/0018* (2013.01); *H04N 13/0033* (2013.01)

(58) Field of Classification Search
CPC ............. H04N 7/0135; H04N 13/0018; H04N 13/0033; G06T 3/40
(Continued)

(56) References Cited

U.S. PATENT DOCUMENTS 6,215,496 B1    4/2001    Szeliski et al.
8,223,410 B2    7/2012    Wakazono et al.
(Continued)

FOREIGN PATENT DOCUMENTS

CN    1533551 A    9/2004
CN    1813267 A    8/2006
(Continued)

OTHER PUBLICATIONS

International Search Report, dated Aug. 14, 2012, which issued during the prosecution of International Patent Application No. PCT/JP2012/061737.

(Continued)

*Primary Examiner* — Michael Lee
(74) *Attorney, Agent, or Firm* — Troutman Sanders LLP

(57) ABSTRACT

An image processing apparatus includes a storage unit that stores a look-up table having association information for associating at least one first image with at least one second image that is an image whose load on a brain has been adjusted, an image accepting unit that accepts at least one image, a mapping unit that acquires a whole or part of one or more second images associated with a whole or part of the at least one image accepted by the image accepting unit, using association information from among the one or more pieces of association information, and an image output unit (Continued)

that outputs at least one output image, which is the whole of the at least one second image acquired by the mapping unit or a group of part of the at least one second image acquired by the mapping unit.

16 Claims, 39 Drawing Sheets

(30) Foreign Application Priority Data

Jan. 23, 2012 (JP) .................................. 2012-010717
Jan. 23, 2012 (JP) .................................. 2012-010719

(51) Int. Cl.
*G06T 3/40* (2006.01)
*H04N 13/00* (2006.01)

(58) Field of Classification Search
USPC .................................................. 348/441, 671
See application file for complete search history.

(56) References Cited

U.S. PATENT DOCUMENTS

| | | | |
|---|---|---|---|
| 8,325,397 B2* | 12/2012 | Koyama | G06T 11/001 358/1.16 |
| 9,071,719 B2* | 6/2015 | Kondo | G06T 3/40 |
| 2003/0086166 A1 | 5/2003 | Ramanujan | |
| 2005/0007159 A1 | 1/2005 | Kondo et al. | |
| 2005/0169522 A1* | 8/2005 | Schoner | G09G 5/02 382/167 |
| 2006/0152579 A1 | 7/2006 | Utsugi et al. | |
| 2007/0052733 A1* | 3/2007 | Hirabayashi | G09G 3/002 345/661 |
| 2007/0115286 A1 | 5/2007 | Kondo et al. | |
| 2007/0133024 A1* | 6/2007 | Kang | G06T 11/001 358/1.9 |
| 2007/0209003 A1 | 9/2007 | Obana et al. | |
| 2009/0060362 A1* | 3/2009 | Harmanci | H04N 19/139 382/238 |
| 2009/0222753 A1 | 9/2009 | Yamaguchi et al. | |
| 2011/0032338 A1 | 2/2011 | Raveendran et al. | |
| 2011/0032341 A1 | 2/2011 | Ignatov et al. | |
| 2011/0032373 A1* | 2/2011 | Forutanpour | G11B 27/034 348/222.1 |
| 2011/0109620 A1 | 5/2011 | Hong et al. | |
| 2011/0113361 A1* | 5/2011 | Bhatt | G06F 3/04847 715/781 |
| 2011/0261169 A1 | 10/2011 | Tin | |
| 2011/0304708 A1 | 12/2011 | Ignatov | |
| 2011/0310376 A1 | 12/2011 | Shim et al. | |
| 2012/0082379 A1* | 4/2012 | Yu | G06T 5/008 382/167 |
| 2012/0127155 A1 | 5/2012 | Deshpande | |
| 2012/0182397 A1 | 7/2012 | Heinzle et al. | |
| 2012/0224037 A1 | 9/2012 | Su et al. | |
| 2012/0262542 A1 | 10/2012 | Veera et al. | |
| 2013/0093849 A1 | 4/2013 | He et al. | |
| 2013/0169633 A1 | 7/2013 | Hattori et al. | |

FOREIGN PATENT DOCUMENTS

| | | |
|---|---|---|
| CN | 101031056 A | 9/2007 |
| JP | 2825482 B2 | 11/1998 |
| JP | 1999283025 A | 10/1999 |
| JP | 3072306 B2 | 7/2000 |
| JP | 2003168105 A | 6/2003 |
| JP | 2004199548 A | 7/2004 |
| JP | 2006080746 A | 9/2004 |
| JP | 2005-018537 A | 1/2005 |
| JP | 2005-258282 A | 9/2005 |
| JP | 2007-207253 A | 8/2007 |
| JP | 2008109203 A | 5/2008 |
| JP | 2008234479 A | 10/2008 |
| JP | 2009153005 A | 7/2009 |
| JP | 2009-210309 A | 9/2009 |
| JP | 2010-166506 A | 7/2010 |
| JP | 2011010194 A | 1/2011 |
| TW | I332638 | 11/2010 |
| TW | I333789 B | 11/2010 |
| TW | I334304 B | 12/2010 |
| TW | I334729 B | 12/2010 |
| TW | 201215105 A | 4/2012 |

OTHER PUBLICATIONS

The First Office Action dated Feb. 1, 2016, issued in corresponding Chinese Application No. CN201280022555.5.
Decision of Rejection dated Feb. 5, 2016, issued in corresponding Japanese Patent Application No. JPA2012-010717.
Decision of Rejection dated Feb. 5, 2016, issued in corresponding Japanese Patent Application No. JPA2012-010719.
Taiwanese Office Action dated Nov. 9, 2015 issued in corresponding Taiwanese Patent Application No. TW101130008.
Japanese Office Action dated Nov. 13, 2015 issued in corresponding Japanese Patent Application No. 2012-010717.
Japanese Office Action dated Nov. 13, 2015 issued in corresponding Japanese Patent Application No. 2012-010719.
First Office Action dated Oct. 21, 2016 issued in Taiwanese Application No. 105110393 with English translation.
Official Action for Japanese Patent Application No. 2016-092987 dated May 25, 2017 and English translation.
Official Action for Japanese Patent Application No. 2016-092986 dated May 25, 2017 and English translation.
Notification of Reasons for Refusal dated Aug. 22, 2017 during the prosecution of Japanese Patent Application No. 2016-092986.
Notification of Reasons for Refusal dated Aug. 22, 2017 during the prosecution of Japanese Patent Application No. 2016-092987.
Notification of Reasons for Refusal dated Aug. 22, 2017 during the prosecution of Japanese Patent Application No. 2016-092986 (with corrected translation of citation, which has been already cited in the present matter).
Notification of Reasons for Refusal dated Aug. 22, 2017 during the prosecution of Japanese Patent Application No. 2016-092987 (with corrected translation citation, which has been already cited in the present matter).

* cited by examiner

| ID | Condition identifying information (Vicinity spatial activity) | Constraint condition (Proper activity) |
|---|---|---|
| 1 | 30 | 20~50 |
| 2 | 40 | 25~60 |
| ⋮ | ⋮ | ⋮ |

FIG.28

| ID | First feature vector | Second feature vector | LUT | Proportion |
|---|---|---|---|---|
| 1 | $(p_{11}, p_{12}, p_{13}, \cdots)$ | $(q_{11}, q_{12}, q_{13}, \cdots)$ | LUTA | — |
| 2 | $(p_{21}, p_{22}, p_{23}, \cdots)$ | $(q_{21}, q_{22}, q_{23}, \cdots)$ | LUTA | 0.5 |
| | | | LUTB | 0.5 |
| 3 | $(p_{31}, p_{32}, p_{33}, \cdots)$ | $(q_{31}, q_{32}, q_{33}, \cdots)$ | LUTC | — |
| 4 | $(p_{41}, p_{42}, p_{43}, \cdots)$ | $(q_{41}, q_{42}, q_{43}, \cdots)$ | LUTA | 0.5 |
| | | | LUTC | 0.25 |
| | | | LUTD | 0.25 |
| 5 | $(p_{11}, p_{12}, p_{13}, \cdots)$ | $(q_{31}, q_{32}, q_{33}, \cdots)$ | LUTD | — |
| ⋮ | ⋮ | ⋮ | ⋮ | ⋮ |

FIG.33

IMAGE PROCESSING APPARATUS WITH A LOOK-UP TABLE AND A MAPPING UNIT, IMAGE PROCESSING METHOD USING A LOOK-UP TABLE AND A MAPPING UNIT, AND STORAGE MEDIUM IN WHICH PROGRAM USING A LOOK-UP TABLE AND A MAPPING UNIT IS STORED

CROSS REFERENCE TO RELATED APPLICATIONS

This application claims priority to and is a continuation of U.S. application Ser. No. 14/116,771 filed Nov. 10, 2013, which is a U.S. National Phase application under 35 U.S.C. §371 of International Patent Application PCT/JP2012/061737 filed May 8, 2012 and claims priority to Japanese Patent Application Numbers 2011-106300 filed May 11, 2011, 2011-106302 filed May 11, 2011, 2012-010717 filed Jan. 23, 2012 and 2012-010719 filed Jan. 23, 2012. The International Application was published on Nov. 15, 2012, as International Publication No. WO 2012/153726 under PCT Article 21(2). The entire contents of these applications are hereby incorporated by reference.

TECHNICAL FIELD

The present invention relates to an image processing apparatus and the like for processing images.

BACKGROUND ART

Conventionally, there has been an interpolation apparatus for digital image signals, including a part that receives input image data, and extracts pixel data of a predetermined number of pixels around a particular pixel, and a part that generates pixel data of the particular pixel by interpolation using linear combination of a predetermined number of factors and the extracted pixel data of the predetermined number of pixels, wherein the factors are acquired using pixel data for acquiring the factors in advance through the least squares method such that a squared-sum of errors between interpolation values and true values becomes minimum (see Patent Document 1).

Furthermore, there has been a digital video signal converting apparatus that generates, from a first digital video signal, a second digital video signal having a larger number of pixels than the first digital video signal (see Patent Document 2).

CITATION LIST

Patent Document

[Patent Document 1] Japanese Patent No. 2825482 (p. 1, FIG. 1, etc.)
[Patent Document 2] Japanese Patent No. 3072306 (p. 1, FIG. 1, etc.)

SUMMARY OF INVENTION

Technical Problem

However, the conventional techniques cannot output an image whose load on the brain has been adjusted according to each purpose.

Solution to Problem

A first aspect of the present invention is directed to an image processing apparatus, including: a storage unit in which a look-up table having one or at least two pieces of association information for associating the whole or part of one or at least two first images with the whole or part of at least one second image, which is an image whose load on the brain has been adjusted compared with that of the first image and which is an image of the same object as the first image, can be stored; an image accepting unit that accepts one or at least two images; a mapping unit that acquires the whole or part of one or at least two second images associated with the whole or part of the at least one image accepted by the image accepting unit, using association information from among the one or at least two pieces of association information; and an image output unit that outputs at least one output image, which is the whole of the at least one second image acquired by the mapping unit or a group of part of the at least one second image acquired by the mapping unit.

With this configuration, it is possible to output an image whose load on the brain has been adjusted according to each purpose.

Furthermore, a second aspect of the present invention is directed to the image processing apparatus according to the first aspect, wherein the look-up table has at least two pieces of association information, the image processing apparatus further includes an image analysis unit that determines the whole or part of a first image associated with the whole or part of the at least one image accepted by the image accepting unit, and the mapping unit acquires a second image associated with the whole or part of the first image determined by the image analysis unit, using the association information associated with the whole or part of the first image determined by the image analysis unit.

With this configuration, it is possible to output an image whose load on the brain has been adjusted according to each purpose.

Furthermore, a third aspect of the present invention is directed to the image processing apparatus according to the second aspect, wherein the whole or part of the first image is a first spatiotemporal block, which is part of video that is input, the whole or part of the second image is a second spatiotemporal block, which is part of video that is to be output to a screen, the image accepting unit accepts video, which is a group of at least one image, the image processing apparatus further includes a dividing unit that spatially, temporally, or spatially and temporally divides the video accepted by the image accepting unit into at least two portions, thereby acquiring at least two first spatiotemporal blocks, the image analysis unit determines, for each of the at least two first spatiotemporal blocks acquired by the dividing unit, the whole or part of a first image associated with each first spatiotemporal block, the mapping unit acquires, for each of the at least two first spatiotemporal blocks, a second spatiotemporal block associated with the whole or part of the first image determined by the image analysis unit, using the association information associated with the whole or part of the first image determined by the image analysis unit, the image processing apparatus further includes a synthesis unit that arranges each of the at least two second spatiotemporal blocks acquired by the mapping unit at a temporal, spatial, or spatial and temporal position of the first spatiotemporal block associated with each of the at least two second spatiotemporal blocks, thereby generating an output image, and the image output unit outputs the output image generated by the synthesis unit.

With this configuration, it is possible to output an image whose load on the brain has been adjusted according to each purpose.

Furthermore, a fourth aspect of the present invention is directed to the image processing apparatus according to the second or the third aspect, wherein the image analysis unit analyzes the at least one image accepted by the image accepting unit or each of the at least two first spatiotemporal blocks acquired by the dividing unit, acquires at least one feature value thereof, and determines the whole or part of a first image associated with the at least one feature value.

With this configuration, it is possible to output an image whose load on the brain has been adjusted according to each purpose.

Furthermore, a fifth aspect of the present invention is directed to the image processing apparatus according to any one of the first to the fourth aspects, wherein the association information is information having at least one feature value of the whole or part of a first image of one object acquired in one environment, and an operation expression for generating the whole or part of a second image associated with the whole or part of the first image or a parameter group that is to be substituted for the operation expression.

With this configuration, it is possible to output an image whose load on the brain has been adjusted according to each purpose.

Furthermore, a sixth aspect of the present invention is directed to the image processing apparatus according to any one of the first to the fifth aspects, wherein at least two pairs of a type identifier for identifying the type of look-up table and a look-up table associated with the type identifier are stored in the storage unit, and the mapping unit includes: a type identifier acquiring part that acquires a type identifier for identifying the type of look-up table that is to be used; and an output image acquiring part that acquires, as the whole or part of an output image, the whole or part of a second image associated with the whole or part of the image accepted by the image accepting unit, using association information from among the association information contained in the look-up table associated with the type identifier.

With this configuration, it is possible to output an image that has been made more pleasant by adjusting its load on the brain according to each purpose.

Furthermore, a seventh aspect of the present invention is directed to the image processing apparatus according to any one of the first to the sixth aspects, further including: an instruction accepting unit that accepts an instruction from a user; and a look-up table update unit that changes any of the at least two pieces of association information contained in the look-up table, according to the instruction.

With this configuration, it is possible to output an image that has been made more pleasant by adjusting its load on the brain according to each purpose.

Furthermore, an eighth aspect of the present invention is directed to the image processing apparatus according to any one of the first to the seventh aspects, further including a constraint condition storage unit in which a constraint condition, which is a condition that has to be satisfied by at least one of the input image, the association information, and the output image, can be stored, wherein the mapping unit acquires the whole or part of at least one second image associated with the whole or part of the at least one image accepted by the image accepting unit, so as to match the constraint condition, using association information from among the one or at least two pieces of association information.

With this configuration, it is possible to output an image that has been made more pleasant by adjusting its load on the brain according to each purpose.

A ninth aspect of the present invention is directed to a look-up table acquiring apparatus, including: a first image storage unit in which at least one first image can be stored; a second image storage unit in which at least one second image, which is an image whose load on the brain has been adjusted compared with that of the first image, can be stored in association with each of the at least one first image; a storage unit in which a look-up table having one or at least two pieces of association information for associating the whole or part of the at least one first image with the whole or part of the at least one second image can be stored; a look-up table constructing unit that constructs a look-up table having one or at least two pieces of association information from the whole or part of the at least one first image stored in the first image storage unit and the whole or part of the at least one second image stored in the second image storage unit; and a look-up table accumulating unit that accumulates the look-up table constructed by the look-up table constructing unit, in the storage unit.

With this configuration, it is possible to generate information for outputting an image whose load on the brain has been adjusted according to each purpose.

A tenth aspect of the present invention is directed to the look-up table acquiring apparatus according to the ninth aspect, wherein the association information is information containing first image-related information relating to the whole or part of the at least one first image, and second image-related information relating to the whole or part of the at least one second image and associated with the first image-related information; the look-up table acquiring apparatus further includes: a first image-related information acquiring unit that acquires at least one piece of first image-related information relating to the whole or part of the at least one first image stored in the first image storage unit, from the whole or part of the at least one first image; and a second image-related information acquiring unit that acquires at least one piece of second image-related information relating to the whole or part of the at least one second image stored in the second image storage unit, from the whole or part of the at least one second image; the look-up table constructing unit constructs a look-up table having one or at least two pieces of association information, which is information having the first image-related information acquired by the first image-related information acquiring unit and the second image-related information associated with the first image-related information and acquired by the second image-related information acquiring unit, and which is information indicating association between the whole or part of the at least one first image and the whole or part of the at least one second image.

With this configuration, it is possible to generate information for outputting an image whose load on the brain has been adjusted according to each purpose.

Furthermore, an eleventh aspect of the present invention is directed to the look-up table acquiring apparatus according to the ninth aspect, wherein the association information has a feature vector associated with the whole or part of the at least one first image, and a conversion filter for converting the whole or part of the at least one first image into the whole or part of the at least one second image, the look-up table constructing unit acquires a feature vector from the whole or part of the at least one first image, acquires a conversion filter for converting the whole or part of the at least one first image into the whole or part of the at least one second image, and constructs a look-up table having one or at least two pieces of association information having the feature vector and the conversion filter.

With this configuration, it is possible to generate information for outputting an image whose load on the brain has been adjusted according to each purpose.

Furthermore, a twelfth aspect of the present invention is directed to the look-up table acquiring apparatus according to any one of the ninth to the eleventh aspects, wherein the look-up table acquiring apparatus further includes: a second image information candidate group storage unit in which at least one second image information candidate group, which is a group of at least two candidates for second image information, can be stored in association with each of the at least one first image, the second image information being information relating to the same object as each of the at least one first image; a candidate output unit that outputs the at least one second image information candidate group; an instruction accepting unit that accepts an instruction to select at least one candidate for the second image information from among the at least two candidates for the second image information contained in the at least one second image information candidate group output by the candidate output unit; and a second image accumulating unit that acquires at least one second image using at least one candidate for the second image information corresponding to the instruction accepted by the instruction accepting unit, and accumulates the at least one second image in association with the first image associated with the second image information candidate group in the second image storage unit.

With this configuration, it is possible to generate information for outputting an image whose load on the brain has been adjusted for a specific user.

Advantageous Effects of Invention

With the image processing apparatus according to the present invention, it is possible to output an image whose load on the brain has been adjusted compared with that of an input image according to each purpose.

BRIEF DESCRIPTION OF DRAWINGS

FIG. 28 is a view showing an example of constraint information in this embodiment.

FIG. 33 is a view showing an example of an LUT change information management table in this embodiment.

DESCRIPTION OF EMBODIMENT

Figure 1:
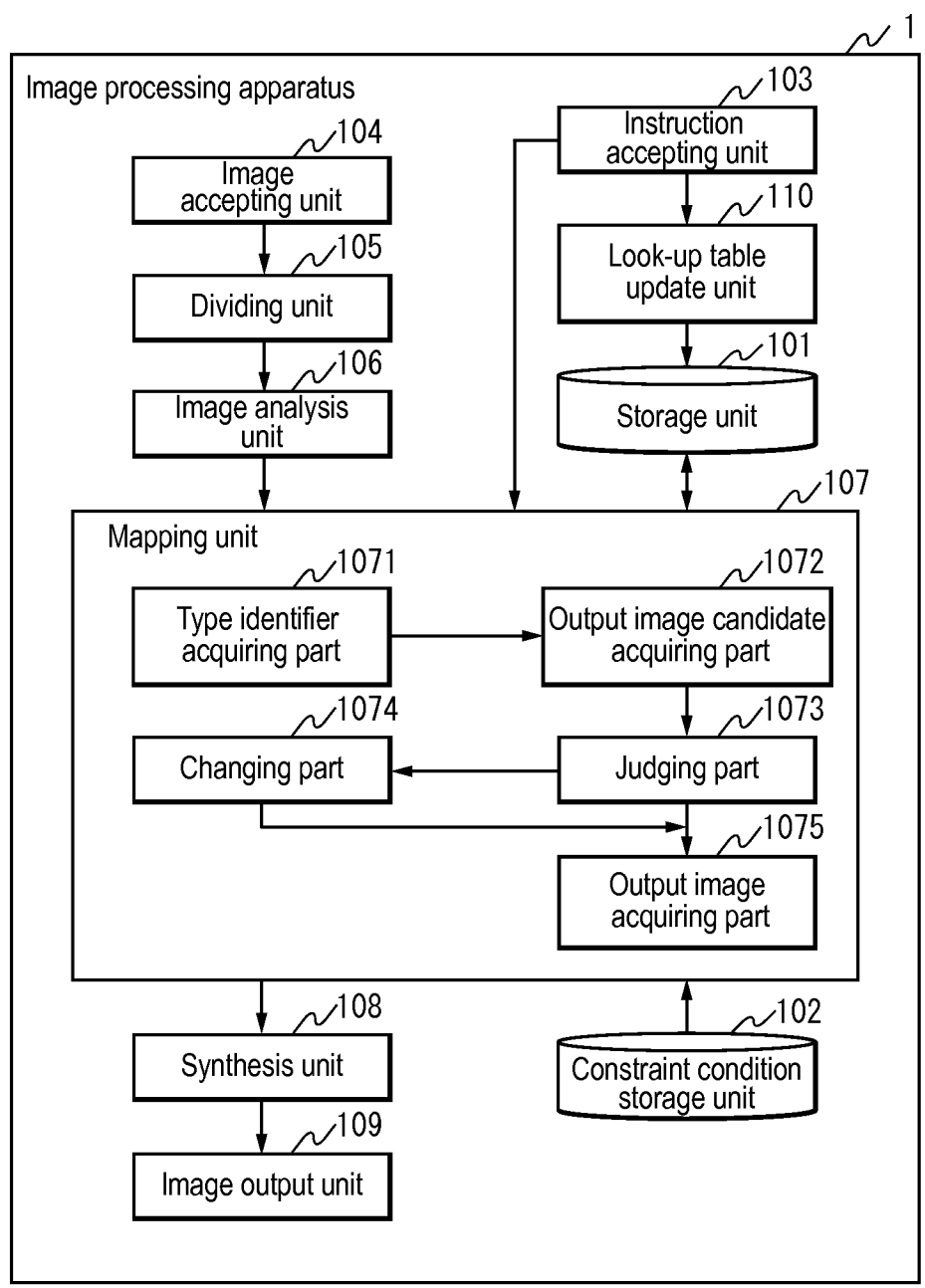
FIG. 1 is a block diagram of an image processing apparatus 1 in Embodiment 1.

Hereinafter, embodiments of an image processing apparatus and the like will be described with reference to the drawings. Note that constituent elements denoted by the same reference numerals perform the same operations in the embodiments, and, thus, a description thereof may not be repeated.

Embodiment 1

In this embodiment, an image processing apparatus 1 will be described that acquires an image whose load on the brain has been adjusted compared with that of an accepted image according to each purpose, using a look-up table (described later). In this example, "an image whose load on the brain has been adjusted according to each purpose" refers to, for example, an image whose load on the brain at the time of watching the image is smaller, an image whose entertaining level at the time of watching the image is higher due to stimuli on the brain, and the like. Here, "an image whose load on the brain at the time of watching the image is smaller" refers to, for example, an image whose object can be more easily recognized. Furthermore, "purpose" typically refers to a purpose of a person who is watching an image, such as to watch the image in a relaxed way, to watch the image for a long time without fatigue to the extent possible, to watch the image while enjoying its entertaining properties, and the like.

Furthermore, in this embodiment, a process that acquires an image whose load on the brain has been adjusted according to each purpose is performed, for example, on each spatiotemporal block. A spatiotemporal block will be described later.

Furthermore, in this embodiment, a look-up table can be customized.

Furthermore, in this embodiment, the image processing apparatus 1 has a function of, if an image that is to be output does not satisfy a predetermined condition, converting the image so as to satisfy the predetermined condition.

FIG. 1 is a block diagram of the image processing apparatus 1 in this embodiment.

The image processing apparatus 1 includes a storage unit 101, a constraint condition storage unit 102, an instruction accepting unit 103, an image accepting unit 104, a dividing unit 105, an image analysis unit 106, a mapping unit 107, a synthesis unit 108, an image output unit 109, and a look-up table update unit 110.

The mapping unit 107 includes, for example, a type identifier acquiring part 1071, an output image candidate acquiring part 1072, a judging part 1073, a changing part 1074, and an output image acquiring part 1075.

In the storage unit 101, one or at least two look-up tables can be stored. In the storage unit 101, two or more pairs of a type identifier for identifying the type of look-up table and a look-up table associated with the type identifier may be stored. Note that the data structure of a look-up table is not limited to a table structure. There is no limitation on the data structure of a look-up table. Furthermore, it will be appreciated that the type of look-up table may be a look-up table itself.

Herein, a look-up table contains one or at least two pieces of association information. The association information is information for associating the whole or part of one or at least two first images with the whole or part of one or at least two second images. If the number of pieces of association information contained in the look-up table is one, the association information is, for example, an operation expression for converting images, or one or more parameter groups that are to be given to an operation expression for converting images. The association information may be, for example, an operation expression for calculating median pixel values of spatiotemporal blocks.

Furthermore, the whole or part of the one or more first images and the whole or part of the one or more second images may be an image of one screen that is to be output, may be an image of blocks in part of one screen, may be one pixel, may be temporally successive multiple screens, may be part (spatiotemporal blocks (described later)) of spaces on temporally successive multiple screens, or may be a group of successive images of one pixel on temporally successive multiple screens. That is to say, there is no limitation on the part of information amount of the first image and the second image. Note that the spatiotemporal block typically refers to a portion acquired by spatially, temporally, or spatially and temporally dividing video. It is sufficient that the spatiotemporal block is a pixel group. That is to say, the spatiotemporal block is not limited to a rectangular successive region. The spatiotemporal block also may be a non-rectangular and non-successive image region. Furthermore, multiple spatiotemporal blocks acquired by dividing an image may partially have overlapping pixels.

The second image is, for example, an image whose load on the brain at the time of watching the image is smaller than that of the first image. Furthermore, the second image is typically an image whose load on the brain at the time of recognizing one object is smaller than that of the first image. An image whose load on the brain is smaller refers to an image that allows the brain to more easily feel one or more attributes such as an appearance, a sense of distance, presence, reality, weightiness, warmth, coolness, speediness, dynamism, smooth motion, freshness, and high-grade sense. Note that the attribute varies from image to image. Here, the appearance refers to the appearance of an object contained in an image, such as a texture appearance, gloss, transparency, fluffiness, and a moist appearance. Furthermore, the sense of distance may refer to resolution, a sense of three dimensions, a sense of depth, a sense of air, or the like.

Note that an image whose load on the brain is smaller can be restated as an image that is pleasant to the brain.

Furthermore, the one or more second images whose load on the brain is smaller than that of the one or more first images are, for example, one or more images that can be acquired in an environment different from that of the one or more first images. In this case, for example, the one or more first images and the one or more second images are acquired in different environments.

The first image refers to, for example, an image of one object acquired in one environment. Furthermore, the second image refers to, for example, an image of the one object acquired in another environment. Furthermore, the first image refers to, for example, an image acquired by capturing an image of one object in one environment. Furthermore, the second image refers to, for example, an image acquired by capturing an image of the one object in another environment. Furthermore, in this case, the second image and the first image typically have the same number of pixels, or may have different numbers of pixels. Note that the image acquired by capturing an image of one object also may be an artificial image similar to that acquired by capturing an image of the one object.

Furthermore, the other environment refers to an environment different from the one environment, and refers to an environment in which an image that provides a better match with the purpose than in the one environment can be captured. Furthermore, the other environment refers to, for example, an environment in which an image whose load on the brain is smaller than that in the one environment can be captured. The other environment refers to, for example, an environment such as (1) to (9) below: (1) an environment in which the light intensity of illumination (light source) is larger than that in the one environment; (2) an environment in which a light source is positioned such that the shadow of an object in the image is expressed more clearly than in the one environment; (3) an environment in which a light source is positioned such that the sense of three dimensions of an object in the image is expressed more clearly than in the one environment; (4) an environment in which a camera is positioned such that the sense of three dimensions of an object in the image is expressed more clearly than in the one environment; (5) an environment in which the color of illumination is different from that in the one environment; (6) an environment in which the weather is different from that in the one environment; (7) an environment in which the temperature or the humidity is different from that in the one environment; (8) an environment in which the depth of field is different from that in the one environment; and (9) an environment in which the shutter speed is different from that in the one environment.

That is to say, the one environment and the other environment are different from each other in the image capturing environment, such as the amount of light, the position of the light source, the color of the light source, the position of the camera, or the settings of the camera. Furthermore, the environment typically refers to an image capturing environment, but there is no limitation to this as long as it is an environment relating to acquisition of an image.

Note that the second image does not refer to an image merely having a larger number of pixels than the first image. The image merely having a larger number of pixels refers to an image based on an image captured with a camera (e.g., an HD camera) simply having a larger number of pixels, whereas the image that is pleasant to the brain in the present invention is an image based on the judgment by the brain or how the brain feels (which may be referred to as how a person feels), that is, these images are clearly different from each other.

Furthermore, the second image whose load on the brain has been adjusted compared with that of the first image also includes, for example, an image whose entertaining level is higher than that of the first image. The image whose entertaining level is higher is an image that is pleasant to the brain of a user who is showing a preference for entertaining properties. The image that is pleasant to the brain may be referred to as an image whose stimuli can be enjoyed by the brain. Furthermore, multiple images (video) whose entertaining level is higher refer to, for example, video into which flash screens have been partially inserted.

Note that, if the second image whose load on the brain has been adjusted is an image whose entertaining level is higher than that of the first image, the second image may be an image whose stimuli can be more enjoyed by the brain but whose load on the brain is larger.

Furthermore, the second image whose load on the brain has been adjusted compared with that of the first image according to each purpose is, for example, an image acquired by deforming the first image, whereas the first image is acquired by capturing an image of one object. The second image acquired by deforming the first image is, for example, a portrait image of a person in the first image. The image acquired by deforming the first image, such as a portrait image, may be referred to as an image whose load on the brain has been adjusted such that the object can be easily recognized by the user and the load on the brain at the time of recognizing the object is smaller.

Furthermore, the second image whose load on the brain has been adjusted compared with that of the first image according to each purpose is, for example, an image acquired by capturing an image of a painting illustrating one object, whereas the first image is acquired by capturing an image of the one object. If the object is illustrated, the concept of the object may be expressed so as to be more easily understood. That is to say, the image whose load on the brain has been adjusted to be smaller may be rather an image acquired by capturing an image of a painting illustrating the object than an image acquired by directly capturing an image of the object.

Furthermore, the second image whose load on the brain has been adjusted compared with that of the first image according to each purpose is, for example, a CG image of the first image, whereas the first image is acquired by capturing an image of one object. The image whose load on the brain has been adjusted to be smaller may be rather a CG image than a captured image, depending on the object.

Furthermore, the association information is, for example, a pair of first image-related information and second image-related information. The first image-related information is information relating to the whole or part of the one or at least two first images. The second image-related information is information relating to the whole or part of the one or at least two second images. The first image-related information is, for example, one or more feature values extracted from the whole or part of the one or more first images. Furthermore, the second image-related information is, for example, the whole or part of the one or more second images. Furthermore, the second image-related information is, for example, an operation expression for generating the whole or part of one or more second images. Furthermore, the second image-related information is, for example, a pair of parameter groups that is to be given to an operation expression for generating the whole or part of one or more second images. In this case, the operation expression is held in the mapping unit 107. Examples of the one or more feature values extracted from an image include a vicinity feature value, which is a feature value of part of one or more images, and a whole feature value, which is a feature value of the whole of one or more images. Examples of the vicinity feature value include a pixel value, an activity, a spatiotemporal correlation, a motion vector, and a frequency distribution. Furthermore, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature value include a pixel value distribution in the whole of an image, a motion vector distribution in the whole of an image, a spatiotemporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). Herein, the content information refers to, for example, the genres, the titles, and the names of people starring in programs listed in an electronic program guide (EPG). Note that the one or more feature values are also referred to as feature vectors as appropriate.

The storage unit 101 is preferably a non-volatile storage medium, but may be realized also by a volatile storage medium. In particular, the storage unit 101 is preferably a non-volatile RAM. Furthermore, there is no limitation on the procedure in which the look-up table is stored in the storage unit 101. For example, the look-up table may be stored in the storage unit 101 via a storage medium, the look-up table transmitted via a communication line or the like may be stored in the storage unit 101, or the look-up table input via an input device may be stored in the storage unit 101.

In the constraint condition storage unit 102, a constraint condition can be stored. The constraint condition is a condition relating to processing in the image processing apparatus 1. The condition relating to processing refers to, for example, a condition relating to the whole or part of an image that is to be processed (input image). Furthermore, the condition relating to processing refers to, for example, a condition relating to the look-up table used in the processing. Furthermore, the condition relating to processing refers to, for example, a condition relating to the output image. The constraint condition may be referred to as a condition that has to be satisfied by one or more of the input image, the association information, and the output image. Furthermore, the condition relating to the whole or part of an image that is to be processed (input image) refers to, for example, a condition in which one or more feature values that are to be processed (e.g., brightness, pixel value, etc.) are taken as parameters. The condition relating to the whole or part of the input image is, for example, a condition that a pixel value is not out of the normal range. Note that the normal range of a pixel value is stored in advance. Furthermore, the condition relating to the look-up table refers to, for example, a condition relating to selection such as the frequency in selecting the association information contained in the look-up table. The condition relating to the look-up table refers to, for example, a condition that the same association information as the association information used immediately before is not used. Furthermore, the condition relating to the look-up table refers to, for example, a condition that the same association information is successively used under a first specific condition, a condition that a specific association information is always used in a second specific condition, a condition that the same association information is not successively used in a third specific condition, a condition that a specific association information is not used in a fourth specific condition, or the like. Furthermore, for example, the condition relating to the output image refers to a condition in which one or more feature values of an output image (e.g., brightness, pixel value, etc.) are taken as parameters. The condition relating to the output image may be referred to as a constraint condition that has to be satisfied by the whole or part of the one or more second images acquired by the mapping unit 107. The condition relating to the output image refers to, for example, a condition that the activity is at the threshold or lower, or the like. Furthermore, the condition relating to the output image refers to, for example, a condition that the pixel maximum value is "pixel value $\leq 255$", a condition that the pixel minimum value is "pixel value $\geq 10$", a condition that a change $\Delta$ of the pixel value is "temporal change in pixel brightness $\leq 100$", a condition that the dynamic range is "$DR \leq 200$", or the like. It will be appreciated that the constraint condition may be embedded in a program for performing image processing.

Furthermore, the constraint condition may include two or more of the condition relating to the whole or part of the input image, the condition relating to the look-up table, and the condition relating to the output image. This constraint condition is, for example, a condition that a difference between the pixel value of the input image and the pixel value of the output image is larger than the threshold. Note that the threshold is stored in advance.

The constraint condition storage unit 102 is preferably a non-volatile storage medium, but may be realized also by a volatile storage medium. There is no limitation on the procedure in which the constraint condition is stored in the constraint condition storage unit 102. For example, the constraint condition may be stored in the constraint condition storage unit 102 via a storage medium, the constraint condition transmitted via a communication line or the like may be stored in the constraint condition storage unit 102, or the constraint condition input via an input device may be stored in the constraint condition storage unit 102.

The instruction accepting unit 103 accepts an instruction. The instruction may be accepted from the user, may be read from an external storage medium, or may be received from an external apparatus. Furthermore, the instruction may be embedded in broadcast transmitted from a broadcasting apparatus. Note that the instruction is an instruction to change the look-up table so as to match the user's preference or the like. The instruction contains, for example, the level of sense of three dimensions of an image. Furthermore, the instruction is, for example, an instruction to select one or more candidates for the second image, from among two or more candidates for the second image contained in one or more second image information candidate groups that have been output. This selection corresponds to an instruction to select an image that matches the user's preference. Furthermore, the instruction may contain, for example, user's attribute such as the age, the age group (30's, 60's, etc.), the sex, whether or not the user is suffering from myopia, presbyopia, or accommodation disorder, or the like. Furthermore, the instruction is, for example, a purpose, a problem, or a preference. Examples of the purpose, the problem, or the preference include "Since I cannot clearly see the image, I want to have a better view of it", "I cannot clearly see the image because it is dark", and "I want to see a more flashy image". That is to say, various contents and types of instructions are possible.

Furthermore, the accepting is a concept that includes accepting of information input from an input device such as a remote controller, a keyboard, a mouse, or a touch panel, receiving of information transmitted via a wired or wireless communication line, and accepting of information read from a storage medium such as an optical disk, a magnetic disk, or a semiconductor memory. As an input part of the instruction, any part may be used such as a remote controller, a numeric keypad, a keyboard, a mouse, a menu screen, and the like. The instruction accepting unit 103 may be realized by a device driver for an input part such as a numeric keypad or a keyboard, or control software for a menu screen, for example.

The image accepting unit 104 accepts an image. Furthermore, the image accepting unit 104 may accept video, which is a group of one or more images. Herein, the image may be one still image, or may be a moving image configured by two or more still images. The image accepting unit 104 may be realized by, for example, a television tuner, a wireless or wired receiving part, or the like. Note that the accepting of the image may be reading of the image from a storage medium, or the like. That is to say, there is no limitation on the part that accepts the image.

The dividing unit 105 spatially, temporally, or spatially and temporally divides the image (which may be either a still image or a moving image) accepted by the image accepting unit 104 into two or more portions, thereby acquiring two or more first spatiotemporal blocks. As described above, multiple spatiotemporal blocks acquired by dividing an image may include overlapping regions. Furthermore, as described above, the multiple spatiotemporal blocks acquired by dividing an image are not limited to rectangular successive regions. The spatiotemporal block also may be a non-rectangular and non-successive image region. Furthermore, for example, the dividing unit 105 may divide one screen (one field or one frame) into four portions, or may divide n screens (n is an integer of 2 or more) into eight portions. Note that there is no limitation on the number of portions obtained by the dividing. Furthermore, the dividing unit 105 may acquire one pixel each time from an image, and pass the acquired pixel to the image analysis unit 106. That is to say, the spatiotemporal block also may be one pixel.

The dividing unit 105 may be realized typically by an MPU, a memory, or the like. Typically, the processing procedure of the dividing unit 105 is realized by software, and the software is stored in a storage medium such as a ROM. Note that the processing procedure may be realized also by hardware (a dedicated circuit).

The image analysis unit 106 determines the whole or part of the first image associated with the whole or part of the one or more images accepted by the image accepting unit 104. For example, the image analysis unit 106 may determine the whole or part of the first image associated with each first spatiotemporal block, for each of the two or more first spatiotemporal blocks acquired by the dividing unit 105. Note that the image analysis unit 106 may determine the whole or part of the two or more first images.

Furthermore, for example, the image analysis unit 106 analyzes the image accepted by the image accepting unit 104 or each of the two or more first spatiotemporal blocks acquired by the dividing unit 105, acquires one or more feature values thereof, and determines the whole or part of the first image associated with the one or more feature values. Herein, the one or more feature values refer to, for example, one or more of the vicinity feature value and the whole feature value described above. Note that the image analysis unit 106 may perform only a process that analyzes the whole or part of the one or more images accepted by the image accepting unit 104, and acquires one or more feature values. Note that the feature value acquired by the image analysis unit 106 preferably includes both of the whole feature value and the vicinity feature value.

Furthermore, the process that determines the whole or part of the first image associated with the one or more feature values is, for example, a process that calculates a distance between the acquired feature vector and the feature vector of the whole or part of the first image contained in each association information, and acquires a parameter group, an operation expression, or the like associated with the feature vector of the whole or part of the first image with the smallest distance.

Furthermore, the process that determines the whole or part of the first image associated with the one or more feature values is, for example, a process that calculates the address of the look-up table from the acquired feature vector. Note that the process that calculates the address of the look-up table is a process that substitutes the feature vector for an operation expression stored in advance, and performs operation processing.

The image analysis unit 106 may be realized typically by an MPU, a memory, or the like. Typically, the processing procedure of the image analysis unit 106 is realized by software, and the software is stored in a storage medium such as a ROM. Note that the processing procedure may be realized also by hardware (a dedicated circuit).

The mapping unit 107 acquires the whole or part of one or more second images associated with the whole or part of the one or more images accepted by the image accepting unit 104, using association information from among the one or at least two pieces of association information in the look-up table. Furthermore, for example, the mapping unit 107 acquires, as the whole or part of an output image, the whole or part of the second image associated with the whole or part of the first image determined by the image analysis unit 106, using the association information (which may be part of the association information (e.g., parameter group)) associated with the whole or part of the first image determined by the image analysis unit 106. The mapping unit 107, for example, acquires a parameter group that is to be given to an operation expression contained in the association information associated with the whole or part of the first image determined by the image analysis unit 106, thereby performing operation processing, and generates the whole or part of a second image associated with the whole or part of the first image determined by the image analysis unit 106. Furthermore, the mapping unit 107, for example, acquires the whole or part of the second image contained in the association information associated with the whole or part of the first image determined by the image analysis unit 106, from the association information.

The mapping unit 107 may perform one of a first operation and a second operation. Herein, the first operation refers to an operation that, using the one or more feature values acquired by the image analysis unit 106, selects one or more pieces of association information that make it possible to output an image whose load on the brain has been adjusted so as to provide a better match with the purpose than the one or more images accepted by the image accepting unit 104. Furthermore, the second operation refers to an operation that selects a look-up table and one or more pieces of association information that make it possible to output an image whose load on the brain has been adjusted so as to provide a better match with the purpose than the one or more images accepted by the image accepting unit 104.

Next, the mapping unit 107 may acquire the whole or part of one or more second images associated with the whole or part of the one or more images accepted by the image accepting unit 104, using the selected one or more pieces of association information.

Furthermore, the mapping unit 107 may perform one of a third operation and a fourth operation. Herein, the third operation refers to an operation that, using the one or more feature values acquired by the image analysis unit 106, selects two or more pieces of association information that make it possible to output an image whose load on the brain has been adjusted so as to provide a better match with the purpose than the one or more images accepted by the image accepting unit 104. Furthermore, the fourth operation refers to an operation that selects a look-up table and two or more pieces of association information that make it possible to output an image whose load on the brain has been adjusted so as to provide a better match with the purpose than the one or more images accepted by the image accepting unit 104.

Next, the mapping unit 107 may acquire the whole or part of one or more second images, using the selected two or more pieces of association information. Note that, in the case of acquiring the whole or part of one or more second images using the two or more pieces of association information, the mapping unit 107 may process the whole or part of the one or more images accepted by the image accepting unit 104 using each of the two or more pieces of association information, and combine the two or more processing results, thereby acquiring the whole or part of one or more second images. Furthermore, in the case of acquiring the whole or part of one or more second images using the two or more pieces of association information, the mapping unit 107 may generate new association information using the two or more pieces of association information, and acquire the whole or part of one or more second images using the new association information. In this example, combining the two or more results refers to, for example, generating an image using both of two or more attributes of the image, generating an image having intermediate properties of two or more attributes, or the like.

The mapping unit 107 may acquire a second spatiotemporal block, using the association information (which may be part of the association information) associated with the whole or part of the first image determined by the image analysis unit 106, for each of the two or more first spatiotemporal blocks. Note that the second spatiotemporal block refers to a second spatiotemporal block associated with the whole or part of the first image determined by the image analysis unit 106.

Furthermore, the mapping unit 107, for example, acquires a parameter group that is to be given to an operation expression contained in the association information associated with the whole or part of the first image determined by the image analysis unit 106, thereby performing operation processing, and acquires a second spatiotemporal block associated with the whole or part of the first image determined by the image analysis unit 106. Furthermore, the mapping unit 107, for example, acquires the whole or part of the second image (second spatiotemporal block) contained in the association information associated with the whole or part of the first image determined by the image analysis unit 106, from the association information.

Furthermore, the mapping unit 107 may perform a modification process, after acquiring the whole or part of the second image. The modification process is a process in which the mapping unit 107 modifies the whole or part of the second image, using the feature value of the whole or part of the image accepted by the image accepting unit 104 and the feature value of the whole or part of the first image contained in the association information. Note that the image acquired by the modification also may be referred to as a second image, or may be referred to as an output image. The modification process is, for example, a process in which the mapping unit 107 acquires a difference between the feature value of the whole or part of the image accepted by the image accepting unit 104 and the feature value of the whole or part of the first image contained in the association information, and modifies the whole or part of the second image using the difference such that the whole or part of the output image provides a better match with the whole or part of the image accepted by the image accepting unit 104.

The mapping unit 107 may be realized typically by an MPU, a memory, or the like. Typically, the processing procedure of the mapping unit 107 is realized by software, and the software is stored in a storage medium such as a ROM. Note that the processing procedure may be realized also by hardware (a dedicated circuit).

Hereinafter, the case will be described in which the mapping unit 107 includes the type identifier acquiring part 1071, the output image candidate acquiring part 1072, the judging part 1073, the changing part 1074, and the output image acquiring part 1075. Note that the mapping unit 107 may not include the type identifier acquiring part 1071, the output image candidate acquiring part 1072, the judging part 1073, the changing part 1074, and the output image acquiring part 1075.

The type identifier acquiring part 1071 forming the mapping unit 107 acquires one or at least two type identifiers for identifying the type of look-up table that is to be used. For example, in the case where a type identifier and one or more feature values of the whole or part of an image are stored in association with each other in the storage unit 101, the type identifier acquiring part 1071 may acquire one or more feature values of the whole or part of the image accepted by the image accepting unit 104, determine one or more feature values that are the closest to the one or more feature values, and acquire a type identifier associated with the one or more feature values from the storage unit 101. Furthermore, the type identifier acquiring part 1071 may take, as the type identifier, the genre of a program (output program) contained in an electronic program guide (EPG) stored in an EPG storage unit (not shown). Furthermore, a type identifier that has been accepted from the user may be stored in a storage medium (not shown), and the type identifier acquiring part 1071 may acquire this type identifier. Furthermore, the type identifier acquiring part 1071 acquires, for example, one or more type identifiers corresponding to the instruction accepted by the instruction accepting unit 103. For example, if the instruction accepting unit 103 accepts a purpose corresponding to "Since I cannot clearly see the image, I want to have a better view of it", the type identifier acquiring part 1071 acquires a type identifier for identifying the type of look-up table for reducing noise. Furthermore, for example, if the instruction accepting unit 103 accepts a purpose corresponding to "Since I cannot clearly see the image, I want to have a better view of it", the type identifier acquiring part 1071 may acquire a type identifier for identifying the type of look-up table for providing a brighter illumination environment. Furthermore, for example, if the instruction accepting unit 103 accepts a purpose corresponding to "Since I cannot clearly see the image, I want to have a better view of it", the type identifier acquiring part 1071 may acquire a type identifier for the look-up table for reducing noise and a type identifier for the look-up table for providing a brighter illumination environment.

Furthermore, for example, if the instruction accepting unit 103 accepts a purpose corresponding to "Since I cannot clearly see the image, I want to have a better view of it", the type identifier acquiring part 1071 detects noise in the image, determines whether or not there is noise that is at the threshold or more, and, if it is judged that there is noise that is at the threshold or more, acquires a type identifier for the look-up table for reducing noise. Furthermore, for example, if the instruction accepting unit 103 accepts a purpose corresponding to "Since I cannot clearly see the image, I want to have a better view of it", the type identifier acquiring part 1071 may acquire a brightness distribution in the image, and, if it is judged that the brightness distribution in the image is too dark not to satisfy a predetermined condition, acquire a type identifier for the look-up table for providing a brighter illumination environment.

The type identifier acquiring part 1071 may be realized typically by an MPU, a memory, or the like. Typically, the processing procedure of the type identifier acquiring part 1071 is realized by software, and the software is stored in a storage medium such as a ROM. Note that the processing procedure may be realized also by hardware (a dedicated circuit).

The output image candidate acquiring part 1072 acquires the whole or part of the second image associated with the whole or part of the first image determined by the image analysis unit 106, using the association information (which may be part of the association information) associated with the whole or part of the first image determined by the image analysis unit 106. The whole or part of the second image acquired in this example is a candidate for the whole or part of the output image. Furthermore, "acquire the whole or part of the second image" refers to, for example, a process that performs operation processing using an operation expression contained in the association information or a parameter group that is to be substituted for an operation expression contained in the association information, and acquires the whole or part of the second image. In this case, the association information has an operation expression for generating the whole or part of the second image associated with the whole or part of the first image or a parameter group that is to be substituted for the operation expression. Furthermore, "acquire the whole or part of the second image" may refer to, for example, a process that acquires the whole or part of the second image contained in the association information associated with the whole or part of the first image determined by the image analysis unit 106.

The output image candidate acquiring part 1072 may be realized typically by an MPU, a memory, or the like. Typically, the processing procedure of the output image candidate acquiring part 1072 is realized by software, and the software is stored in a storage medium such as a ROM. Note that the processing procedure may be realized also by hardware (a dedicated circuit).

The judging part 1073 judges whether or not the constraint condition is satisfied. If the constraint condition is a condition relating to the whole or part of an image that is to be processed, the judging part 1073 acquires one or more feature values of the whole or part of the image accepted by the image accepting unit 104, and judges whether or not the constraint condition is satisfied by the one or more feature values. Furthermore, if the constraint condition is a condition relating to the look-up table, the judging part 1073 acquires information relating to previous use of the look-up table (usage history corresponding to the condition), and judges whether or not the constraint condition is satisfied by the usage history. Note that the usage history refers to, for example, information for specifying a type identifier for the look-up table used in the processing in recent n fields (n is an integer of 1 or more) of the input images or for the association information used in the processing in recent n fields (n is an integer of 1 or more) of the input images. If the constraint condition contains the usage history, it is assumed that the usage history is accumulated by the mapping unit 107 in a storage medium (not shown) and generated. Furthermore, if the constraint condition is a condition relating to the output image, the judging part 1073 judges, for example, whether or not the constraint condition in the constraint condition storage unit 102 is satisfied by the whole or part of the second image acquired by the output image candidate acquiring part 1072. For example, the judging part 1073 acquires an attribute value of the whole or part of the second image contained in the constraint condition (e.g., pixel maximum value, temporal change in pixel brightness), and judges whether or not the constraint condition (e.g., "pixel maximum value ≤255", or "temporal change in pixel brightness ≤100") is satisfied by the attribute value.

The judging part 1073 may be realized typically by an MPU, a memory, or the like. Typically, the processing procedure of the judging part 1073 is realized by software, and the software is stored in a storage medium such as a ROM. Note that the processing procedure may be realized also by hardware (a dedicated circuit).

If the judging part 1073 judges that the constraint condition is not satisfied, the changing part 1074 changes the whole or part of the second image. Furthermore, if the judging part 1073 judges that the constraint condition is not satisfied, the changing part 1074 may change the look-up table.

Furthermore, if the judging part 1073 judges that the constraint condition is not satisfied, the changing part 1074 may change an input image accepted after the judgment, a spatiotemporal block obtained after the judgment, one or more feature values of an input image accepted after the judgment, or one or more feature values of a spatiotemporal block obtained after the judgment so as to satisfy the constraint condition.

Furthermore, if the judging part 1073 judges that the constraint condition is not satisfied, the changing part 1074, for example, changes the whole or part of the second image, which is subjected to the judgment by the judging part 1073, so as to satisfy the constraint condition, thereby acquiring a changed image. Herein, "a process that changes the image so as to satisfy the constraint condition" is, for example, a process that compresses, on the whole, the values of multiple pixels forming the whole or part of the second image such that the maximum value of the multiple pixels matches the constraint condition (e.g., "maximum value ≤255"), for example, such that the maximum value of the multiple pixels is 255. Note that the process that compresses the values of the multiple pixels on the whole may be a process that reduces the values of the multiple pixels in the same proportion, or may be a process that reduces the values of the multiple pixels in different proportions or according to the value levels.

The changing part 1074 may be realized typically by an MPU, a memory, or the like. Typically, the processing procedure of the changing part 1074 is realized by software, and the software is stored in a storage medium such as a ROM. Note that the processing procedure may be realized also by hardware (a dedicated circuit).

The output image acquiring part 1075 acquires, as the whole or part of an output image, the whole or part of the second image associated with the whole or part of the first image determined by the image analysis unit 106, using the association information (which may be part of the association information) associated with the whole or part of the first image determined by the image analysis unit 106, from among the multiple pieces of association information. Herein, the multiple pieces of association information refer to multiple pieces of association information in one look-up table in the storage unit 101, or multiple pieces of association information contained in one or at least two look-up tables associated with one or at least two type identifiers.

Furthermore, the output image acquiring part 1075 preferably acquires, as the whole or part of an output image, the whole or part of the second image judged by the judging part 1073 as satisfying the constraint condition, the changed image acquired by the changing part 1074, or the whole or part of the second image judged by the judging part 1073 as satisfying the constraint condition and the changed image acquired by the changing part 1074.

Furthermore, the output image acquiring part 1075 may acquire, as the whole or part of an output image, the whole or part of the one or more second images associated with the whole or part of the one or more images accepted by the image accepting unit 104, using the one or more pieces of association information associated with the one or more feature values acquired by the image analysis unit 106, from among the association information contained in the one or at least two look-up tables associated with the one or at least two type identifiers. Note that the one or at least two type identifiers are the type identifiers acquired by the type identifier acquiring part 1071.

Note that the output image acquiring part 1075 preferably performs the above-described modification process.

The output image acquiring part 1075 may be realized typically by an MPU, a memory, or the like. Typically, the processing procedure of the synthesis unit 108 is realized by software, and the software is stored in a storage medium such as a ROM. Note that the processing procedure may be realized also by hardware (a dedicated circuit).

The synthesis unit 108 arranges each of the two or more second spatiotemporal blocks acquired by the mapping unit 107, at the temporal, spatial, or spatial and temporal position of the first spatiotemporal block associated with each of the two or more second spatiotemporal blocks, thereby generating an output image.

The synthesis unit 108 may be realized typically by an MPU, a memory, or the like. Typically, the processing procedure of the synthesis unit 108 is realized by software, and the software is stored in a storage medium such as a ROM. Note that the processing procedure may be realized also by hardware (a dedicated circuit).

The image output unit 109 outputs the output image. The image output unit 109 may output the output image generated by the synthesis unit 108. The output described here typically refers to display on a display screen or projection using a projector, but may be a concept that includes transmission to an external apparatus or another program.

The image output unit 109 may be considered, for example, to include or not to include an output device, such as a display screen or a projector. The image output unit 109 may be realized, for example, by driver software for an output device, a combination of driver software for an output device and the output device, or the like.

The look-up table update unit 110 changes any of the two or more pieces of association information contained in the look-up table, according to the instruction accepted by the instruction accepting unit 103. The look-up table update unit 110 may update all pieces of association information contained in the look-up table, or may update only some pieces of association information. If the association information contains an operation expression for generating the whole or part of the second image or a parameter group for generating the whole or part of the second image, the look-up table update unit 110 changes, for example, the parameter group contained in the operation expression or the parameter group for generating the whole or part of the second image, according to the instruction. For example, if the instruction contains the level of sense of three dimensions of an image, the look-up table update unit 110 changes the parameter group contained in the association information, using the level of sense of three dimensions of an image input from the user. There is no limitation on the changing method in this case (formula for change, etc.). For example, the look-up table update unit 110 holds, in storage medium (not shown), a parameter group in association with information of the level of sense of three dimensions of an image, and reads a parameter group associated with the information of the level of sense of three dimensions of an image in the instruction, from the storage medium (not shown). Furthermore, for example, the look-up table update unit 110 holds an operation expression for generating a parameter group in which the level of sense of three dimensions of an image is taken as a parameter, substitutes the level of sense of three dimensions of an image for the operation expression, thereby performing operation processing, and acquires a parameter group.

Furthermore, if the instruction accepting unit 103 accepts an instruction to select one or more candidates for the second image, for example, the look-up table update unit 110 acquires one or more feature values from each of the one or more candidates for the second image, and acquires the one or more feature values as a parameter group. Furthermore, if the instruction accepting unit 103 accepts an instruction to select one or more candidates for the second image, for example, the look-up table update unit 110 acquires one or more feature values from each of the one or more candidates for the second image, substitutes the one or more feature values for an operation expression stored in advance, thereby performing operation processing, and acquires a parameter group.

The look-up table update unit 110 may be realized typically by an MPU, a memory, or the like. Typically, the processing procedure of the synthesis unit 108 is realized by software, and the software is stored in a storage medium such as a ROM. Note that the processing procedure may be realized also by hardware (a dedicated circuit).

Next, the operation of the image processing apparatus 1 will be described with reference to the flowchart in FIG. 2.

(Step S201) It is judged whether or not one or more images have been accepted by the image accepting unit 104. If one or more images have been accepted, the procedure advances to step S202, and, if one or more images have not been accepted, the procedure advances to step S210. An image described here is typically video configured by two or more still images.

(Step S202) The dividing unit 105 spatially, temporally, or spatially and temporally divides the image accepted in step S201, into two or more portions, thereby acquiring two or more first spatiotemporal blocks.

(Step S203) The image analysis unit 106 substitutes 1 for a counter i.

(Step S204) The image analysis unit 106 judges whether or not there is an ith block in the first spatiotemporal blocks acquired in step S202. If there is an ith block, the procedure advances to step S205, and, if there is not an ith block, the procedure advances to step S208.

(Step S205) The image analysis unit 106 performs image analysis on the ith first spatiotemporal block. Then, the image analysis unit 106 determines the whole or part of the first image associated with the ith first spatiotemporal block. This image analysis process will be described with reference to the flowchart in FIG. 3.

(Step S206) The mapping unit 107 acquires, as the whole or part of an output image, the whole or part of the second image associated with the whole or part of the first image determined in step S205, using the association information associated with the whole or part of the first image determined in step S205. Such processing is referred to as a mapping process. The mapping process will be described with reference to the flowchart in FIG. 4. Note that the whole or part of the output image acquired in this step corresponds to second spatiotemporal blocks.

(Step S207) The image analysis unit 106 increments the counter i by 1, and the procedure returns to step S204.

(Step S208) The synthesis unit 108 composes the two or more second spatiotemporal blocks acquired in step S206, thereby generating an output image. More specifically, the synthesis unit 108 arranges each of the two or more second spatiotemporal blocks acquired in step S206 at the temporal, spatial, or spatial and temporal position of the first spatiotemporal block associated with each of the two or more second spatiotemporal blocks, thereby generating an output image.

(Step S209) The image output unit 109 outputs the output image generated in step S208.

(Step S210) It is judged whether or not an instruction from the user has been accepted by the instruction accepting unit 103. If an instruction from the user has been accepted, the procedure advances to step S211, and, if an instruction from the user has not been accepted, the procedure returns to step S201.

(Step S211) The look-up table update unit 110 updates the look-up table according to the instruction accepted in step S210. Such processing is referred to as a look-up table update process. The look-up table update process will be described with reference to the flowchart in FIG. 6.

Figure 2:
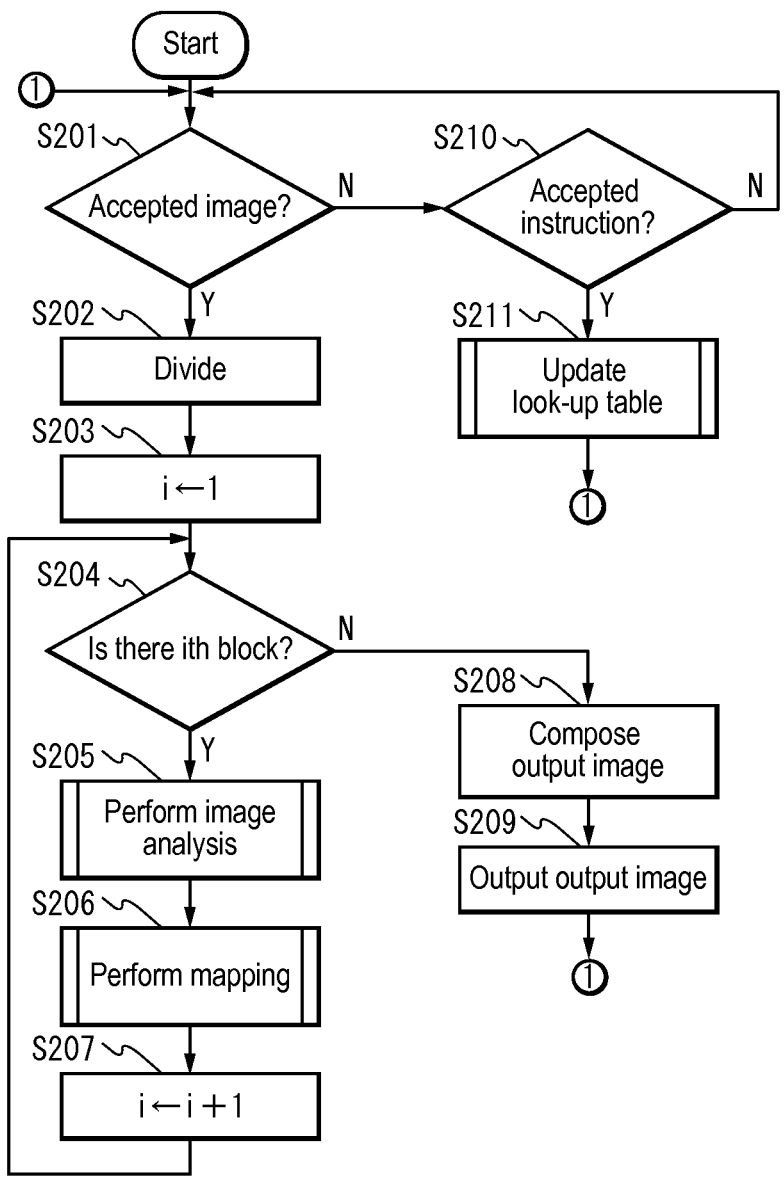
FIG. 2 is a flowchart illustrating the operation of the image processing apparatus 1 in this embodiment.

Here, the process is terminated by powering off or an interruption to abort the process in the flowchart in FIG. 2.

Furthermore, in the flowchart in FIG. 2, an instruction may be accepted in step S210 and the look-up table may be updated while multiple images or image streams are being accepted.

Next, the image analysis process in step S205 will be described with reference to the flowchart in FIG. 3.

(Step S301) The image analysis unit 106 performs image analysis on the ith first spatiotemporal block, and acquires a feature vector (referred to as a first feature vector), which is one or more feature values. Note that the one or more feature values are, for example, one or more of the vicinity feature value and/or the whole feature value described above. Furthermore, for example, the one or more feature values are, for example, the maximum value (MAX) and the minimum value (MIN) of the multiple pixels, the dynamic range (DR=MAX−MIN), the brightness level distribution, a difference in the time direction, or the like. Furthermore, a technique for acquiring the one or more feature values from an image is a known art, and, thus, a detailed description thereof has been omitted. It will be appreciated that the feature values are not limited to those described above.

(Step S302) The image analysis unit 106 substitutes 1 for a counter i.

(Step S303) The image analysis unit 106 judges whether or not there is an ith piece of association information in the look-up table in the storage unit 101. If there is an ith piece of association information, the procedure advances to step S304, and, if there is not an ith piece of association information, the procedure advances to step S307. Note that, if there are two or more look-up tables in the storage unit 101, any one of the look-up tables may be used in this step. Furthermore, after a type identifier acquiring process (described later) is performed, a look-up table associated with the type identifier acquired in this type identifier acquiring process may be used.

(Step S304) The image analysis unit 106 acquires a feature vector (referred to as a second feature vector) contained in the ith piece of association information.

(Step S305) The image analysis unit 106 calculates a distance between the first feature vector acquired in step S301 and the second feature vector acquired in step S304, and temporarily stores this distance in association with i (ith piece of association information) in a buffer.

(Step S306) The image analysis unit 106 increments the counter i by 1, and the procedure returns to step S303.

(Step S307) The image analysis unit 106 acquires association information with the smallest distance accumulated in the buffer. The procedure returns to the upper-level processing. Note that the process that acquires association information is a process that determines the whole or part of the first image.

Figure 3:
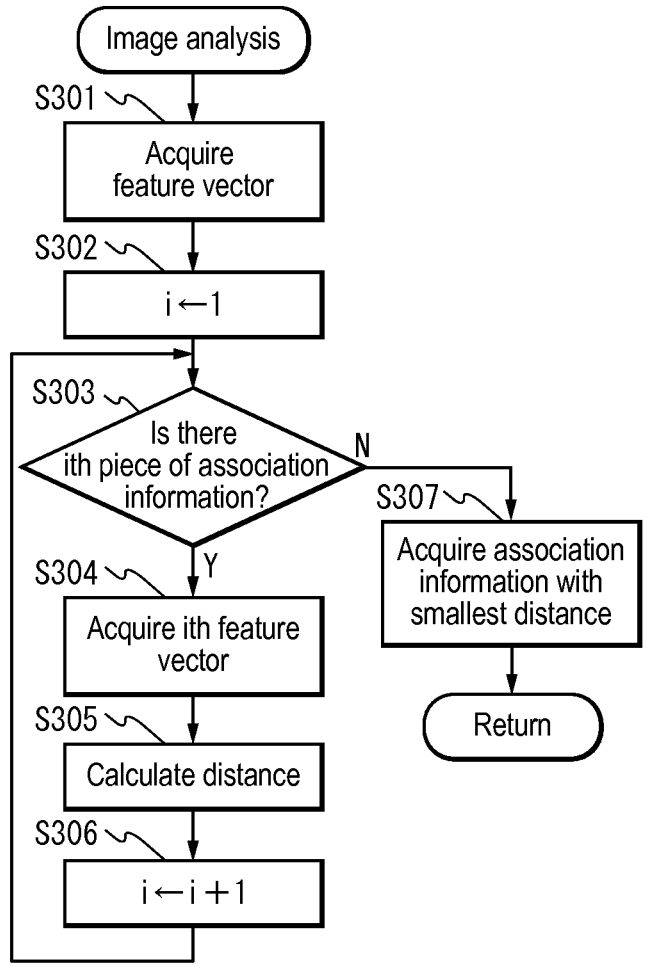
FIG. 3 is a flowchart illustrating an image analysis process in this embodiment.

In the flowchart in FIG. 3, the association information may hold an ID (which also may be an address), and the ID (which also may be an address) may be acquired, for example, by substituting the one or more feature values for an operation expression stored in advance. That is to say, there is no limitation on the method for the image analysis process.

Next, an example of the mapping process in step S206 will be described with reference to the flowchart in FIG. 4.

(Step S401) The type identifier acquiring part 1071 forming the mapping unit 107 acquires a type identifier for identifying the type of look-up table that is to be used. An example of this type identifier acquiring process will be described with reference to the flowchart in FIG. 5.

(Step S402) The output image candidate acquiring part 1072 acquires a parameter group in the association information that is in the look-up table associated with the type identifier acquired in step S401, and that is associated with the whole or part of the first image determined by the image analysis unit 106.

(Step S403) The output image candidate acquiring part 1072 generates the whole or part of a second image associated with the whole or part of the first image determined by the image analysis unit 106, using the parameter group acquired in step S402. More specifically, for example, the output image candidate acquiring part 1072 substitutes the parameter group acquired in step S402 for an operation expression stored in advance, thereby executing the operation expression. Thus, the output image candidate acquiring part 1072 acquires the whole or part of the second image.

(Step S404) The judging part 1073 reads a constraint condition from the constraint condition storage unit 102.

(Step S405) The judging part 1073 judges whether or not the constraint condition read in step S404 is satisfied by the whole or part of the second image acquired in step S403, and substitutes the judgment result for the buffer.

(Step S406) If it is judged in step S405 that "the constraint condition is satisfied (matched)", the procedure advances to step S407, and, if it is judged that "the constraint condition is not satisfied (is not matched)", the procedure advances to step S408.

(Step S407) The output image acquiring part 1075 acquires, as the whole or part of an output image, the whole or part of the second image acquired in step S403. The procedure returns to the upper-level processing.

(Step S408) The changing part 1074 changes the whole or part of the second image acquired in step S403, so as to satisfy the constraint condition, thereby acquiring a changed image.

(Step S409) The output image acquiring part 1075 acquires the changed image acquired in step S408 as the whole or part of an output image. The procedure returns to the upper-level processing.

Figure 4:
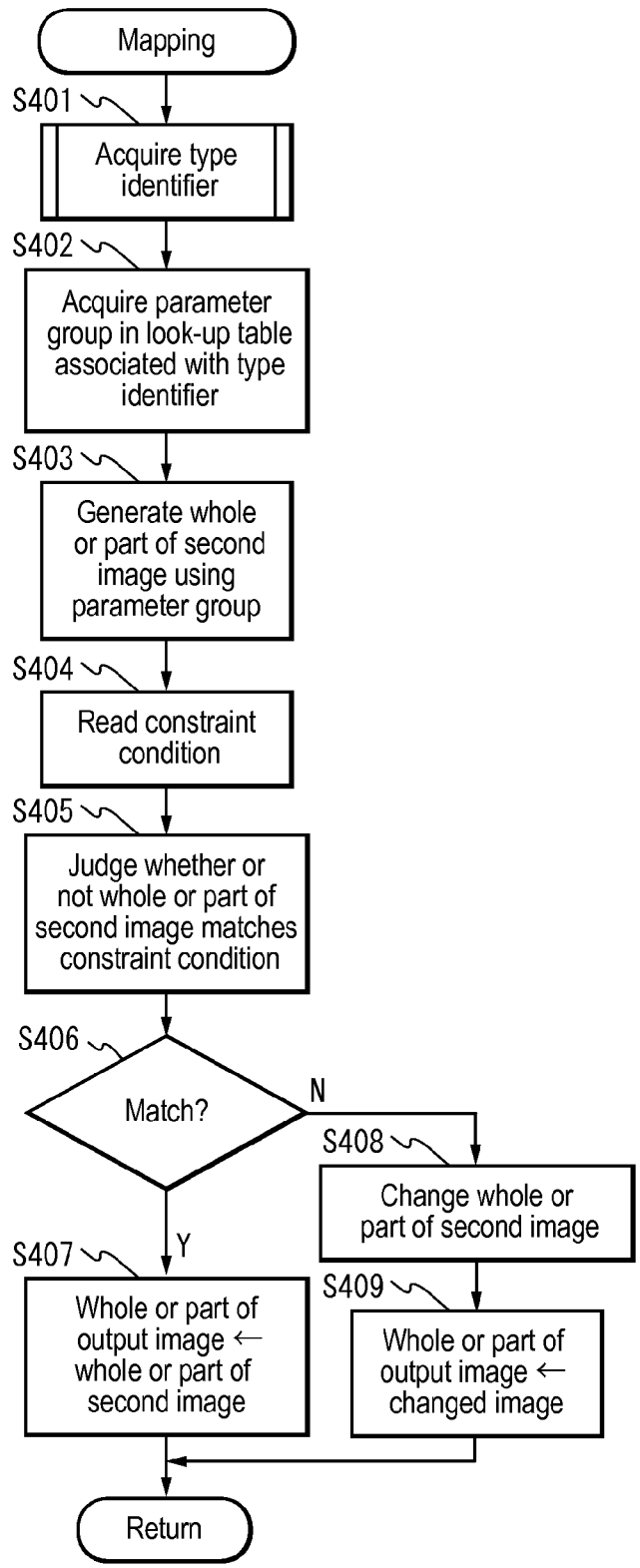
FIG. 4 is a flowchart illustrating a mapping process in this embodiment.

In the flowchart in FIG. 4, the method for generating the whole or part of the second image or the method for acquiring the whole or part of the second image may be other methods.

Furthermore, in the flowchart in FIG. 4, it will be appreciated that, if there is only one look-up table in the storage unit 101, the processing in step S401 is not necessary.

Next, an example of the type identifier acquiring process in step S401 will be described with reference to the flowchart in FIG. 5.

(Step S501) The type identifier acquiring part 1071 acquires a feature vector of the ith block (first image).

(Step S502) The type identifier acquiring part 1071 substitutes 1 for a counter i.

(Step S503) The type identifier acquiring part 1071 judges whether or not there is an ith type identifier in the storage unit 101. If there is an ith type identifier, the procedure advances to step S504, and, if there is not an ith type identifier, the procedure advances to step S507.

(Step S504) The type identifier acquiring part 1071 acquires a feature vector associated with the ith type identifier.

(Step S505) The type identifier acquiring part 1071 calculates a distance between the feature vector acquired in step S501 and the feature vector acquired in step S504, and temporarily stores this distance in association with the ith type identifier in a buffer.

(Step S506) The type identifier acquiring part 1071 increments the counter i by 1, and the procedure returns to step S503.

(Step S507) The type identifier acquiring part 1071 acquires the type identifier associated with the smallest distance calculated in step S505. The procedure returns to the upper-level processing.

Figure 5:
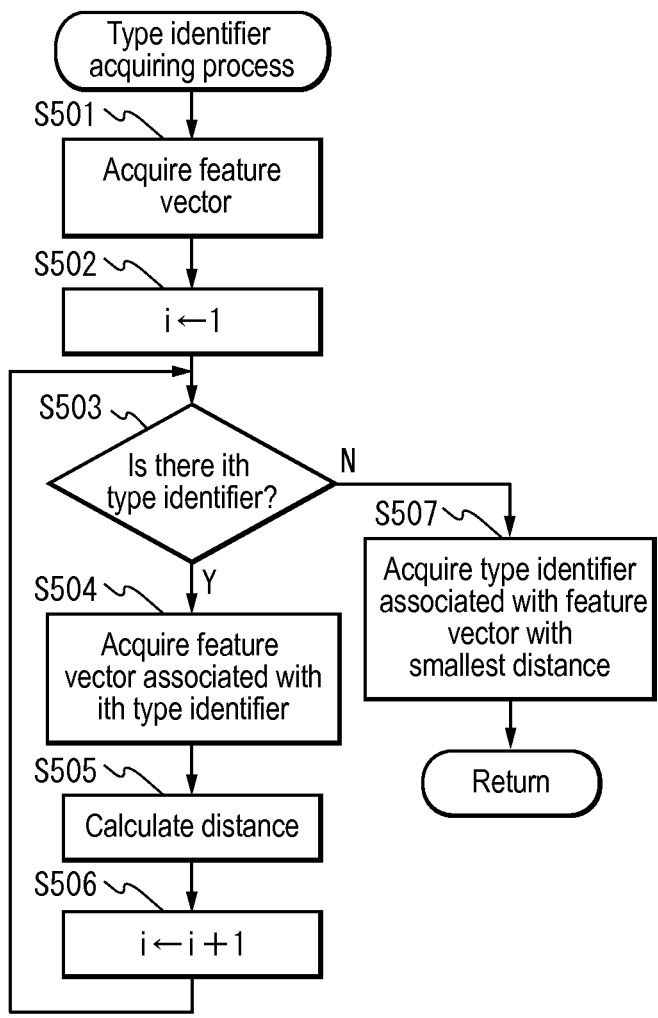
FIG. 5 is a flowchart illustrating a type identifier acquiring process in this embodiment.

In the flowchart in FIG. 5, the type identifier acquiring process may be realized using other methods as described above. That is to say, in the flowchart in FIG. 5, although the type identifier was determined using a feature vector (one or more vicinity feature values) of a block, the type identifier may be determined using the whole feature value or the vicinity feature value as described above, using electronic program guide information or the like, or based on an instruction from the user.

Next, the look-up table update process in step S211 will be described with reference to the flowchart in FIG. 6.

(Step S601) The look-up table update unit 110 acquires the instruction accepted by the instruction accepting unit 103.

(Step S602) The look-up table update unit 110 acquires one or more parameters contained in the instruction acquired in step S601.

(Step S603) The look-up table update unit 110 substitutes 1 for a counter i.

(Step S604) The look-up table update unit 110 judges whether or not there is an ith piece of association information in the look-up table in the storage unit 101. If there is an ith piece of association information, the procedure advances to step S605, and, if there is not an ith piece of association information, the procedure returns to the upper-level processing.

(Step S605) The look-up table update unit 110 changes the parameter group contained in the ith piece of association information or the operation expression contained in the ith piece of association information, using the one or more parameters acquired in step S602.

(Step S606) The look-up table update unit 110 increments the counter i by 1, and the procedure returns to step S604.

Figure 6:
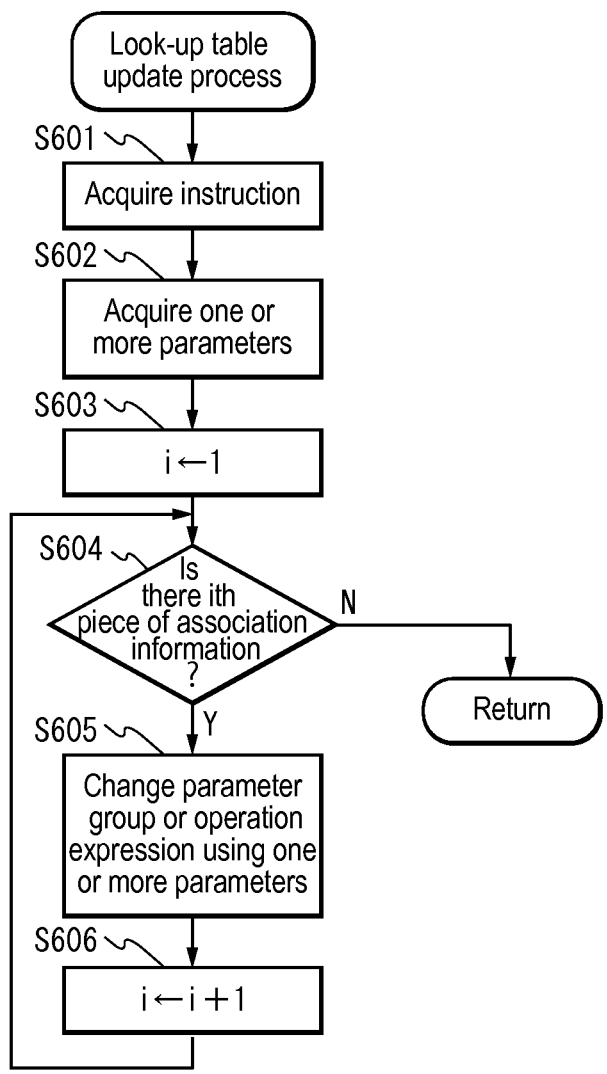
FIG. 6 is a flowchart illustrating a look-up table update process in this embodiment.

In the flowchart in FIG. 6, if there are multiple look-up tables, all look-up tables may be updated.

Next, a specific example of the process that dynamically changes an image or the like using the constraint condition will be described. The constraint condition storage unit 102, and the judging part 1073 and the changing part 1074 of the mapping unit 107 in the image processing apparatus 1 process an image so as to satisfy the constraint condition, and output an image whose load on the brain has been adjusted according to each purpose.

A first specific example shows a process that, if a pixel value of the output image is more than a certain value, modifies the pixel value so as not to be greater than that value. In this case, the constraint condition is that "one or more pixel values of an output image are not more than the threshold". Then, regarding one or more pixels judged by the judging part 1073 as not matching the constraint condition, the changing part 1074 modifies the pixels so as not to be more than the threshold. Thus, the output image acquiring part 1075 acquires an output image, using the whole or part of the second image judged by the judging part 1073 as satisfying the constraint condition, the changed image acquired by the changing part 1074, or the whole or part of the second image judged by the judging part 1073 as satisfying the constraint condition and the changed image acquired by the changing part 1074.

A second specific example shows a process that, if a pixel value of the input image is out of the normal range, performs modification for generating the pixel value of the pixel in the input image using the pixel values of its peripheral pixels. In this case, the constraint condition is that "the pixel value of the input image is not out of the normal range". Then, regarding one or more pixels judged by the judging part 1073 as not matching the constraint condition, the changing part 1074 acquires one or more pixel values of peripheral pixels of the pixels in a predetermined range, and determines the pixel values of the abnormal pixels using the one or more pixel values. Thus, the output image acquiring part 1075 acquires part of one or more second images, using the one or more feature values acquired by the changing part 1074 or one or more feature values of part of the image accepted by the image accepting unit 104.

A third specific example shows a process that, in the case of acquiring an output image using the association information, if a certain piece of association information in the look-up table is used immediately before, uses another piece of association information. In this case, the constraint condition is that "the same association information is not successively used". Then, the judging part 1073 judges whether or not the association information associated with the whole or part of the first image determined by the image analysis unit 106 has been used immediately before. In this case, information for specifying association information that has been used immediately before is at least temporarily stored. Then, if the judging part 1073 judges that the association information associated with the whole or part of the first image determined by the image analysis unit 106 is the same as the association information that has been used immediately before, the changing part 1074 acquires association information that is second closest. That is to say, the changing part 1074 gives again the image analysis unit 106 an instruction to determine the whole or part of the first image, which is different from the whole or part of the first image determined by the image analysis unit 106, and the image analysis unit 106 determines again the whole or part of the first image. This association information associated with the whole or part of the first image is the association information associated with the whole or part of the first image, which is second closest to an input image or a spatiotemporal block that is to be processed, for example. Thus, the output image acquiring part 1075 acquires part of one or more second images, using the association information acquired by the changing part 1074.

A fourth specific example shows an example in which a target that is to be changed is different from a parameter contained in the constraint condition. For example, the fourth specific example shows a case that, if a pixel value of the output image is more than the threshold, performs processing again using specific association information. That is to say, the constraint condition is that "one or more pixel values of an output image are not more than the threshold". Then, regarding one or more pixels judged by the judging part 1073 as not matching the constraint condition, the changing part 1074 reads predetermined association information. Then, the output image acquiring part 1075 forms an output image again, using the association information.

A fifth specific example shows an example in which parameters at multiple points are used for determination. For example, the fifth specific example shows a case in which the constraint condition is that "a difference between the pixel value of the input image and the pixel value of the output image is at the threshold or lower". Then, regarding one or more pixels judged by the judging part 1073 as not matching the constraint condition, the changing part 1074 modifies the pixel values of the pixels of the output image, thereby making a difference between the pixel values of the pixels of the output image and the pixel values of the pixels of the input image at the threshold or lower. Thus, the output image acquiring part 1075 acquires an output image having pixels with such pixel values.

As described above, according to this embodiment, it is possible to provide an image processing apparatus that can output an image whose load on the brain has been adjusted according to each purpose. For example, according to this embodiment, it is possible to provide an image processing apparatus that can output an image whose load on the brain is smaller than that of an input image, an image processing apparatus that can output an image whose entertaining level is higher due to more stimuli on the brain, and the like.

Furthermore, if the image processing apparatus in this embodiment can output an image whose load on the brain is smaller, the image processing apparatus can output an image that can be recognized as being pleasant to the human brain.

More specifically, according to this embodiment, it is possible to output an image captured in a different environment in terms of the amount of light, the position of the light source, the color of the light source, the position of the camera, or the like. Accordingly, it is possible to output an image that can be recognized as being pleasant to the human brain. More specifically, according to this embodiment, it is possible to output an image that allows the brain to more easily feel an appearance, a sense of distance, presence, reality, weightiness, warmth, coolness, speediness, dynamism, smooth motion, freshness, high-grade sense, or the like.

Furthermore, according to this embodiment, it is possible to output an image whose load on the brain has been adjusted according to each purpose, by using an appropriate look-up table from among the multiple look-up tables.

Furthermore, according to this embodiment, it is possible to output an image that has been made more pleasant by adjusting its load on the brain according to each purpose, by changing the output image so as to satisfy the constraint condition.

Furthermore, according to this embodiment, it is possible to output an image that has been made more pleasant by adjusting its load on the brain according to the user's preference or the like, by customizing the look-up table.

Note that the image processing apparatus 1 in this embodiment also may be a television. In this case, the image accepted by the image accepting unit 104 is an image for forming television picture.

Furthermore, with the image processing apparatus 1 in this embodiment, it is possible to realize an apparatus that generates a moving image whose load on the brain has been adjusted in real-time according to each purpose, using an accepted moving image, and outputs the generated image.

Figure 7:
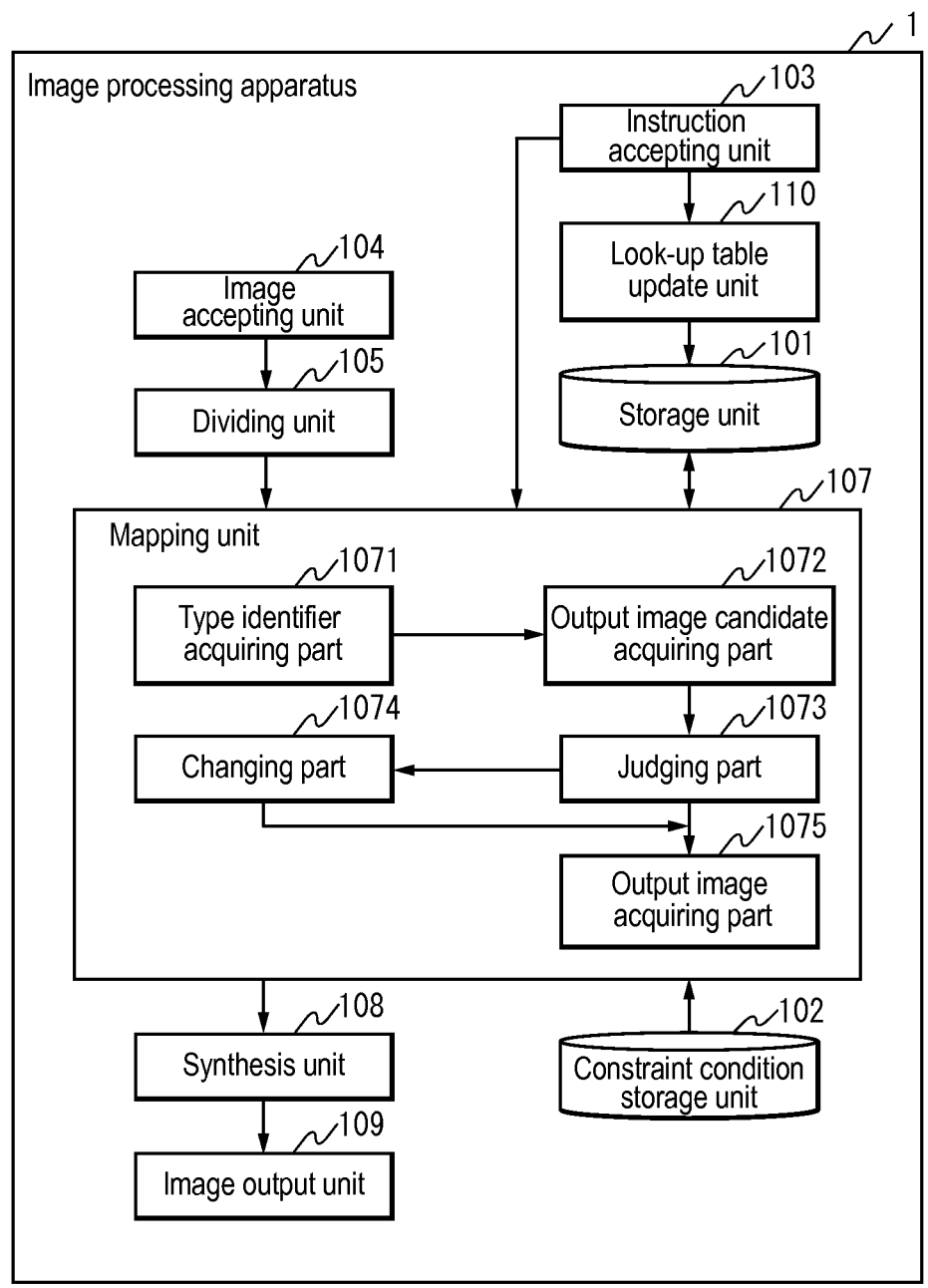
FIG. 7 is a block diagram of another image processing apparatus 1 in this embodiment.

Furthermore, in this embodiment, if the look-up table only has one piece of association information, the image processing apparatus 1 does not have to include the image analysis unit 106. In this case, the image processing apparatus 1 has a configuration as shown in FIG. 7. In this case, the mapping unit 107 acquires the whole or part of one or more second images associated with the whole or part of the one or more images accepted by the image accepting unit 104, using the one piece of association information in the storage unit 101. Also in this case, the image processing apparatus 1 may include the image analysis unit 106, the image analysis unit 106 may acquire one or more feature values from the whole or part of the one or more accepted images, and the mapping unit 107 may perform the modification process using the feature values.

Furthermore, it will be appreciated that the image processing apparatus 1 in this embodiment does not have to include some constituent elements such as the instruction accepting unit 103 and the look-up table update unit 110.

Furthermore, the processing in this embodiment may be realized using software. The software may be distributed by software download or the like. Furthermore, the software may be distributed in a form where the software is stored in a storage medium such as a CD-ROM. Note that the same is applied to other embodiments described in this specification. The software that realizes the image processing apparatus in this embodiment may be the following sort of program. Specifically, this program is a program using a storage medium in which a look-up table having one or at least two pieces of association information for associating the whole or part of at least one first image with the whole or part of at least one second image, which is an image whose load on the brain has been adjusted compared with that of the first image and which is an image of the same object as the first image, is stored, the program for causing a computer to function as: an image accepting unit that accepts at least one image; a mapping unit that acquires the whole or part of at least one second image associated with the whole or part of the at least one image accepted by the image accepting unit, using association information from among the one or at least two pieces of association information; and an image output unit that outputs at least one output image, which is the whole of the at least one second image acquired by the mapping unit or a group of part of the at least one second image acquired by the mapping unit.

Furthermore, in this program, it is preferable that the look-up table has at least two pieces of association information, the computer is caused to further function as an image analysis unit that determines the whole or part of a first image associated with the whole or part of the at least one image accepted by the image accepting unit, and the mapping unit acquires a second image associated with the whole or part of the first image determined by the image analysis unit, using the association information associated with the whole or part of the first image determined by the image analysis unit.

Furthermore, in this program, it is preferable that the whole or part of the first image is a first spatiotemporal block, which is part of video that is input, the whole or part of the second image is a second spatiotemporal block, which is part of video that is to be output to a screen, the image accepting unit accepts video, which is a group of at least one image, the computer is caused to further function as a dividing unit that spatially, temporally, or spatially and temporally divides the video accepted by the image accepting unit into at least two portions, thereby acquiring at least two first spatiotemporal blocks, the image analysis unit determines, for each of the at least two first spatiotemporal blocks acquired by the dividing unit, the whole or part of a first image associated with each first spatiotemporal block, the mapping unit acquires, for each of the at least two first spatiotemporal blocks, a second spatiotemporal block associated with the whole or part of the first image determined by the image analysis unit, using the association information associated with the whole or part of the first image determined by the image analysis unit, and the computer is caused to further function as a synthesis unit that arranges each of the at least two second spatiotemporal blocks acquired by the mapping unit at a temporal, spatial, or spatial and temporal position of the first spatiotemporal block associated with each of the at least two second spatiotemporal blocks, thereby generating an output image.

Furthermore, in this program, it is preferable that the image analysis unit analyzes the at least one image accepted by the image accepting unit or each of the at least two first spatiotemporal blocks acquired by the dividing unit, acquires at least one feature value thereof, and determines the whole or part of a first image associated with the at least one feature value.

Furthermore, in this program, it is preferable that at least two pairs of a type identifier for identifying the type of look-up table and a look-up table associated with the type identifier are stored in the storage medium, and the mapping unit includes: a type identifier acquiring part that acquires at least one type identifier for identifying the type of look-up table that is to be used; and an output image acquiring part that acquires, as the whole or part of an output image, the whole or part of a second image associated with the whole or part of the first image determined by the image analysis unit, using the association information associated with the whole or part of the first image determined by the image analysis unit, from among the association information contained in the at least one look-up table associated with the at least one type identifier.

Furthermore, in this program, it is preferable that the computer is caused to further function as: an instruction accepting unit that accepts an instruction from a user; and a look-up table update unit that changes any of the at least two pieces of association information contained in the look-up table, according to the instruction.

Furthermore, the software that realizes the image processing apparatus in this embodiment may be the following sort of program. Specifically, this program is a program using a storage medium in which a look-up table having one or at least two pieces of association information for associating the whole or part of at least one first image with the whole or part of at least one second image that is different from the first image, and a constraint condition, which is a condition that has to be satisfied by at least one of an input image, the association information, and an output image, are stored, the program for causing a computer to function as: an image accepting unit that accepts at least one image; a mapping unit that acquires the whole or part of at least one second image associated with the whole or part of the at least one image accepted by the image accepting unit, so as to match the constraint condition, using association information from among the one or at least two pieces of association information; and an image output unit that outputs an output image configured by the whole or part of the at least one second image acquired by the mapping unit.

Embodiment 2

This embodiment is different from Embodiment 1 in that an image processing apparatus 2 does not include the dividing unit 105 and the synthesis unit 108.

Figure 8:
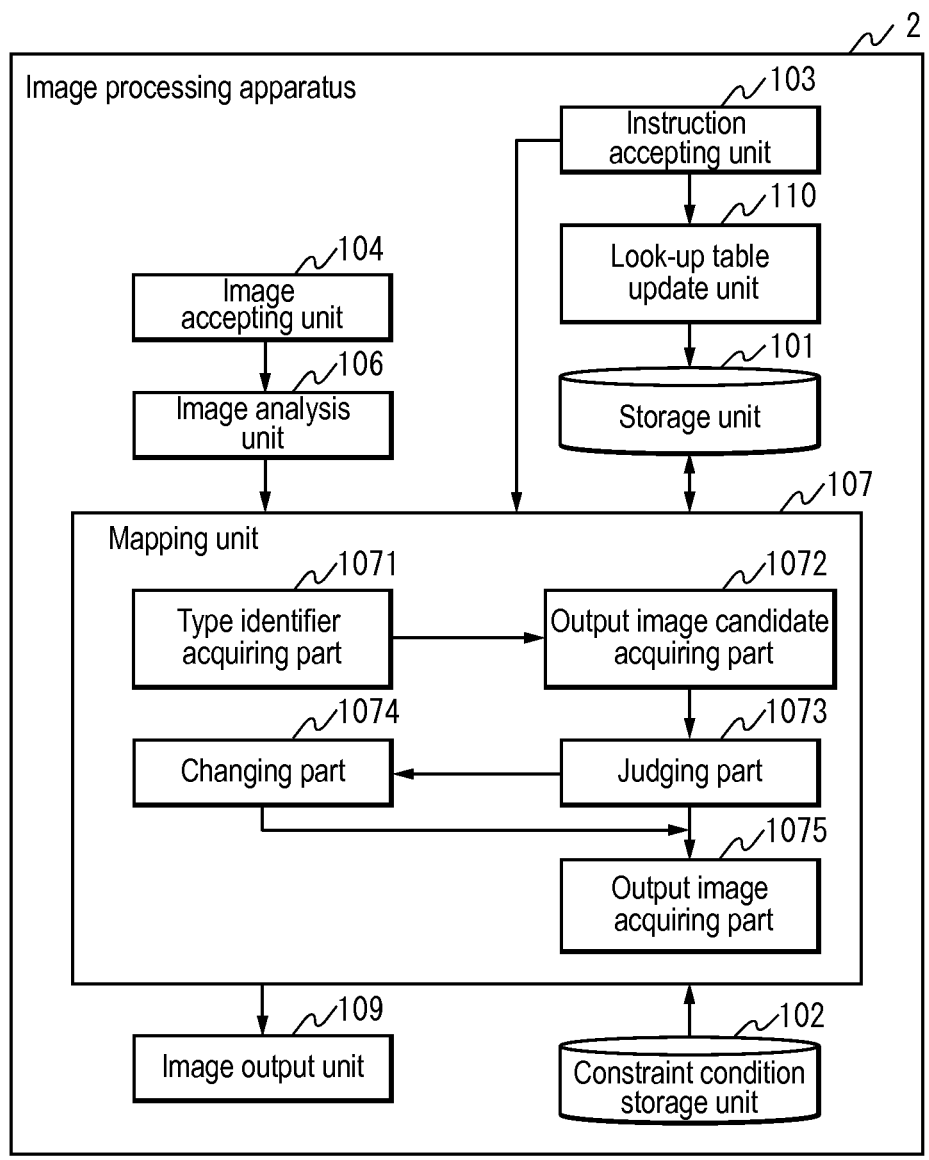
FIG. 8 is a block diagram of an image processing apparatus 2 in Embodiment 2.

FIG. 8 is a block diagram of the image processing apparatus 2 in this embodiment.

The image processing apparatus 2 includes the storage unit 101, the constraint condition storage unit 102, the instruction accepting unit 103, the image accepting unit 104, the image analysis unit 106, the mapping unit 107, the image output unit 109, and the look-up table update unit 110.

Figure 9:
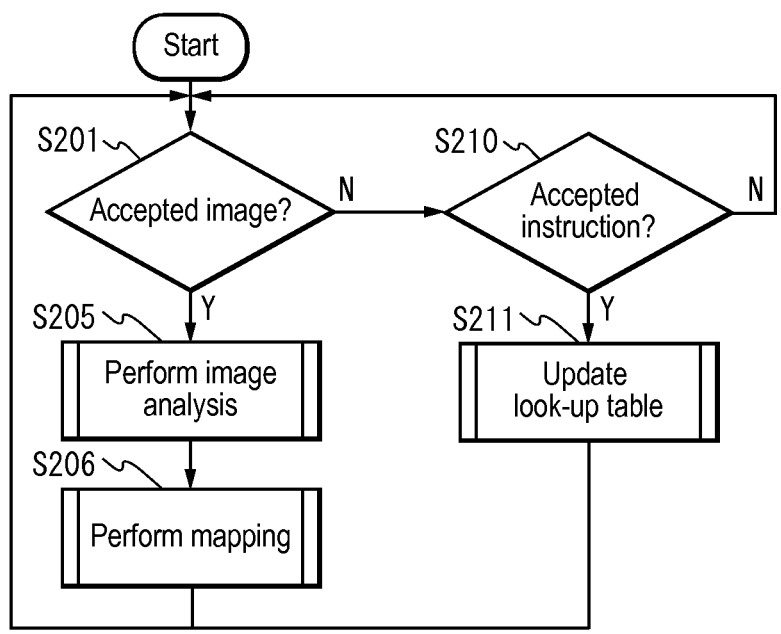
FIG. 9 is a flowchart illustrating the operation of the image processing apparatus 2 in this embodiment.

Next, the operation of the image processing apparatus 2 will be described with reference to the flowchart in FIG. 9. The flowchart in FIG. 9 is part of the flowchart in FIG. 2. Note that the image analysis process in step S205 is performed on the whole image accepted in step S201. Furthermore, the mapping process in step S206 is also performed on the whole image accepted in step S201.

Furthermore, the process is terminated by powering off or an interruption to abort the process in the flowchart in FIG. 9.

Furthermore, in the flowchart in FIG. 9, an instruction may be accepted in step S210 and the look-up table may be updated while multiple images or image streams are being accepted.

As described above, according to this embodiment, it is possible to provide an image processing apparatus that can output an image whose load on the brain has been adjusted according to each purpose. For example, according to this embodiment, it is possible to provide an image processing apparatus that can output an image whose load on the brain is smaller than that of an input image, an image processing apparatus that can output an image whose entertaining level is higher due to more stimuli on the brain, and the like.

Furthermore, if the image processing apparatus in this embodiment can output an image whose load on the brain is smaller, the image processing apparatus can output an image that can be recognized as being pleasant to the human brain.

More specifically, according to this embodiment, it is possible to output an image captured in a better environment in terms of the amount of light, the position of the light source, the color of the light source, the position of the camera, or the like. Accordingly, it is possible to output an image that can be recognized as being pleasant to the human brain. More specifically, according to this embodiment, it is possible to output an image that allows the brain to more easily feel an appearance, a sense of distance, presence, reality, weightiness, warmth, coolness, speediness, dynamism, smooth motion, freshness, high-grade sense, or the like.

In this example, a television on which the image processing apparatus 2 in this embodiment is installed can be configured. In this case, the image accepted by the image accepting unit 104 is an image for forming television picture.

Figure 10:
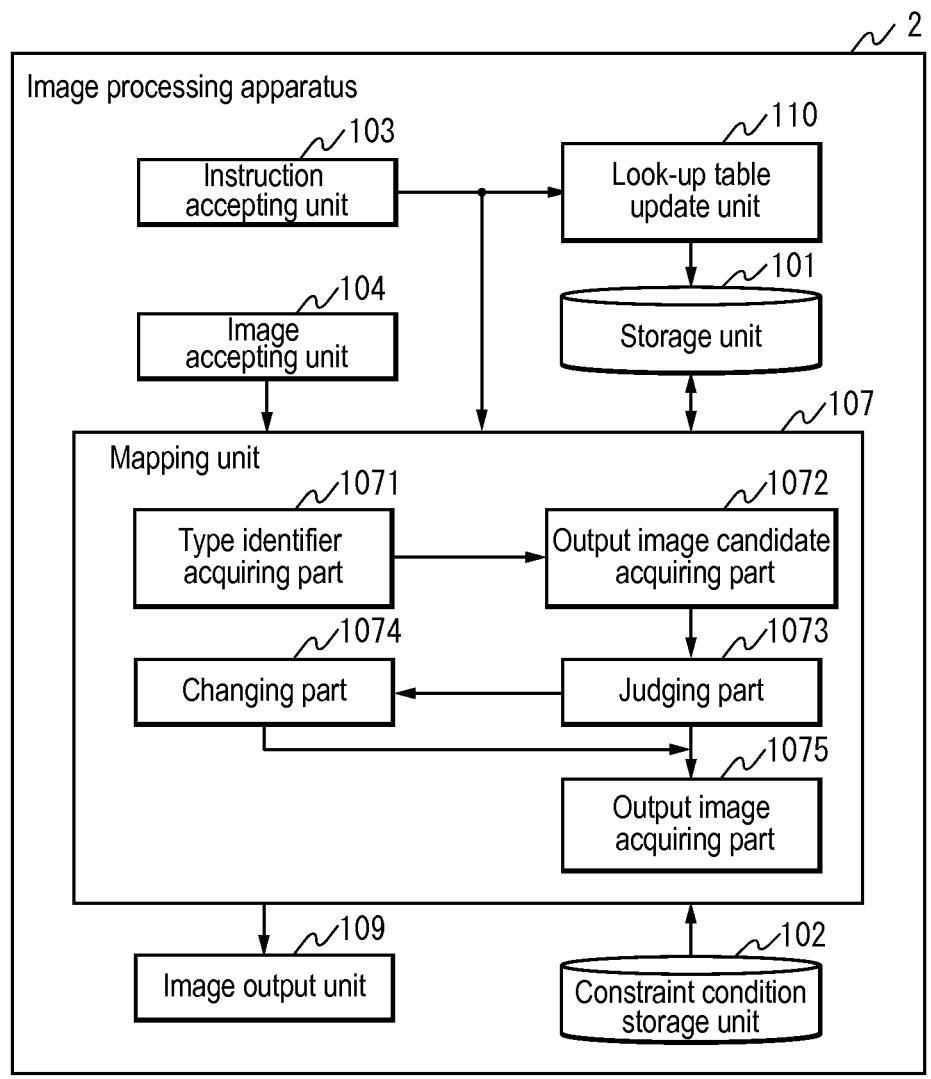
FIG. 10 is a block diagram of another image processing apparatus 2 in this embodiment.

Furthermore, in this embodiment, if the look-up table only has one piece of association information, the image processing apparatus 2 does not have to include the image analysis unit 106. In this case, the image processing apparatus 2 has a configuration as shown in FIG. 10. In this case, the mapping unit 107 acquires the whole or part of one or more second images associated with the whole or part of the one or more images accepted by the image accepting unit 104, using the one piece of association information in the storage unit 101. Also in this case, the image processing apparatus 2 may include the image analysis unit 106, the image analysis unit 106 may acquire one or more feature values from the whole or part of the one or more accepted images, and the mapping unit 107 may perform the modification process using the feature values.

Furthermore, it will be appreciated that the image processing apparatus 2 in this embodiment does not have to include some constituent elements such as the instruction accepting unit 103 and the look-up table update unit 110.

Furthermore, the software that realizes the image processing apparatus in this embodiment may be the following sort of program. Specifically, this program is a program using a storage medium in which a look-up table having one or at least two pieces of association information for associating the whole or part of at least one first image with the whole or part of at least one second image, which is an image whose load on the brain has been adjusted compared with that of the first image and which is an image of the same object as the first image, is stored, the program for causing a computer to function as: an image accepting unit that accepts at least one image; a mapping unit that acquires the whole or part of at least one second image associated with the whole or part of the at least one image accepted by the image accepting unit, using association information from among the one or at least two pieces of association information; and an image output unit that outputs at least one output image, which is the whole of the at least one second image acquired by the mapping unit or a group of part of the at least one second image acquired by the mapping unit.

Embodiment 3

In this embodiment, a look-up table acquiring apparatus 3 for generating a look-up table will be described. The look-up table acquiring apparatus 3 is an apparatus for learning a look-up table used to convert the whole or part of the first image in this specification, into the whole or part of the second image.

Figure 11:
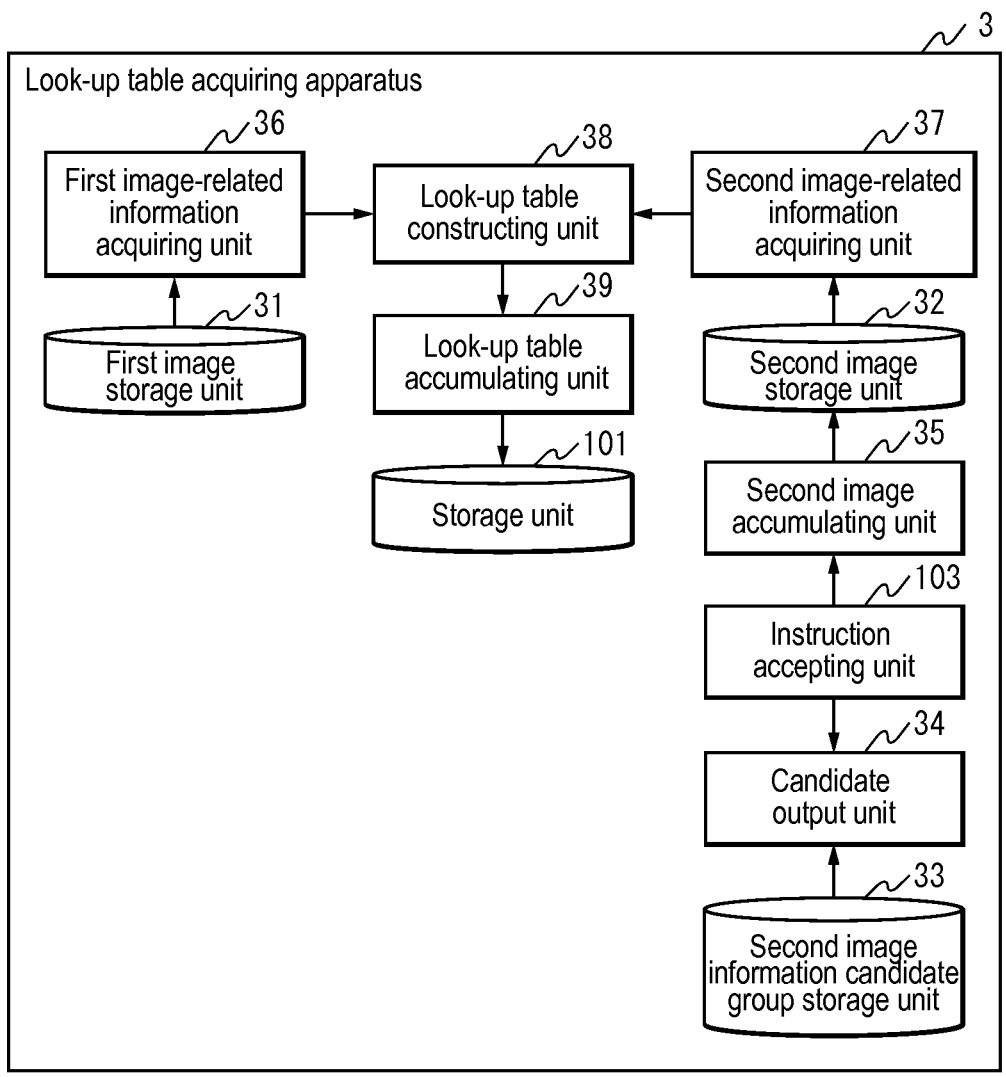
FIG. 11 is a block diagram of a look-up table acquiring apparatus 3 in Embodiment 3.

FIG. 11 is a block diagram of the look-up table acquiring apparatus 3 in this embodiment.

The look-up table acquiring apparatus 3 includes the storage unit 101, a first image storage unit 31, a second image storage unit 32, a second image information candidate group storage unit 33, the instruction accepting unit 103, a candidate output unit 34, a second image accumulating unit 35, a first image-related information acquiring unit 36, a second image-related information acquiring unit 37, a look-up table constructing unit 38, and a look-up table accumulating unit 39.

The instruction accepting unit 103 accepts an instruction from the user. The instruction described here is an instruction to output a second image information candidate group stored in the second image information candidate group storage unit 33, an instruction to select one or more candidates for the second image information, or the like. Note that the user may be an operator in a company to which the look-up table acquiring apparatus 3 is provided, or may be a user (a person who is watching an image) of the image processing apparatus or the television described above, for example. Furthermore, a second image information candidate group and second image information will be described later.

In the first image storage unit 31, one or more first images can be stored. The first image is an image assuming that the image is accepted by the image processing apparatus. The first image is, for example, an image whose load on the brain is greater than that of the second image in terms of the above-described meanings. Furthermore, the first image is, for example, an image whose entertaining level has not been made higher.

The first image storage unit 31 is preferably a non-volatile storage medium, but may be realized also by a volatile storage medium. There is no limitation on the procedure in which the first image is stored in the first image storage unit 31. The first image in the first image storage unit 31 may be generated, for example, from the second image in the second image storage unit 32. That is to say, for example, a part (not shown) may change the properties of the second image by performing a simulation that reduces the brightness of the second image or automatically changes the camera position, thereby generating the first image.

In the second image storage unit 32, one or more second images can be stored. The second image is an image whose load on the brain has been adjusted compared with that of the first image according to each purpose. For example, the second image is an image whose load on the brain is smaller than that of the first image. Furthermore, for example, the second image is an image whose entertaining level is higher than that of the first image. Furthermore, for example, the second image is an image acquired by capturing an image of one object in another environment.

The second image and the first image are images of the same object. The second image and the first image typically have the same number of pixels, but may have different numbers of pixels.

The second image storage unit 32 is preferably a non-volatile storage medium, but may be realized also by a volatile storage medium. There is no limitation on the procedure in which the second image is stored in the second image storage unit 32. The second image in the second image storage unit 32 may be generated, for example, from the first image in the first image storage unit 31. That is to say, for example, a part (not shown) may change the properties of the first image by performing a simulation that increases the brightness of the first image or automatically changes the camera position, thereby generating the second image.

In the second image information candidate group storage unit 33, one or more second image information candidate groups can be stored in association with each of the one or more first images. The second image information candidate group is a group of two or more candidates for the second image information. The second image information refers to information relating to the second image. Furthermore, the second image information may be the second image, or may be one or more attributes of the second image, for example. An attribute of an image is, for example, image capturing parameters or one or more feature values. Furthermore, each of the two or more candidates for the second image information is image information of the second image, which shows the same object as the first image that is associated with the second image. The second image information candidate group storage unit 33 may physically include the first image storage unit 31. Furthermore, "associated with the first image" refers to a state of being directly associated with the first image, or a state of being indirectly associated with the first image. The indirect association refers to, for example, a state of being associated with first image information. The first image information is information relating to the first image, and refers to the first image itself, attributes of the first image, or the like.

The second image information candidate group storage unit 33 is preferably a non-volatile storage medium, but may be realized also by a volatile storage medium. There is no limitation on the procedure in which the second image information candidate group is stored in the second image information candidate group storage unit 33.

The candidate output unit 34 outputs the one or more second image information candidate groups stored in the second image information candidate group storage unit 33. If the instruction accepting unit 103 accepts an instruction to output the second image information candidate group, the candidate output unit 34 may output the one or more second image information candidate groups stored in the second image information candidate group storage unit 33. The output described here typically refers to display on a display screen or projection using a projector, but may be a concept that includes transmission to an external apparatus or another program.

The second image accumulating unit 35 accumulates one or more second images associated with the one or more candidates for the second image information corresponding to the instruction accepted by the instruction accepting unit 103, in association with the first image associated with the second image information candidate group, in the second image storage unit 32. For example, if the second image information is the second image, the second image accumulating unit 35 accumulates one or more second images corresponding to the instruction accepted by the instruction accepting unit 103, in association with the first image, in the second image storage unit 32. Furthermore, for example, if the second image information is an attribute of the image, the second image accumulating unit 35 constructs the second image using the attribute of the image, and accumulates the second image in association with the first image, in the second image storage unit 32. The second image accumulating unit 35 may be realized typically by an MPU, a memory, or the like. Typically, the processing procedure of the second image accumulating unit 35 is realized by software, and the software is stored in a storage medium such as a ROM. Note that the processing procedure may be realized also by hardware (a dedicated circuit).

The first image-related information acquiring unit 36 acquires one or more pieces of first image-related information from the one or more first images in the first image storage unit 31. The first image-related information is information relating to the whole or part of the first image. The first image-related information is, for example, one or more feature values extracted from the whole or part of the first image. Examples of the one or more feature values include a vicinity feature value, which is a feature value of part of one or more first images, and a whole feature value, which is a feature value of the whole of one or more first images. Examples of the vicinity feature value and the whole feature value have been described above, and, thus, a description thereof has been omitted. Furthermore, the first image-related information is also may be information obtained by degenerating the one or more feature values. Such degenerated information is also a feature value.

The first image-related information acquiring unit 36 may be realized typically by an MPU, a memory, or the like. Typically, the processing procedure of the first image-related information acquiring unit 36 is realized by software, and the software is stored in a storage medium such as a ROM. Note that the processing procedure may be realized also by hardware (a dedicated circuit).

The second image-related information acquiring unit 37 acquires one or more pieces of second image-related information from the one or more second images in the second image storage unit 32. The second image-related information is information relating to the whole or part of the second image. The second image-related information is information for generating the whole or part of the second image, and refers to, for example, a parameter group that is to be given to an operation expression for generating the whole or part of the second image, or an operation expression for generating the whole or part of the second image. The second image-related information also may be, for example, the whole or part of the second image itself. If the second image-related information is the whole or part of the second image itself, the second image-related information acquiring unit 37 performs a process that divides the second image into spatiotemporal blocks.

The second image-related information acquiring unit 37 may be realized typically by an MPU, a memory, or the like. Typically, the processing procedure of the second image-related information acquiring unit 37 is realized by software, and the software is stored in a storage medium such as a ROM. Note that the processing procedure may be realized also by hardware (a dedicated circuit).

The look-up table constructing unit 38 constructs a look-up table having one or at least two pieces of association information. The association information is, as described above, information for associating the whole or part of one or more first images with the whole or part of one or more second images. Furthermore, for example, the association information is information for associating the first image-related information with the second image-related information. Furthermore, the association information is, for example, information having the first image-related information and the second image-related information. Note that there is no limitation on the content or the structure of the association information. Herein, regarding the second image-related information associated with the first image-related information, the whole or part of the first image from which the first image-related information has been generated and the whole or part of the second image from which the second image-related information has been generated may be such that their spatial positions on frame images forming video correspond to each other, such that their temporal positions on video correspond to each other, or such that their spatial and temporal positions on video correspond to each other.

The look-up table constructing unit 38 may be realized typically by an MPU, a memory, or the like. Typically, the processing procedure of the second image-related information acquiring unit 37 is realized by software, and the software is stored in a storage medium such as a ROM. Note that the processing procedure may be realized also by hardware (a dedicated circuit).

The look-up table accumulating unit 39 accumulates the look-up table constructed by the look-up table constructing unit 38, in the storage unit 101. Note that the accumulation described here also refers to writing into a memory and the like.

The look-up table accumulating unit 39 may be realized typically by an MPU, a memory, or the like. Typically, the processing procedure of the second image-related information acquiring unit 37 is realized by software, and the software is stored in a storage medium such as a ROM. Note that the processing procedure may be realized also by hardware (a dedicated circuit).

Figure 12:
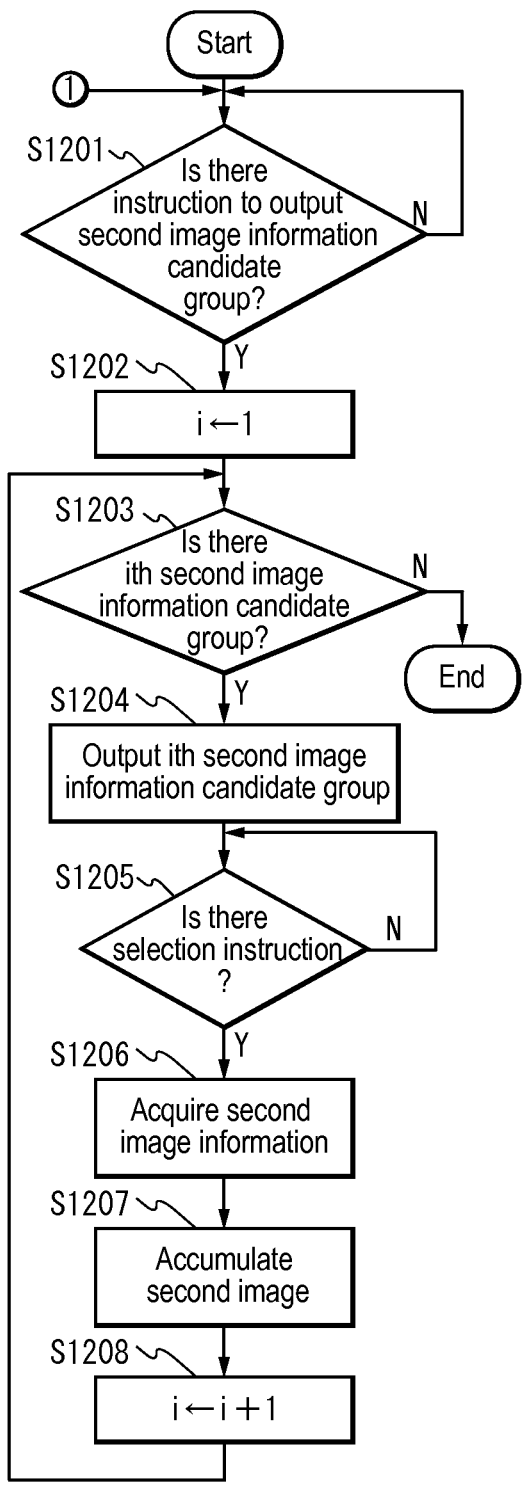
FIG. 12 is a flowchart illustrating the operation that selects a second image in the look-up table acquiring apparatus 3 in this embodiment.

Next, an operation in which the user selects a second image that is pleasant to the user using the look-up table acquiring apparatus 3 will be described with reference to the flowchart in FIG. 12.

(Step S1201) It is judged whether or not an instruction to output the second image information candidate group has been accepted by the instruction accepting unit 103. If an instruction has been accepted, the procedure advances to step S1202, and, if an instruction has not been accepted, the procedure returns to step S1201.

(Step S1202) The candidate output unit 34 substitutes 1 for a counter i.

(Step S1203) The candidate output unit 34 judges whether or not there is an ith second image information candidate group in the second image information candidate group storage unit 33. If there is an ith second image information candidate group, the procedure advances to step S1204, and, if there is not an ith second image information candidate group, the procedure is ended.

(Step S1204) The candidate output unit 34 reads the ith second image information candidate group from the second image information candidate group storage unit 33, and outputs the group.

(Step S1205) It is judged whether or not an instruction to select one or at least two pieces of second image information from among two or more candidates for the second image information contained in the second image information candidate group has been accepted by the instruction accepting unit 103. If such a select instruction has been accepted, the procedure advances to step S1206, and, if such a select instruction has not been accepted, the procedure returns to step S1205.

(Step S1206) The second image accumulating unit 35 acquires one or more candidates for the second image information corresponding to the instruction accepted in step S1205.

(Step S1207) The second image accumulating unit 35 acquires a second image using the second image information acquired in step S1206, and accumulates the second image in association with the first image in the second image storage unit 32. This first image is a first image associated with the ith second image information candidate group.

(Step S1208) The candidate output unit 34 increments the counter i by 1. The procedure returns to step S1203.

Figure 13:
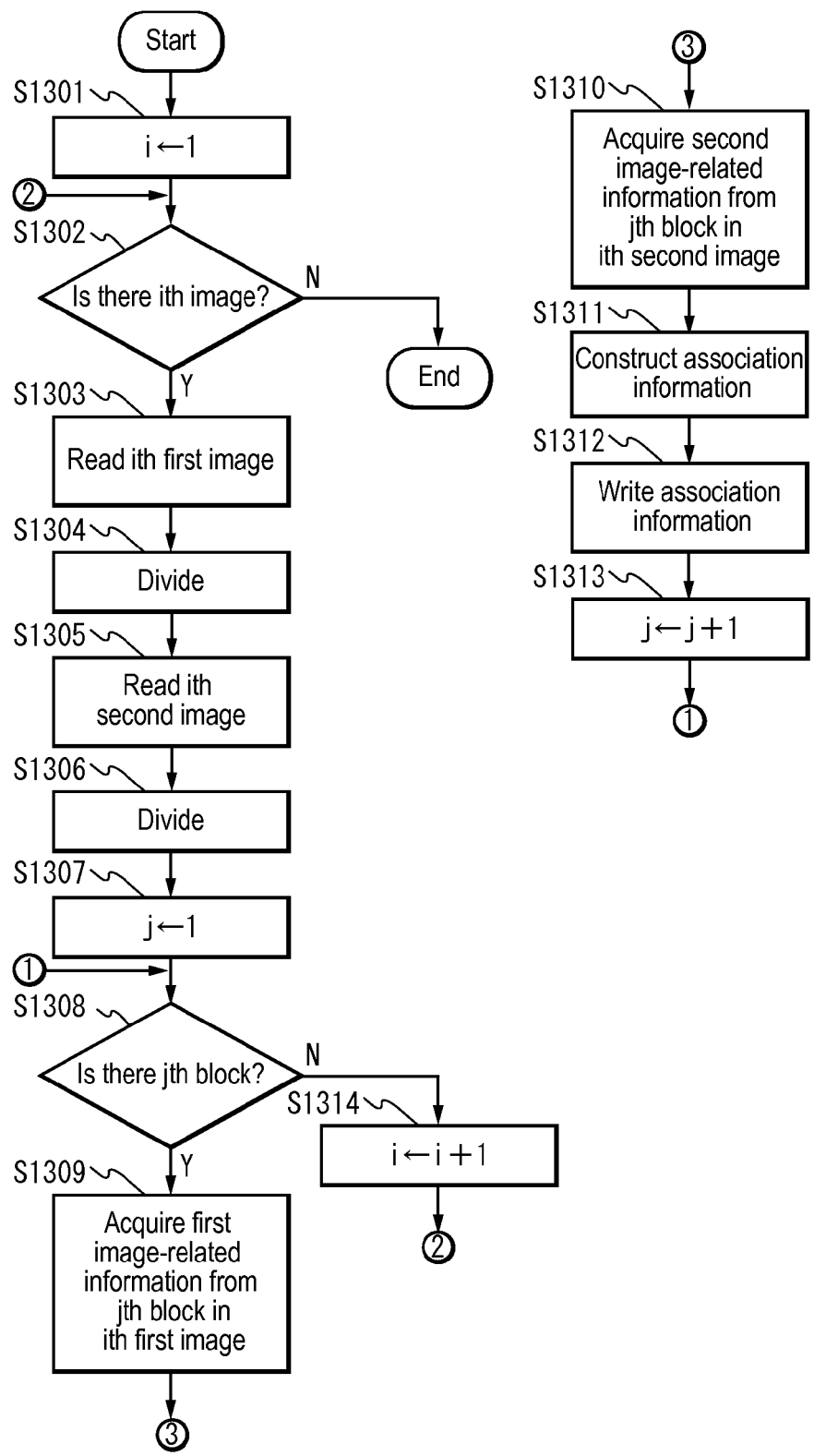
FIG. 13 is a flowchart illustrating the operation that constructs a look-up table in the look-up table acquiring apparatus 3 in this embodiment.

Next, an operation in which the look-up table acquiring apparatus 3 constructs and accumulates a look-up table will be described with reference to the flowchart in FIG. 13. In this example, it is assumed that the second images associated with each first image stored in the first image storage unit 31 are stored in the second image storage unit 32.

(Step S1301) The first image-related information acquiring unit 36 substitutes 1 for a counter i.

(Step S1302) The first image-related information acquiring unit 36 judges whether or not the ith first image is stored in the first image storage unit 31. If the ith first image is stored, the procedure advances to step S1303, and, if the ith first image is not stored, the procedure is ended.

(Step S1303) The first image-related information acquiring unit 36 reads the ith first image from the first image storage unit 31.

(Step S1304) The first image-related information acquiring unit 36 divides the ith first image read in step S1303 into blocks. Thus, the first image-related information acquiring unit 36 obtains n first spatiotemporal blocks.

(Step S1305) The second image-related information acquiring unit 37 reads the ith second image from the second image storage unit 32.

(Step S1306) The second image-related information acquiring unit 37 divides the ith second image read in step S1305 into blocks. Thus, the second image-related information acquiring unit 37 obtains n second spatiotemporal blocks.

(Step S1307) The look-up table constructing unit 38 substitutes 1 for a counter j.

(Step S1308) The look-up table constructing unit 38 judges whether or not there is a jth block in the spatiotemporal blocks acquired in step S1304. If there is a jth block, the procedure advances to step S1309, and, if there is not a jth block, the procedure advances to step S1314.

(Step S1309) The first image-related information acquiring unit 36 acquires first image-related information from the jth block in the ith first image.

(Step S1310) The second image-related information acquiring unit 37 acquires second image-related information from the jth block in the ith second image.

(Step S1311) The look-up table constructing unit 38 constructs association information having the first image-related information acquired in step S1309 and the second image-related information acquired in step S1310.

(Step S1312) The look-up table accumulating unit 39 accumulates the association information constructed in step S1311 in the storage unit 101.

(Step S1313) The look-up table constructing unit 38 increments the counter j by 1. The procedure returns to step S1308.

(Step S1314) The first image-related information acquiring unit 36 increments the counter i by 1. The procedure returns to step S1302.

Hereinafter, specific operations of the look-up table acquiring apparatus 3 in this embodiment will be described.

First, an example of the operation in which the look-up table acquiring apparatus 3 accepts an instruction to select a second image from the user, and accumulates the second image will be described.

Figure 14:
FIG. 14 is a view showing an example of multiple second image information candidate groups in this embodiment.

Assume the case in which multiple second image information candidate groups as shown in FIG. 14 are stored in the second image information candidate group storage unit 33. In this example, it is assumed that images of a candidate 1 in the second image information candidate groups are first images. Furthermore, the candidates 1 to 4 in the second image information candidate groups are candidates for the second images. That is to say, in this example, the second image information is the second image itself.

Then, the user inputs, to the look-up table acquiring apparatus 3, an instruction to output a second image information candidate group. Then, the instruction accepting unit 103 accepts the instruction to output a second image information candidate group.

Figure 15:
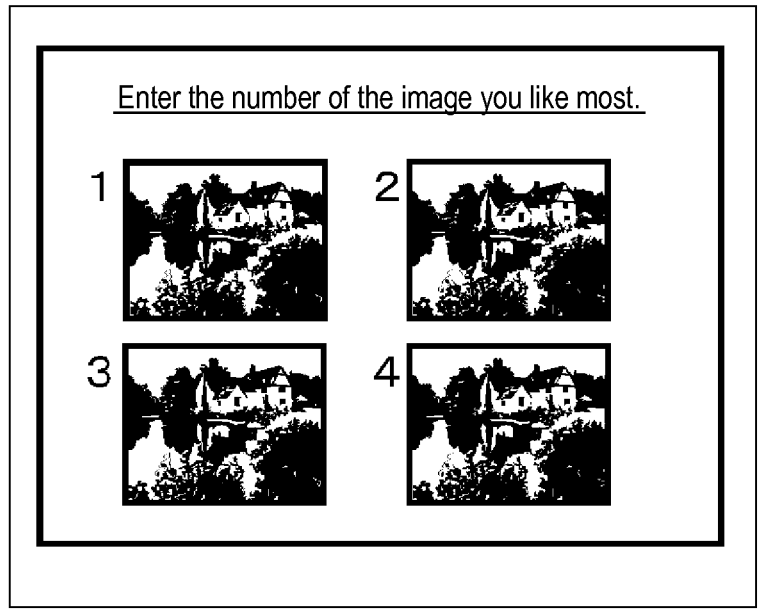
FIG. 15 is a view showing an output example of a second image information candidate group in this embodiment.

Next, the candidate output unit 34 reads and outputs a second image information candidate group at the first order (a group of images of records with "ID=1" in FIG. 14). FIG. 15 shows an example in which such a second image information candidate group is output.

Next, the user inputs an instruction to select an image that matches his or her preference (e.g., "4"). Then, the instruction accepting unit 103 accepts the instruction (e.g., "4").

Next, the second image accumulating unit 35 acquires the image at the fourth order corresponding to the instruction, and accumulates the image in the second image storage unit 32.

This processing is performed also on the other second image information candidate groups, so that second images preferred by the user are accumulated in the second image storage unit 32.

Next, specific operations in which the look-up table acquiring apparatus 3 constructs and accumulates a look-up table will be described. Hereinafter, the description will be given using seven specific examples.

Specific Example 1

Specific Example 1 shows an example using a first image and a second image acquired by capturing images of the same subject using light sources with different light intensities.

First, one subject is irradiated with a light source having a light intensity A, and an image thereof is captured by an image capturing apparatus (not shown), so that a first image is acquired and accumulated in the first image storage unit 31. Furthermore, the one subject is irradiated with a light source having a light intensity B (light intensity B>light intensity A), and an image thereof is captured by an image capturing apparatus (not shown), so that a second image is acquired and accumulated in the second image storage unit 32. In this case, the second image is an image whose load on the brain is smaller than that of the first image. Furthermore, it is preferable that, when viewed by a person, the second image seems to have a higher quality than that of the first image. An image that seems to have high quality refers to an image in which an appearance, a sense of distance, a sense of air, warmth, transparency, freshness, high-grade sense, or the like of the subject is well expressed.

Furthermore, it is preferable that there are a large number of types of subjects whose images are captured while changing the light intensities of the light sources, and examples thereof include nature, people, animals, still lifes, and the like. Furthermore, it will be appreciated that the degree of change in the light intensities of the light sources may vary depending on the subject.

In this manner, the first image storage unit 31 and the second image storage unit 32 have been constructed.

Next, the first image-related information acquiring unit 36 sequentially reads a first image from the first image storage unit 31. Then, the first image-related information acquiring unit 36 divides the first image into blocks, thereby obtaining n first spatiotemporal blocks. Note that multiple first spatiotemporal blocks may include overlapping regions. That is to say, the dividing process performed by the first image-related information acquiring unit 36 is similar to the dividing process performed by the dividing unit 105.

Furthermore, the second image-related information acquiring unit 37 reads the second image associated with first image, from the second image storage unit 32. Then, the second image-related information acquiring unit 37 divides the second image into blocks, thereby obtaining n second spatiotemporal blocks.

Next, the first image-related information acquiring unit 36 acquires the maximum value and the minimum value of multiple pixels, the dynamic range, the brightness level distribution, a difference in the time direction (e.g., a difference from the corresponding pixel in the immediately previous field), or the like, from the blocks of the first image. This information is a feature vector, and is the first image-related information. The first image-related information is acquired for each block.

Next, the second image-related information acquiring unit 37 acquires one or more parameters for generating blocks, from the blocks of the second image. Specifically, for example, the second image-related information acquiring unit 37 acquires a feature vector from the blocks of the second image, and substitutes the feature vector for an operation expression, thereby acquiring one or more parameters. The one or more parameters refer to an example of the second image-related information.

Next, the look-up table constructing unit 38 constructs association information having the first image-related information and the second image-related information, for each block. Then, the look-up table accumulating unit 39 accumulates the constructed association information in the storage unit 101.

With this processing, look-up tables having a large number of pieces of association information are generated. Note that the same or similar pieces of first image-related information may be included in one piece of association information.

Specific Example 2

Specific Example 2 shows an example using a first image and a second image acquired by capturing images of the same subject using light sources with different colors.

First, one subject is irradiated with a light source having a color X (e.g., white), and an image thereof is captured by an image capturing apparatus (not shown), so that a first image is acquired and accumulated in the first image storage unit 31. Furthermore, the one subject is irradiated with a light source having a color Y (e.g., orange), and an image thereof is captured by an image capturing apparatus (not shown), so that a second image is acquired and accumulated in the second image storage unit 32. In this case, it is necessary that, when viewed by a person, the second image seems to have a higher quality than that of the first image.

Furthermore, it is preferable that there are a large number of types of subjects whose images are captured while changing the colors of the light sources, and examples thereof include nature, people, animals, still lifes, and the like. Furthermore, it will be appreciated that the degree of change in the colors of the light sources may vary depending on the subject.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

Specific Example 3

Specific Example 3 shows an example using a first image and a second image acquired by capturing images of the same subject using light sources arranged at different positions.

First, one subject is irradiated with a light source disposed at a position α, and an image thereof is captured by an image capturing apparatus (not shown), so that a first image is acquired and accumulated in the first image storage unit 31. Furthermore, the one subject is irradiated with a light source disposed at a position β (position at which more shadow of the subject appears than the case in which the light source is disposed at the position α), and an image thereof is captured by an image capturing apparatus (not shown), so that a second image is acquired and accumulated in the second image storage unit 32. In this case, it is necessary that, when viewed by a person, the second image has a larger shadow region than that of the first image, and makes the person to more easily feel the sense of three dimensions of the subject than the first image.

Furthermore, it is preferable that there are a large number of types of subjects whose images are captured while changing the positions of the light sources, and examples thereof include nature, people, animals, still lifes, and the like. Furthermore, it will be appreciated that the degree of change in the positions of the light sources may vary depending on the subject.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

Specific Example 4

Specific Example 4 shows an example using a first image and a second image acquired by capturing images of the same subject using light sources with different light intensities arranged at different positions.

First, one subject is irradiated with a light source disposed at a position α and having a light intensity A, and an image thereof is captured by an image capturing apparatus (not shown), so that a first image is acquired and accumulated in the first image storage unit 31. Furthermore, the one subject is irradiated with a light source disposed at a position β and having a light intensity B (light intensity B>light intensity A), and an image thereof is captured by an image capturing apparatus (not shown), so that a second image is acquired and accumulated in the second image storage unit 32. In this case, it is preferable that, when viewed by a person, the second image seems to have a higher quality than that of the first image.

Furthermore, it is preferable that there are a large number of types of subjects whose images are captured while changing the light intensities of the light sources, and examples thereof include nature, people, animals, still lifes, and the like.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

Specific Example 5

Specific Example 5 shows an example using a first image and a second image acquired by capturing images of the same subject in environments that are different in one or more of the weather, the temperature, and the humidity.

First, one subject is irradiated with a light source in an environment with the weather "cloudy", the temperature "25 degrees", and the humidity "40%", and an image thereof is captured by an image capturing apparatus (not shown), so that a first image is acquired and accumulated in the first image storage unit 31. Furthermore, the one subject is irradiated with a light source in an environment with the weather "cloudy", the temperature "22 degrees", and the humidity "70%", and an image thereof is captured by an image capturing apparatus (not shown), so that a second image is acquired and accumulated in the second image storage unit 32. In this case, when viewed by a person, the second image typically can make the person to more easily feel a sense of distance, a moist appearance, and the like.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

In a similar manner, first, one subject is irradiated with a light source in an environment with the weather "cloudy", the temperature "25 degrees", and the humidity "40%", and an image thereof is captured by an image capturing apparatus (not shown), so that a first image is acquired and accumulated in the first image storage unit 31. Furthermore, the one subject is irradiated with a light source in an environment with the weather "fine", the temperature "28 degrees", and the humidity "20%", and an image thereof is captured by an image capturing apparatus (not shown), so that a second image is acquired and accumulated in the second image storage unit 32. In this case, when viewed by a person, the second image typically can make the person to more easily feel a sense of air, warmth, and the like.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

Specific Example 6

Specific Example 6 shows an example using a first image and a second image acquired by image capturing apparatuses capable of capturing images with different depths of field.

First, one subject is irradiated with a light source, and an image thereof is captured by an image capturing apparatus capable of capturing an image with a smaller depth of field, so that a first image is acquired and accumulated in the first image storage unit 31. Furthermore, the one subject is irradiated with a light source, and an image thereof is captured by an image capturing apparatus (not shown) capable of capturing an image with a larger depth of field, so that a second image is acquired and accumulated in the second image storage unit 32. In this case, when viewed by a person, the second image has a larger region in focus, and, thus, it typically seems to have a clearer feel. Furthermore, the second image has more sharpness due to its depth appearance, and, thus, it can typically provide a sense of depth and a sense of three dimensions.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

Specific Example 7

Specific Example 7 shows an example using a first image and a second image acquired by image capturing apparatuses having different shutter speeds.

One subject is irradiated with a light source, and an image thereof is captured by an image capturing apparatus having a lower shutter speed (shutter speed=A), so that a first image is acquired and accumulated in the first image storage unit 31. Furthermore, the one subject is irradiated with a light source, and an image thereof is captured by an image capturing apparatus (not shown) having a higher shutter speed (shutter speed=B, where A<B), so that a second image is acquired and accumulated in the second image storage unit 32. In this case, when viewed by a person, the second image typically seems to have increased speediness and increased dynamism.

In this manner, the first image storage unit 31 and the second image storage unit 32 have been constructed. Furthermore, the processing after the first image storage unit 31 and the second image storage unit 32 have been constructed is as in Specific Example 1, and, thus, a description thereof has been omitted.

As described above, according to this embodiment, it is possible to automatically acquire look-up tables that can be used to generate an image whose load on the brain has been adjusted according to each purpose.

Furthermore, according to this embodiment, if a user who is watching an image constructs a look-up table using the look-up table acquiring apparatus 3, the user can obtain a look-up table that makes it possible to output an image whose load on the brain has been adjusted according to his or her own purpose.

Furthermore, according to this embodiment, if the processing in which one or more users select a second image for each user's attribute (30 years old or younger, 60 years old or older, female, male, high-school student, etc.) is performed, a look-up table can be constructed for each user's attribute. Then, an image processing apparatus (e.g., television) using the thus constructed look-up table can output, for each user's attribute, an image whose load on the brain has been adjusted so as to match his or her preference.

Furthermore, it will be appreciated that the look-up table acquiring apparatus 3 in this embodiment does not have to include some constituent elements such as the second image information candidate group storage unit 33, the instruction accepting unit 103, the candidate output unit 34, and the second image accumulating unit 35.

Furthermore, it is preferable that a look-up table acquired using the look-up table acquiring apparatus 3 in this embodiment is copied in the image processing apparatuses described in Embodiments 1 and 2 and used.

In this example, the software that realizes the look-up table acquiring apparatus in this embodiment may be the following sort of program. Specifically, this program is a program using a storage medium in which at least one first image and at least one second image, which is an image whose load on the brain has been adjusted compared with that of the first image and which is an image of the same object as the at least one first image, are stored, the second image being stored in association with each of the at least one first image, the program for causing a computer to function as: a first image-related information acquiring unit that acquires at least one piece of first image-related information relating to the whole or part of the at least one first image stored in the storage medium, from the whole or part of the at least one first image; a second image-related information acquiring unit that acquires at least one piece of second image-related information relating to the whole or part of the at least one second image stored in the storage medium, from the whole or part of the at least one second image; a look-up table constructing unit that constructs a look-up table having one or at least two pieces of association information, which is information having the first image-related information acquired by the first image-related information acquiring unit and the second image-related information associated with the first image-related information and acquired by the second image-related information acquiring unit, and which is information indicating association between the whole or part of the at least one first image and the whole or part of the at least one second image; and a look-up table accumulating unit that accumulates the look-up table constructed by the look-up table constructing unit, in a storage medium.

Furthermore, in this program, it is preferable that at least one second image information candidate group, which is a group of at least two candidates for the second image regarding the same object as each of the at least one first image, is further stored in association with each of the at least one first image in the storage medium, and the computer is caused to further function as: a candidate output unit that outputs the at least one second image information candidate group; an instruction accepting unit that accepts an instruction to select at least one candidate for the second image from among the at least two candidates for the second image contained in the at least one second image information candidate group output by the candidate output unit; and a second image accumulating unit that accumulates at least one candidate for the second image corresponding to the instruction accepted by the instruction accepting unit, in association with the first image associated with the second image information candidate group, in the second image storage unit.

Embodiment 4

In this embodiment, a specific example of the process that generates a look-up table using the look-up table acquiring apparatus 3 will be further described.

This specific example shows the case in which the association information for constructing a look-up table is a feature vector and an image conversion filter. Note that the feature vector refers to information extracted from the input image (the first image).

Furthermore, the image conversion filter refers to, for example, a group of one or more filtering factors.

Figure 16:
FIG. 16 is a view showing an example of a first image in Embodiment 4.
Figure 17:
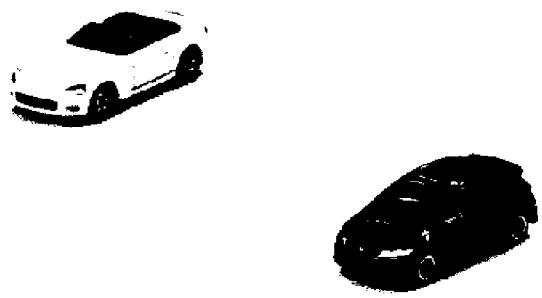
FIG. 17 is a view showing an example of a second image in this embodiment.

It is assumed that a large number of images are stored in the first image storage unit 31, for example, such as a first image with a smaller depth of field as shown in FIG. 16. Furthermore, it is assumed that a large number of images are stored in the second image storage unit 32, for example, such as a second image with a larger depth of field as shown in FIG. 17. In this example, a first image and a second image are associated with each other. That is to say, for example, the first image in FIG. 16 and the second image in FIG. 17 are associated with each other.

Furthermore, the second image has a larger depth of field than that of the first image. Furthermore, the depth of field in FIG. 16 is smaller, and a red car (a dark-colored car) in the front is focused in the image. On the other hand, the depth of field in FIG. 17 is larger, and a yellow car (a light-colored car) in the rear is also focused in the image. Note that, typically, the second image with a larger depth of field more easily makes the viewer to understand the entire image than the first image, and, thus, the second image can be said to be a pleasant image whose load on the brain is small.

Figure 18:
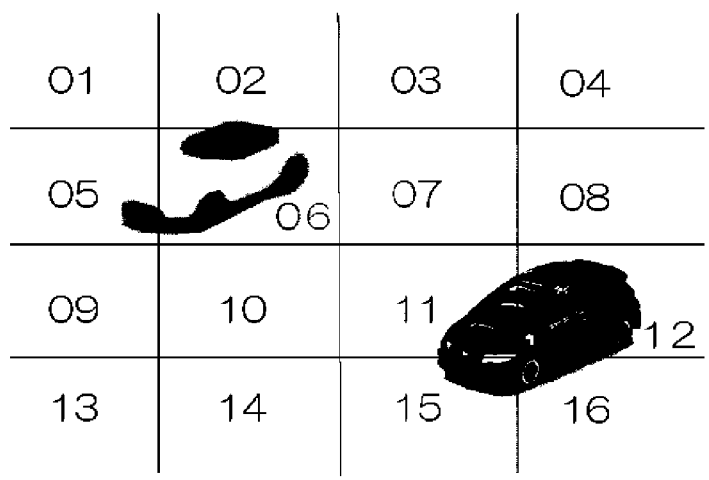
FIG. 18 is a view showing an example of first spatiotemporal blocks in this embodiment.

It is assumed that, in this state, an instruction to construct a look-up table is input from the user. Next, the first image-related information acquiring unit 36 reads a first image (as shown in FIG. 16, for example) from the first image storage unit 31. Then, the first image-related information acquiring unit 36 divides the first image, thereby acquiring multiple spatiotemporal blocks. In this example, as shown in FIG. 18, the first image-related information acquiring unit 36 divides the first image into 16 equal portions, thereby acquiring 16 first spatiotemporal blocks. In FIG. 18, a block identifier is indicated for each first spatiotemporal block.

Figure 19:
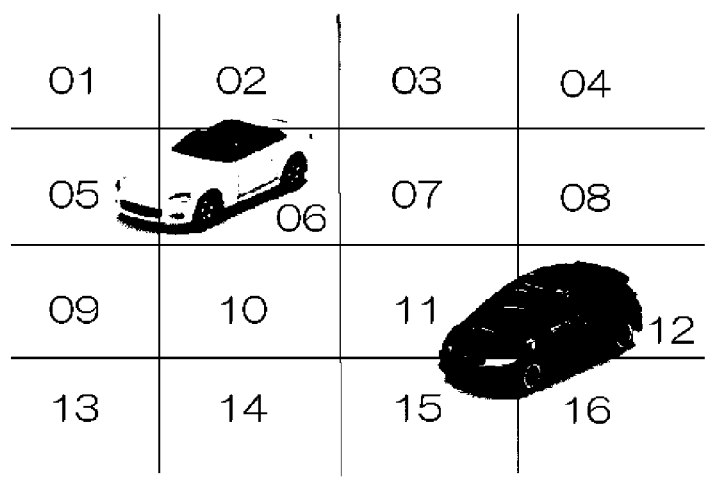
FIG. 19 is a view showing an example of second spatiotemporal blocks in this embodiment.

Next, the second image-related information acquiring unit 37 reads a second image (as shown in FIG. 17, for example) from the second image storage unit 32. Then, the second image-related information acquiring unit 37 divides the second image, thereby acquiring multiple spatiotemporal blocks. In this example, as shown in FIG. 19, the second image-related information acquiring unit 37 divides the second image into 16 equal portions, thereby acquiring 16 second spatiotemporal blocks. In FIG. 19, a block identifier is indicated for each second spatiotemporal block.

Next, the look-up table constructing unit 38 calculates a filtering factor of a conversion filter for converting a first spatiotemporal block at the first order in the first image into a second spatiotemporal block at the first order in the second image, for example, using the least squares approximation.

In a similar manner, the look-up table constructing unit 38 sequentially calculates a filtering factor of a conversion filter for converting a first spatiotemporal block at an nth order (n is a number of 2 to 16) in the first image into a second spatiotemporal block at an nth order (n is a number of 2 to 16) in the second image, for example, using the least squares approximation.

Figure 20:
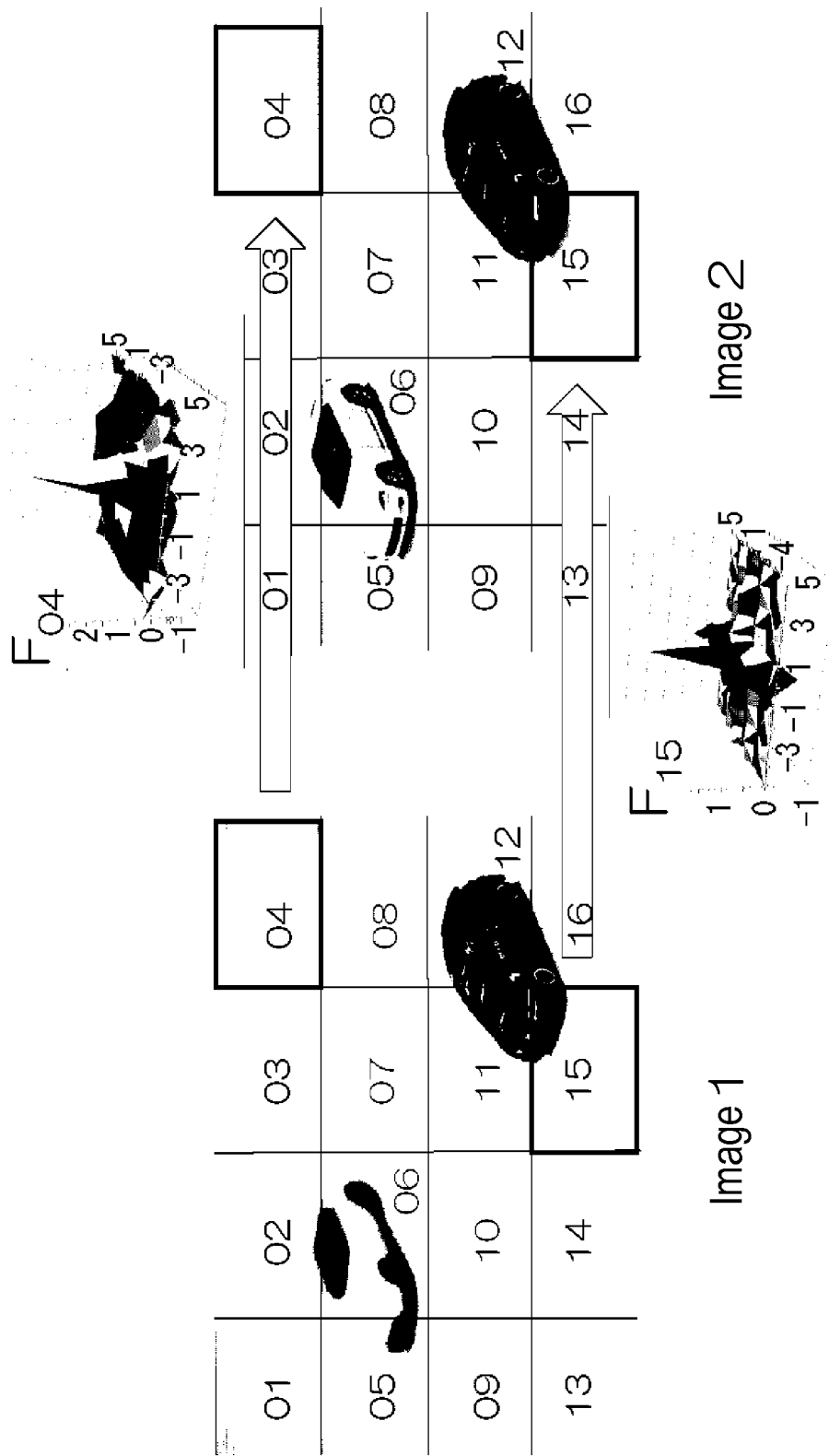
FIG. 20 is a conceptual diagram illustrating the operation of a look-up table constructing unit in this embodiment.

In this manner, filtering factors of 16 types of image conversion filters are obtained. FIG. 20 is a conceptual diagram illustrating the operation of the look-up table constructing unit 38. In FIG. 20, $F_{04}$ indicates a fourth image conversion filter, and $F_{15}$ indicates a 15th image conversion filter.

Figure 21:
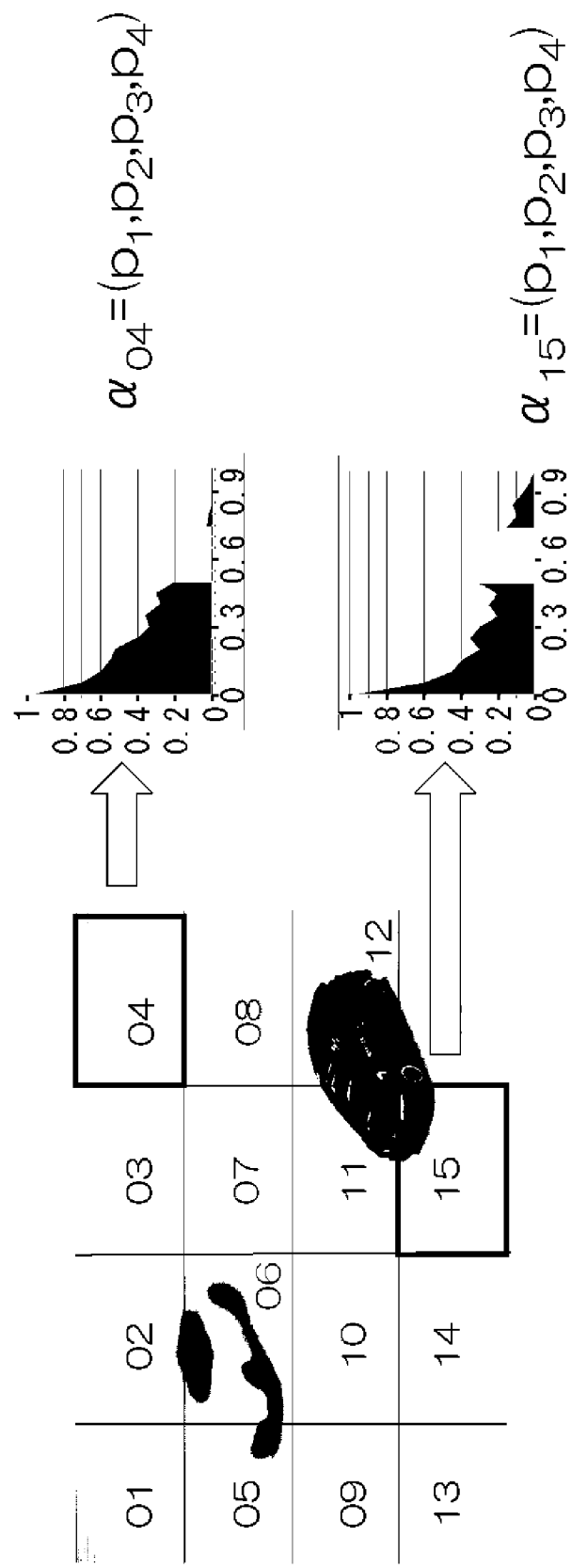
FIG. 21 is a conceptual diagram of the processing of the look-up table constructing unit in this embodiment.

Next, the look-up table constructing unit 38 acquires the vicinity feature value of each of the 16 first spatiotemporal blocks in the first image. For example, the look-up table constructing unit 38 calculates frequency components using the discrete Fourier transform on each first spatiotemporal block, thereby acquiring power in each band. The power in each band is taken as the feature vector of the vicinity feature value. FIG. 21 shows the concept of such processing. In FIG. 21, for example, the look-up table constructing unit 38 acquires the feature vector of the vicinity feature value "$\alpha_{04}=(p_{04-1}, p_{04-2}, p_{04-3}, p_{04-4})$" from the first spatiotemporal block at the fourth order, and acquires the feature vector of the vicinity feature value "$\alpha_{15}=(p_{15-1}, p_{15-2}, p_{15-3}, p_{15-4})$" from the first spatiotemporal block at the 15th order.

Figure 22:
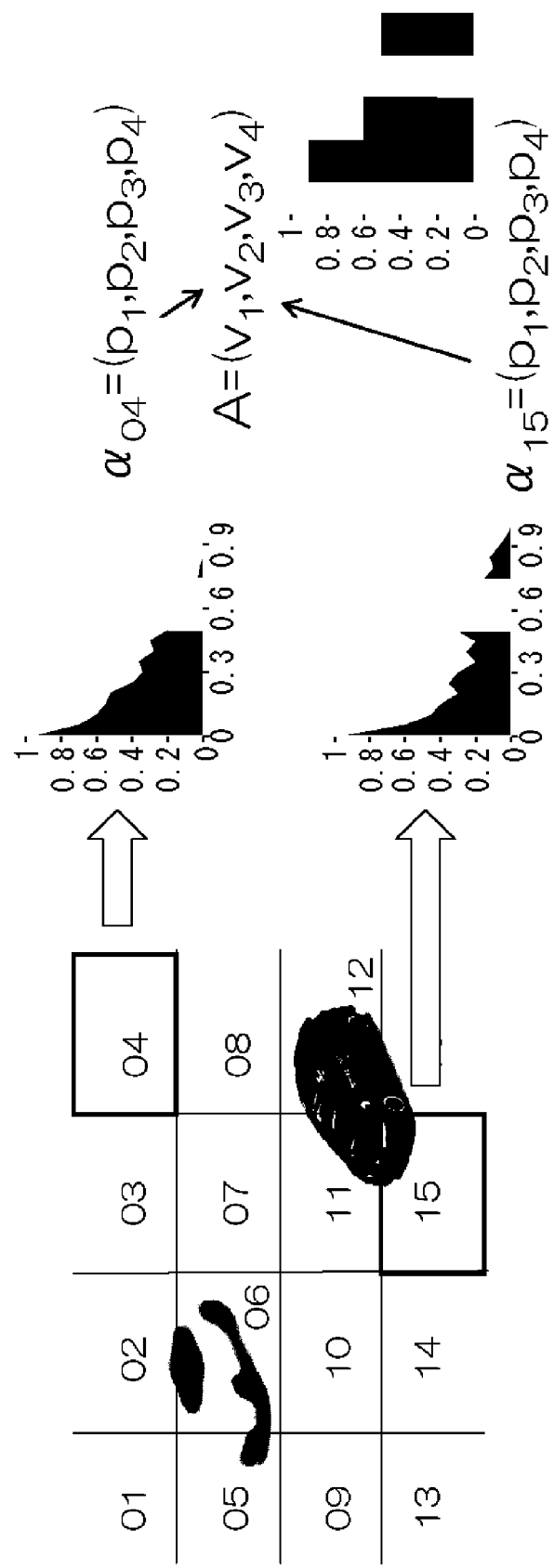
FIG. 22 is a conceptual diagram of the processing of the look-up table constructing unit in this embodiment.

Next, the look-up table constructing unit 38 calculates the whole feature value, which is a feature value of the whole of the first image. For example, the look-up table constructing unit 38 calculates, as the whole feature value, dispersion "$A_1=(V_1, V_2, V_3, V_4)$" for each component of the feature vector (vector of the vicinity feature value) obtained at a local point. FIG. 22 shows the concept of such processing.

Next, the look-up table constructing unit 38 combines the whole feature value and the vicinity feature value for each region, thereby constructing a feature vector "$(A_1, \alpha_{01})$, etc." for constructing association information. Furthermore, the look-up table constructing unit 38 constructs association information in which the feature vectors and the filtering factors are associated with each other.

Then, the look-up table accumulating unit 39 accumulates 16 pieces of association information in which the feature vectors and the filtering factors are associated with each other, in the storage unit 101.

This processing is performed on the other pairs of the first image and the second image. Then, the look-up table acquiring apparatus 3 acquires the look-up table shown in FIG. 23. The look-up table in FIG. 23 has a large number of pieces of association information. Furthermore, the association information in this example has the feature vectors and the filtering factors.

As described above, in this embodiment, it is possible to automatically acquire look-up tables that can be used to generate an image whose load on the brain has been adjusted according to each purpose.

Embodiment 5

In this embodiment, an image processing apparatus 4 will be described that acquires an image whose load on the brain has been adjusted compared with that of an accepted image according to each purpose, using the look-up table constructed in Embodiment 4.

Figure 24:
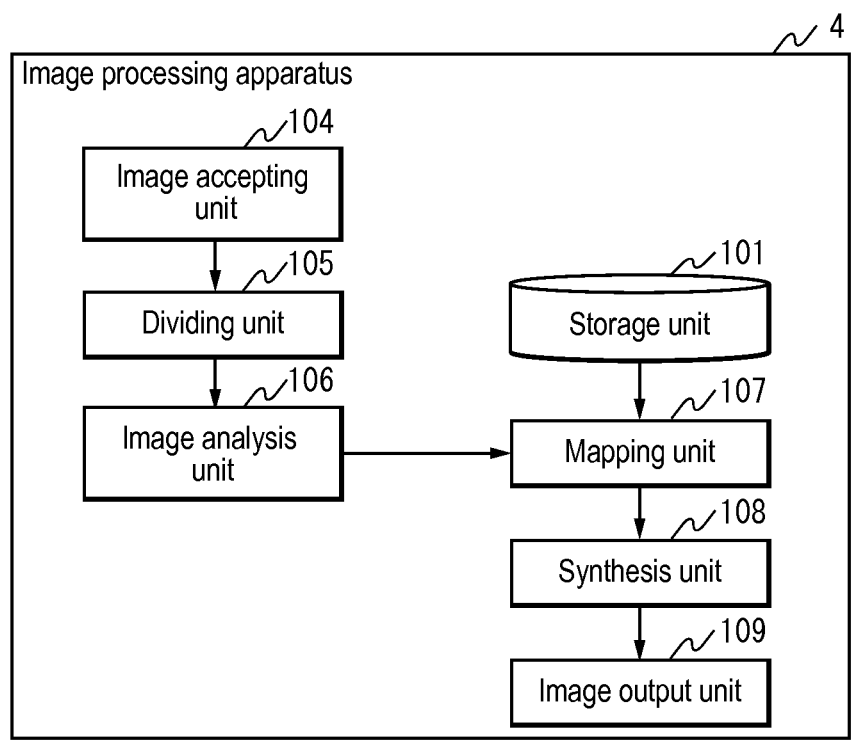
FIG. 24 is a block diagram of an image processing apparatus 4 in Embodiment 5.

FIG. 24 is a block diagram of the image processing apparatus 4 in this embodiment. The image processing apparatus 4 includes the storage unit 101, the image accepting unit 104, the dividing unit 105, the image analysis unit 106, the mapping unit 107, the synthesis unit 108, and the image output unit 109.

Figure 23:
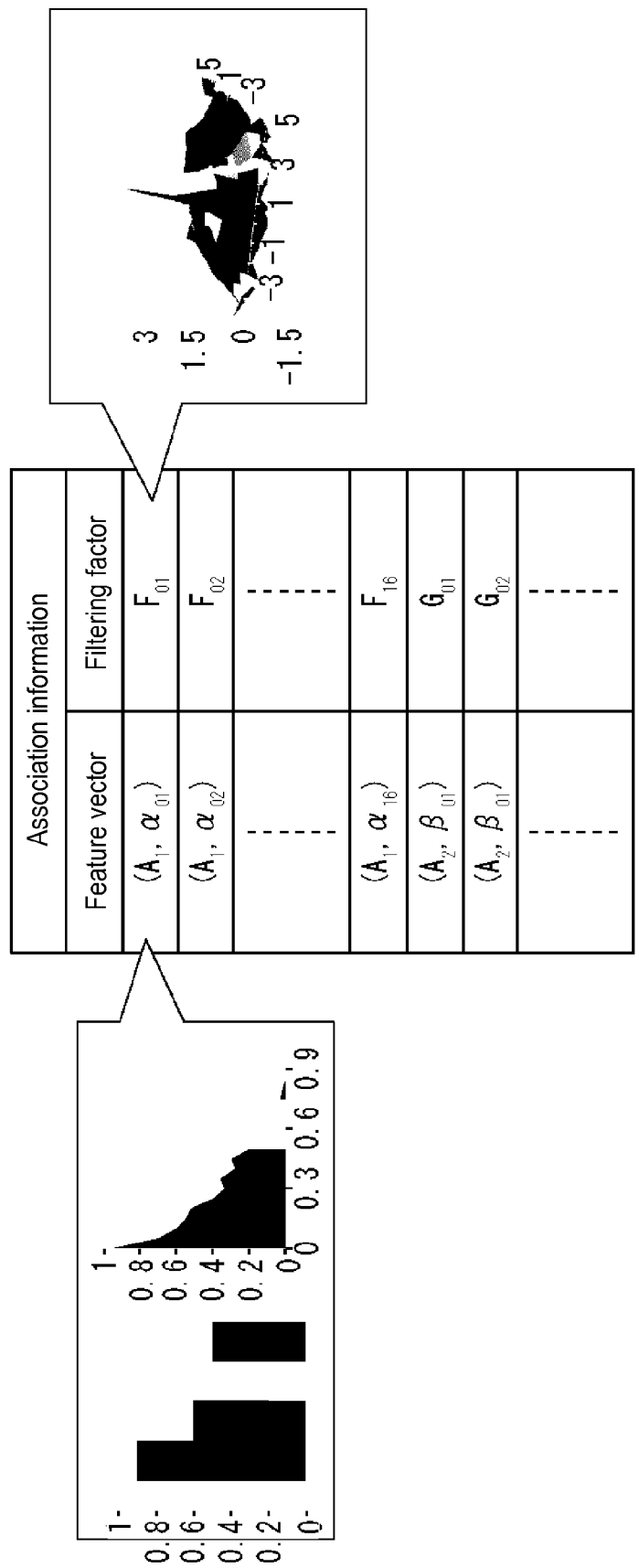
FIG. 23 is a view showing an example of a look-up table in this embodiment.

It is assumed that the look-up table shown in FIG. 23 is stored in the storage unit 101 of the image processing apparatus 4. It is preferable that the look-up table is in the form of an index using the feature vector as a key. Furthermore, it is preferable that the look-up table is configured such that the association information is sorted using the feature vector as a key.

Figure 25:
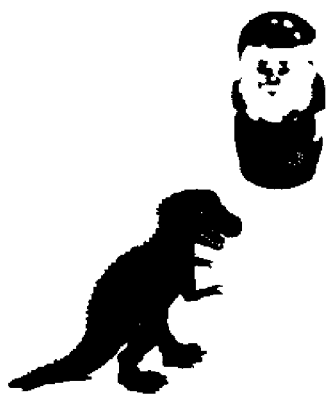
FIG. 25 is a view showing an example of an image with a smaller depth of field in this embodiment.

Furthermore, it is assumed that the image accepting unit 104 accepts an image shown in FIG. 25. The image in FIG. 25 is an image with a smaller depth of field.

Next, the image analysis unit 106 calculates a whole feature value ($A_n$) of the image in FIG. 25. The method for calculating the whole feature value is as in Embodiment 4.

Next, the image analysis unit 106 and the like calculate a vicinity feature value ($\alpha_n$) of each pixel of the image in FIG. 25. The vicinity feature value described here is obtained by calculating frequency components in a 16×16 pixel block in the vicinity of this pixel, thereby acquiring power in each band. This processing is also as in Embodiment 4.

Next, the image analysis unit 106 forms a feature vector ($A_n$, $\alpha_n$) in which the whole feature value and the vicinity feature value have been composed, for each pixel.

Next, the image analysis unit 106 calculates a distance between the feature vector ($A_n$, $\alpha_n$) associated with each pixel and the two or more feature vectors contained in the two or more pieces of association information constructing the look-up table, and determines a feature vector "e.g., ($A_m$, $\alpha_m$)" with the smallest distance.

Then, the mapping unit 107 acquires a filtering factor "e.g., $F_m$" that is paired with the feature vector with the smallest distance, for each pixel.

Next, the mapping unit 107 applies the conversion filter realized by the acquired filtering factor to each pixel of the input image, thereby acquiring each pixel of the second image (the output image).

Figure 26:
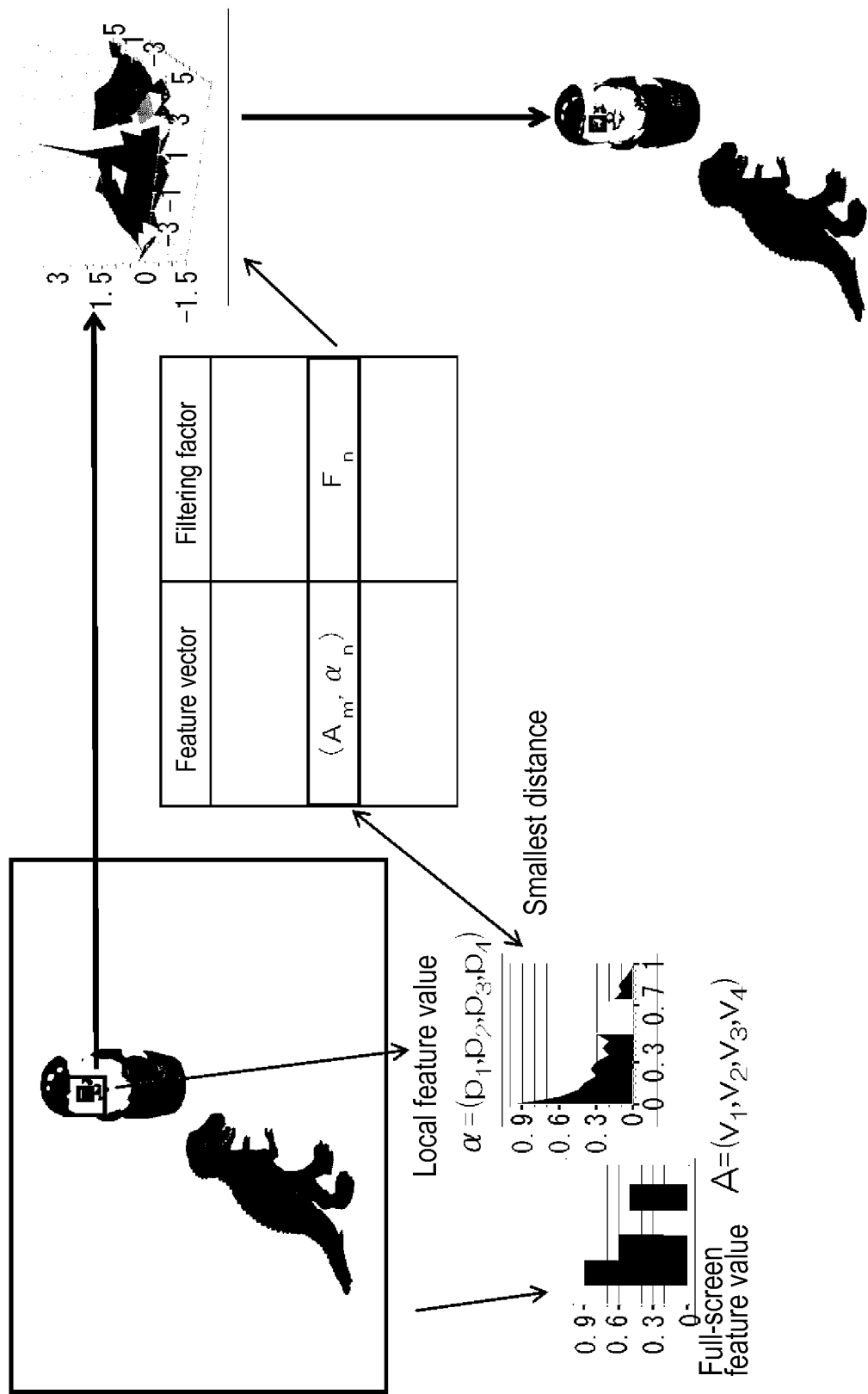
FIG. 26 is a conceptual diagram of the processing of a mapping unit in this embodiment.

Then, the synthesis unit 108 forms an output image using each acquired pixel as an output pixel value at the position of each pixel of the input image. Next, the image output unit 109 outputs the formed output image. FIG. 26 shows the concept of such processing.

As described above, according to this embodiment, it is possible to output an image that has been made pleasant by adjusting its load on the brain.

In this embodiment, the method for acquiring the feature vector for constructing a look-up table and the method of the image analysis unit 106 for acquiring the feature vector are different from each other. However, the method for acquiring the feature vector for constructing a look-up table and the method of the image analysis unit 106 for acquiring the feature vector may be the same.

Embodiment 6

In this embodiment, an image processing apparatus 5 will be described that acquires an image whose load on the brain has been adjusted compared with that of an accepted image according to each purpose, using a look-up table. This embodiment is different from Embodiment 1 and the like mainly in that the constraint condition that is to be applied dynamically changes according to the input image.

Figure 27:
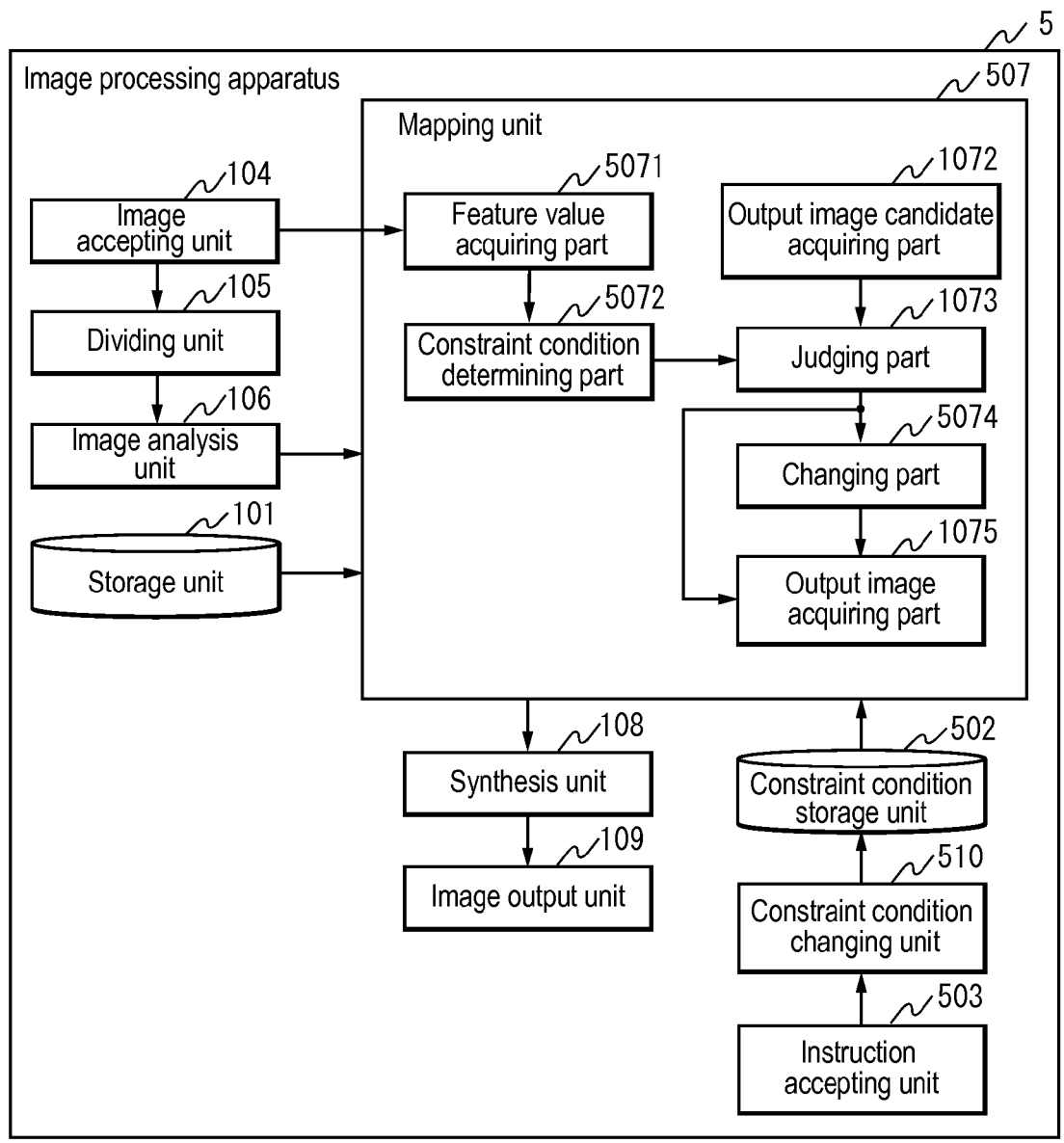
FIG. 27 is a block diagram of an image processing apparatus 5 in Embodiment 6.

FIG. 27 is a block diagram of the image processing apparatus 5 in this embodiment.

The image processing apparatus 5 includes the storage unit 101, a constraint condition storage unit 502, an instruction accepting unit 503, the image accepting unit 104, the dividing unit 105, the image analysis unit 106, a mapping unit 507, the synthesis unit 108, the image output unit 109, and a constraint condition changing unit 510.

The mapping unit 507 includes, for example, the output image candidate acquiring part 1072, the judging part 1073, a feature value acquiring part 5071, a constraint condition determining part 5072, a changing part 5074, and the output image acquiring part 1075.

In the constraint condition storage unit 502, two or more pieces of constraint information, which is a pair of condition identifying information and a constraint condition, can be stored. Although the constraint condition here will be described using, as an example, a condition relating to the output image, it also may be a condition relating to the input image or the association information. The condition identifying information is information for identifying a constraint condition. The condition identifying information is, for example, a feature vector. Furthermore, the feature value forming a vector is, for example, a vicinity spatial activity of an input image. Examples of the vicinity spatial activity may include various values such as the temporal difference value between pixels at the same position on the field, the inclination (primary and secondary spatial differential values), the local maximum and minimum values (highest and lowest values), the nth highest and lowest values, the dynamic range, the spatial difference, the dispersion of pixel values, the power in a high-spatial-frequency, the ratio between the temporal activity and the spatial activity, and the like. Furthermore, the constraint condition is a proper vicinity spatial activity. FIG. 28 shows an example of the constraint information. In FIG. 28, the constraint information has a vicinity spatial activity, which is condition identifying information, and a proper activity, which is a constraint condition.

The instruction accepting unit 503 accepts an instruction to change the constraint condition, from the user. The instruction is, for example, an instruction to modify the constraint information in FIG. 28. Furthermore, the instruction is, for example, an instruction to change the amount of stimuli received by the user from the image.

The feature value acquiring part 5071 forming the mapping unit 507 acquires a feature vector of the image (the input image) accepted by the image accepting unit 104. The feature value acquiring part 5071 may acquire the feature vector of the whole of the image accepted by the image accepting unit 104, or may acquire the feature vector of spatiotemporal blocks forming the image accepted by the image accepting unit 104.

The constraint condition determining part 5072 applies the feature vector acquired by the feature value acquiring part 5071, to the constraint information in the constraint condition storage unit 502, thereby selecting a constraint condition. More specifically, the constraint condition determining part 5072 selects condition identifying information (in the case where this condition identifying information is also a feature vector) with the smallest distance from the feature vector acquired by the feature value acquiring part 5071, and acquires a constraint condition that is paired with the selected condition identifying information, from the constraint condition storage unit 502.

If the judging part 1073 judges that the constraint condition is not satisfied, the changing part 5074 changes the whole or part of the second image, using the constraint condition acquired by the constraint condition determining part 5072. In this example, if the judging part 1073 judges that the constraint condition is not satisfied, the changing part 5074 may change the look-up table. Furthermore, if the judging part 1073 judges that the constraint condition is not satisfied, the changing part 5074 may change an input image accepted after the judgment, a spatiotemporal block obtained after the judgment, one or more feature values of an input image accepted after the judgment, or one or more feature values of a spatiotemporal block obtained after the judgment.

The constraint condition changing unit 510 changes the constraint information according to the instruction accepted by the instruction accepting unit 503. Furthermore, the constraint condition changing unit 510 may automatically change the constraint information. That is to say, the constraint condition changing unit 510 may automatically change the constraint information, for example, according to user's attributes (age, sex, address, etc.), information superimposed on broadcast (information contained in EPGs, etc.), time, time zone, and external sensor information (e.g., brightness and temperature of the room in which the viewer is present, etc.). In this case, the constraint condition changing unit 510 holds in advance information on how the constraint information is to be changed according to user's attributes and the like (e.g., correspondence table of a user's attribute and a formula representing a change algorithm, etc.). Furthermore, in the case of using external sensor information, the constraint condition changing unit 510 acquires information (brightness and temperature of the room, etc.) from sensors (not shown).

The constraint condition storage unit 502 is preferably a non-volatile storage medium, but may be realized also by a volatile storage medium. There is no limitation on the procedure in which the constraint information is stored in the constraint condition storage unit 502. For example, the constraint information may be stored in the constraint condition storage unit 502 via a storage medium, the constraint information transmitted via a communication line or the like may be stored in the constraint condition storage unit 502, or the constraint information input via an input device may be stored in the constraint condition storage unit 502.

The instruction accepting unit 503 may be realized by a device driver for an input part such as a keyboard, or control software for a menu screen, for example.

The mapping unit 507, the constraint condition changing unit 510, the feature value acquiring part 5071, the constraint condition determining part 5072, and the changing part 5074 may be realized typically by an MPU, a memory, or the like. Typically, the processing procedure of the mapping unit 507 and the like is realized by software, and the software is stored in a storage medium such as a ROM. Note that the processing procedure may be realized also by hardware (a dedicated circuit).

Next, the operation of the image processing apparatus 5 will be described with reference to the flowchart in FIG. 29. Hereinafter, the description of the flowchart in FIG. 29 will be given regarding the steps different from those in the flowchart in FIG. 2.

(Step S2901) The mapping unit 507 performs a mapping process. The mapping process will be described with reference to the flowchart in FIG. 30.

(Step S2902) It is judged whether or not an instruction from the user has been accepted by the instruction accepting unit 503. If an instruction from the user has been accepted, the procedure advances to step S2903, and, if an instruction from the user has not been accepted, the procedure returns to step S201.

(Step S2903) The constraint condition changing unit 510 changes the constraint information according to the instruction accepted by the instruction accepting unit 503.

Figure 29:
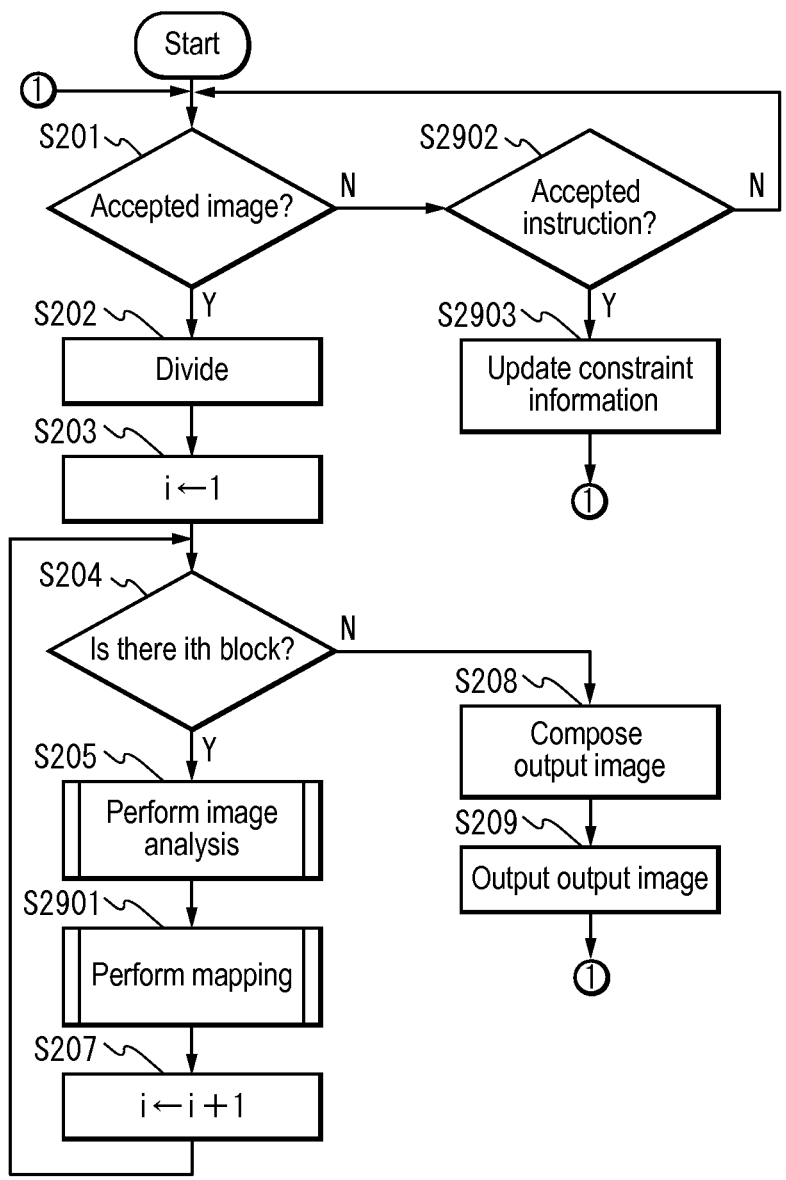
FIG. 29 is a flowchart illustrating the operation of the image processing apparatus 5 in this embodiment.

In the flowchart in FIG. 29, an input image is divided, and the process is performed on each spatiotemporal block. However, in the flowchart in FIG. 29, the process may be performed on the whole of an input image.

Figure 30:
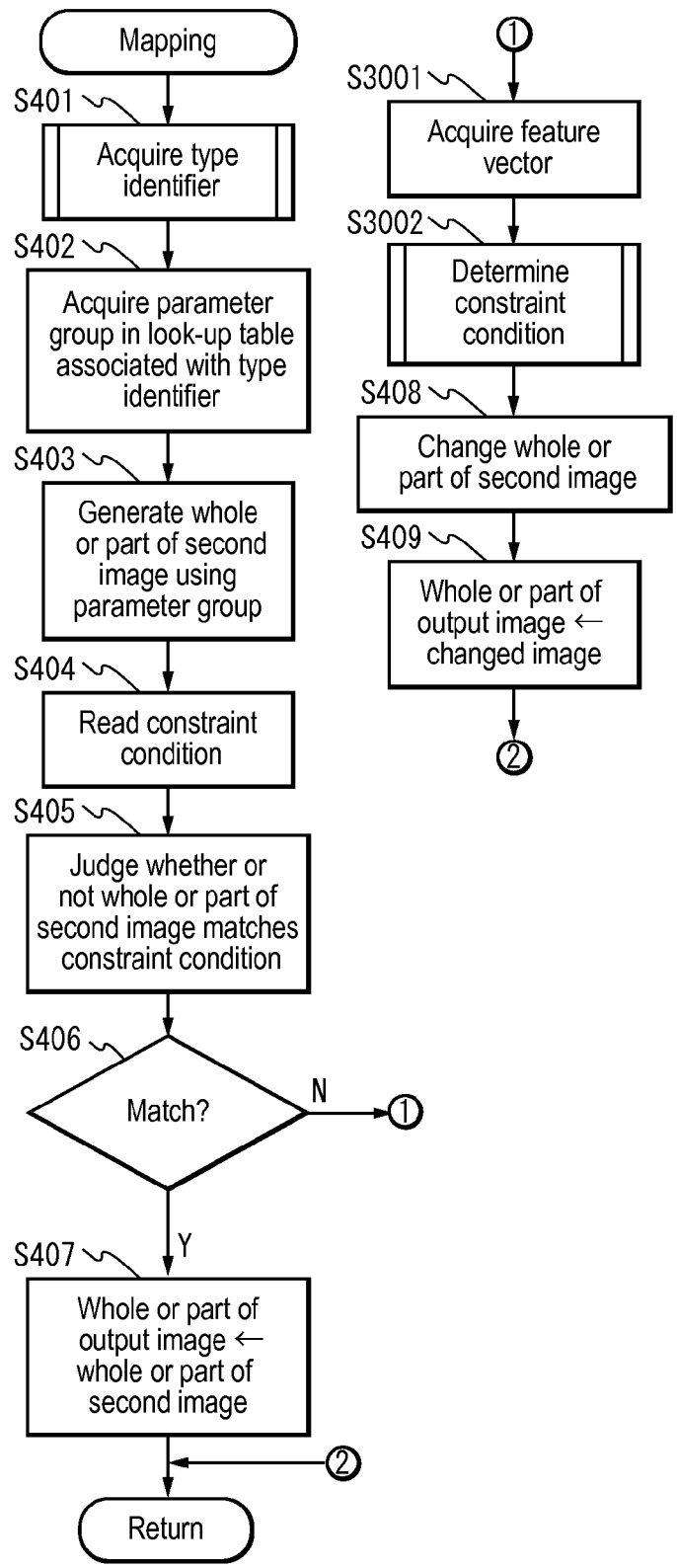
FIG. 30 is a flowchart illustrating a mapping process in this embodiment.

Next, the mapping process in step S2901 will be described with reference to the flowchart in FIG. 30. Hereinafter, the description of the flowchart in FIG. 30 will be given regarding the steps different from those in the flowchart in FIG. 4.

(Step S3001) The feature value acquiring part 5071 forming the mapping unit 507 acquires a feature vector of the image accepted by the image accepting unit 104.

(Step S3002) The constraint condition determining part 5072 applies the feature vector acquired by the feature value acquiring part 5071, to the constraint information in the constraint condition storage unit 502, thereby determining a constraint condition. This constraint condition determination process will be described with reference to the flowchart in FIG. 31.

Figure 31:
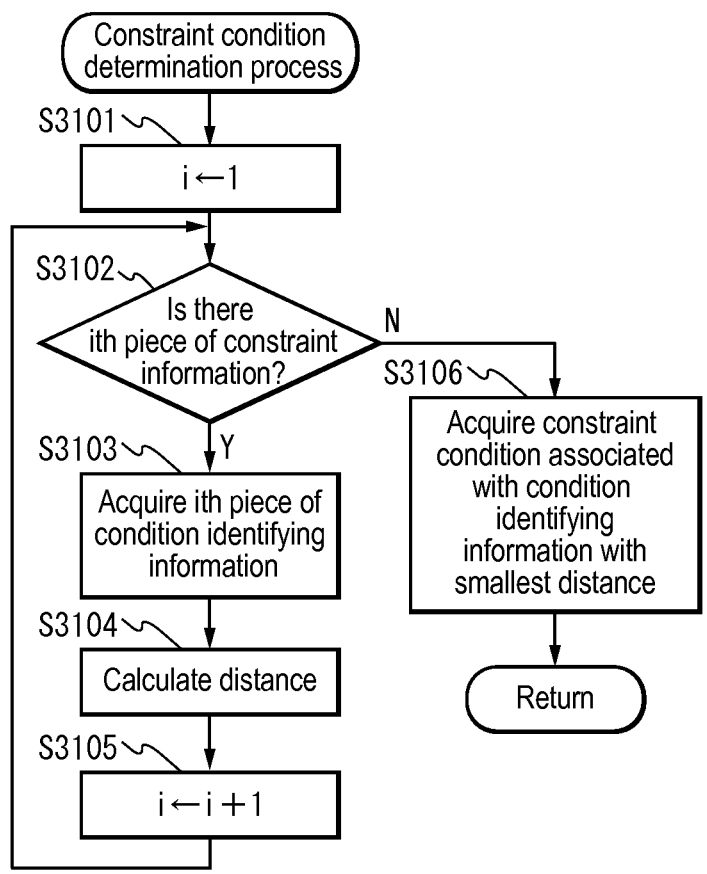
FIG. 31 is a flowchart illustrating a constraint condition determination process in this embodiment.

Next, the constraint condition determination process in step S3002 will be described with reference to the flowchart in FIG. 31.

(Step S3101) The constraint condition determining part 5072 substitutes 1 for a counter i.

(Step S3102) The constraint condition determining part 5072 judges whether or not there is an ith piece of constraint information in the constraint condition storage unit 502. If there is an ith piece of constraint information, the procedure advances to step S3103, and, if there is not an ith piece of constraint information, the procedure advances to step S3106.

(Step S3103) The constraint condition determining part 5072 acquires condition identifying information contained in the ith piece of constraint information, from the constraint condition storage unit 502.

(Step S3104) The constraint condition determining part 5072 calculates a distance between the feature vector acquired in step S3001 and the ith piece of condition identifying information. Then, the constraint condition determining part 5072 temporarily stores this distance in association with the ith piece of condition identifying information in a buffer.

(Step S3105) The constraint condition determining part 5072 increments the counter i by 1, and the procedure returns to step S3102.

(Step S3106) The constraint condition determining part 5072 acquires a constraint condition that is paired with the condition identifying information with the smallest distance from the feature vector acquired in step S3001, from the constraint condition storage unit 502. The procedure returns to the upper-level processing.

As described above, according to this embodiment, it is possible to output an extremely high quality image, by changing the constraint condition that is to be applied, according to the input image, and forming an output image that matches the constraint condition.

In this embodiment, the constraint condition determining part 5072 changes the constraint condition that is to be applied, according to the input image, and acquires the constraint condition. However, the constraint condition determining part 5072 may change the constraint condition that is to be applied, according to the output image. Furthermore, the constraint condition determining part 5072 may change the constraint condition that is to be applied, according to the input image and the output image.

Furthermore, in this embodiment, the image accepted by the image accepting unit 104 is divided by the dividing unit 105. However, the image accepted by the image accepting unit 104 does not have to be divided. In this case, the dividing unit 105 is not necessary in the image processing apparatus 5. The same is applied to other embodiments.

Embodiment 7

In this embodiment, an image processing apparatus 6 will be described that acquires an image whose load on the brain has been adjusted compared with that of an accepted image according to each purpose, using a look-up table. This embodiment is different from Embodiment 1 and the like mainly in that the look-up table that is to be applied dynamically changes according to the input image and the output image.

Figure 32:
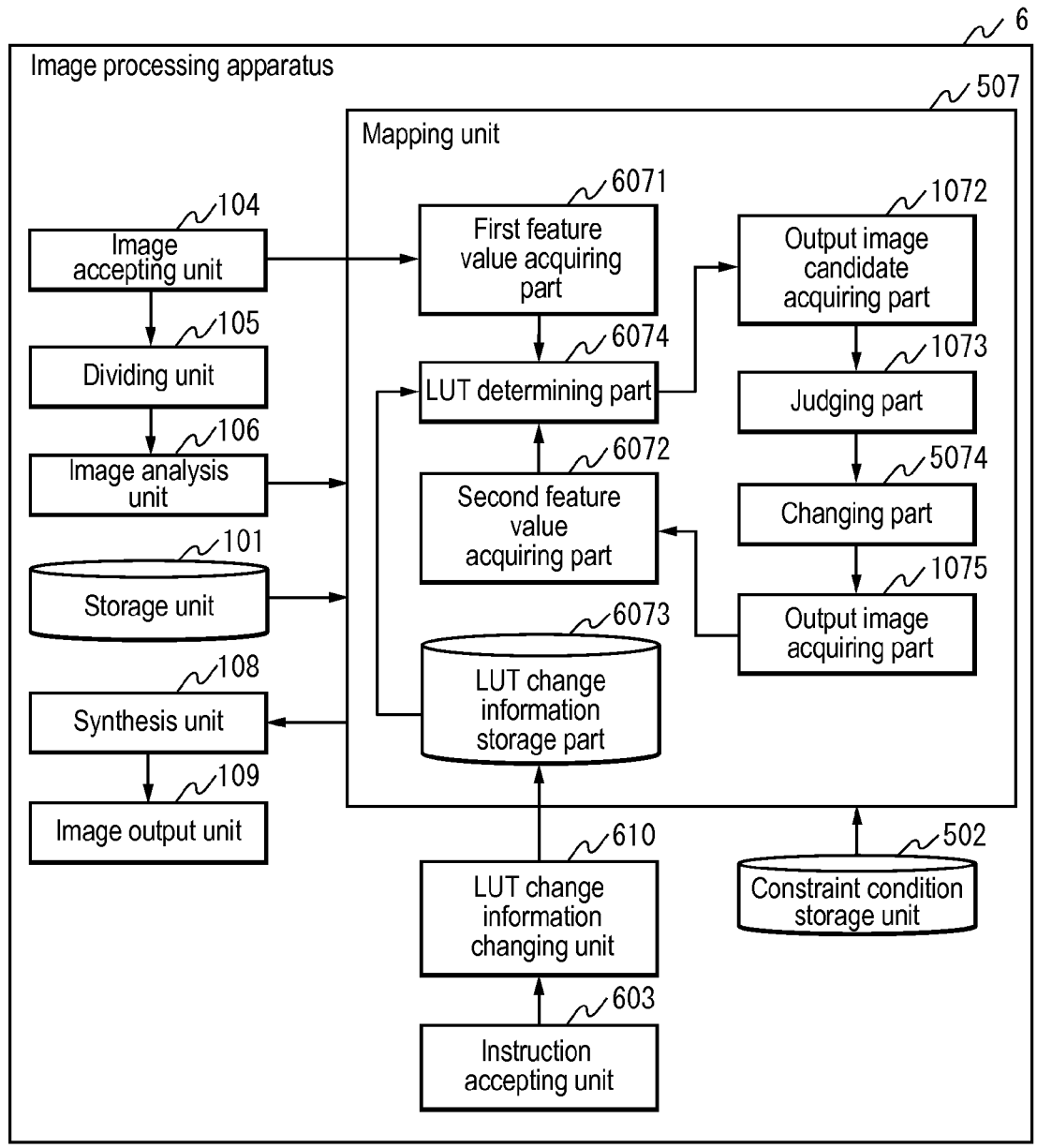
FIG. 32 is a block diagram of an image processing apparatus 6 in Embodiment 7.

FIG. 32 is a block diagram of the image processing apparatus 6 in this embodiment.

The image processing apparatus 6 includes the storage unit 101, the constraint condition storage unit 502, an instruction accepting unit 603, the image accepting unit 104, the dividing unit 105, the image analysis unit 106, a mapping unit 607, the synthesis unit 108, the image output unit 109, and an LUT change information changing unit 610.

Furthermore, the mapping unit 607 includes, for example, the output image candidate acquiring part 1072, the judging part 1073, a first feature value acquiring part 6071, a second feature value acquiring part 6072, an LUT change information storage part 6073, an LUT determining part 6074, the changing part 5074, and the output image acquiring part 1075.

In the storage unit 101, two or more look-up tables (hereinafter, referred to as "LUTs" as appropriate) are stored.

The instruction accepting unit 603 accepts an instruction to change LUT change information (described later), from the user. The instruction is, for example, an instruction to change the amount of stimuli received by the user from the image.

The first feature value acquiring part 6071 forming the mapping unit 607 acquires a feature vector of the image accepted by the image accepting unit 104. The first feature value acquiring part 6071 performs an operation similar to that performed by the feature value acquiring part 5071. Note that the feature vector acquired by the first feature value acquiring part 6071 is referred to as a first feature vector.

The second feature value acquiring part 6072 acquires a feature vector of the output image acquired by the output image acquiring part 1075. The second feature value acquiring part 6072 performs an operation that is similar to that performed by the first feature value acquiring part 6071 except that the constituent element from which the information is acquired is different between the first feature value acquiring part 6071 and the second feature value acquiring part 6072. In this example, all of the one or more feature values acquired by the first feature value acquiring part 6071 and the one or more feature values acquired by the second feature value acquiring part 6072 may be the same feature values, these feature values may partially include the same feature values, or all of these feature values may be totally different from each other. Note that the feature vector acquired by the second feature value acquiring part 6072 is referred to as a second feature vector.

In the LUT change information storage part 6073, LUT change information, which is information for changing the LUT that is used by the output image candidate acquiring part 1072 for acquiring a candidate for an output image, is stored. The LUT change information is, for example, a pair of a first feature vector and a type identifier for identifying a look-up table. Furthermore, the LUT change information may be, for example, a pair of a second feature vector and a type identifier. Furthermore, the LUT change information may be, for example, a set of a first feature vector, a second feature vector, and a type identifier. Furthermore, the LUT change information is, for example, a set of a first feature vector, two or more type identifiers, and two or more proportions associated with the respective type identifiers. Furthermore, the LUT change information may be, for example, a set of a second feature vector, two or more type identifiers, and two or more proportions associated with the respective type identifiers. Furthermore, the LUT change information may be, for example, a set of a first feature vector, a second feature vector, two or more type identifiers, and two or more proportions associated with the respective type identifiers. Typically, in the LUT change information storage part 6073, two or more pieces of LUT change information are stored. Furthermore, the proportion refers to a proportion between two or more LUTs in the case where the LUTs are combined to form a new LUT.

FIG. 33 shows an example of the LUT change information management table stored in the LUT change information storage part 6073. In FIG. 33, the LUT change information management table has multiple pieces of LUT change information. The LUT change information has "ID", "first feature vector", "second feature vector", "LUT", and "proportion". The "LUT" refers to a type identifier. The "proportion" refers to information indicating proportions of LUTs to be combined to form a new LUT. Note that the "proportion" is not limited to a ratio, and any type of information is possible as long as it is information for forming a new LUT using multiple LUTs. The information for forming a new LUT is, for example, an operation expression in which elements for forming multiple LUTs are taken as parameters. The elements for forming LUTs refer to, for example, filtering factors or elements of feature vectors.

The LUT determining part 6074 determines the LUT that is to be used by the output image candidate acquiring part 1072, using the LUT change information in the LUT change information storage part 6073. More specifically, the LUT determining part 6074 determines the LUT that is to be used by the output image candidate acquiring part 1072, by applying the first feature vector, the second feature vector, or the first feature vector and the second feature vector, to the LUT change information. Furthermore, the LUT determining part 6074 may construct an LUT by applying the first feature vector, the second feature vector, or the first feature vector and the second feature vector, to the LUT change information.

Hereinafter, the operation of the LUT determining part 6074 in the case where the LUT change information management table in FIG. 33 is stored in the LUT change information storage part 6073 will be described. The LUT determining part 6074 calculates a distance between the first feature vector acquired by the first feature value acquiring part 6071 and the first feature vector in each record in the LUT change information management table. Next, the LUT determining part 6074 calculates a distance between the second feature vector acquired by the second feature value acquiring part 6072 and the second feature vector in each record in the LUT change information management table. Then, the LUT determining part 6074, for example, acquires the sum of the two distances for each record in the LUT change information management table. Next, the LUT determining part 6074 determines a record with the smallest sum of the two distances. Next, the LUT determining part 6074 acquires the "LUT" attribute value contained in the record determined as having the smallest sum or the "LUT" and "proportion" attribute values contained in the record determined as having the smallest sum. If the "LUT" attribute value contained in the record determined as having the smallest sum indicates only one type identifier, the LUT determining part 6074 determines the LUT identified with the type identifier, as the LUT that is to be used by the output image candidate acquiring part 1072. On the other hand, if the "LUT" attribute value contained in the record determined as having the smallest sum indicates two or more type identifiers, the LUT determining part 6074 acquires a pair of each of the two or more type identifiers and the "proportion" attribute values (hereinafter, also referred to simply as "proportions"), and forms a new LUT by combining the LUTs identified with the two or more type identifiers so as to match the proportions.

The LUT change information changing unit 610 changes the LUT change information according to the instruction accepted by the instruction accepting unit 603. Furthermore, the LUT change information changing unit 610 may automatically change the LUT change information. That is to say, the LUT change information changing unit 610 may automatically change the LUT change information, for example, according to user's attributes (age, sex, address, etc.), information superimposed on broadcast (information contained in EPGs, etc.), time, time zone, and external sensor information (e.g., brightness and temperature of the room in which the viewer is present, etc.). In this case, the LUT change information changing unit 610 holds in advance information on how the LUT change information is to be changed according to user's attributes and the like. Furthermore, in the case of using external sensor information, the constraint condition changing unit 510 acquires information (brightness and temperature of the room, etc.) from sensors (not shown).

The instruction accepting unit 603 may be realized by a device driver for an input part such as a keyboard, or control software for a menu screen, for example.

The mapping unit 607, the LUT change information changing unit 610, the first feature value acquiring part 6071, the second feature value acquiring part 6072, and the LUT determining part 6074 may be realized typically by an MPU, a memory, or the like. Typically, the processing procedure of the mapping unit 607 and the like is realized by software, and the software is stored in a storage medium such as a ROM. Note that the processing procedure may be realized also by hardware (a dedicated circuit).

The LUT change information storage part 6073 is preferably a non-volatile storage medium, but may be realized also by a volatile storage medium. There is no limitation on the procedure in which the LUT change information is stored in the LUT change information storage part 6073. For example, the LUT change information may be stored in the LUT change information storage part 6073 via a storage medium, the LUT change information transmitted via a communication line or the like may be stored in the LUT change information storage part 6073, or the LUT change information input via an input device may be stored in the LUT change information storage part 6073.

Figure 34:
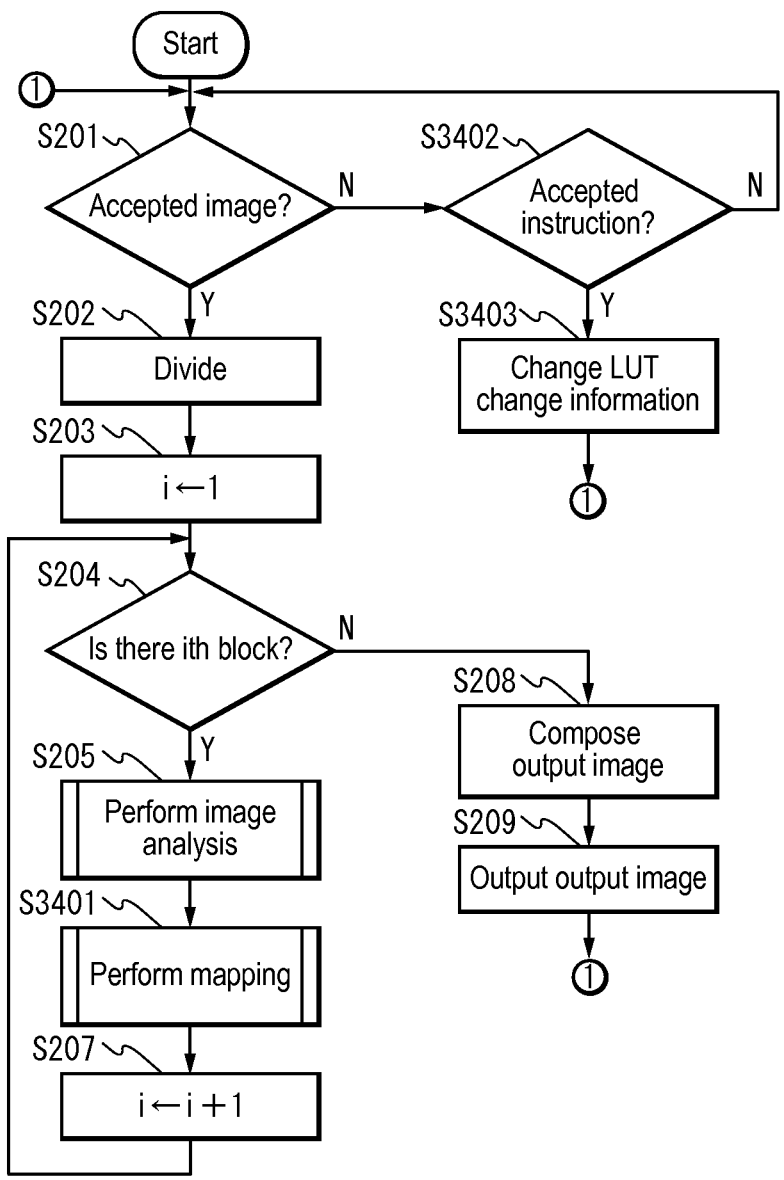
FIG. 34 is a flowchart illustrating the operation of the image processing apparatus 6 in this embodiment.

Next, the operation of the image processing apparatus 6 will be described with reference to the flowchart in FIG. 34. Hereinafter, the description of the flowchart in FIG. 34 will be given regarding the steps different from those in the flowchart in FIG. 2.

(Step S3401) The mapping unit 607 performs a mapping process. The mapping process will be described with reference to the flowchart in FIG. 35.

(Step S3402) It is judged whether or not an instruction from the user has been accepted by the instruction accepting unit 603. If an instruction from the user has been accepted, the procedure advances to step S3403, and, if an instruction from the user has not been accepted, the procedure returns to step S201.

(Step S3403) The LUT change information changing unit 610 changes the LUT change information according to the instruction accepted by the instruction accepting unit 503.

Figure 35:
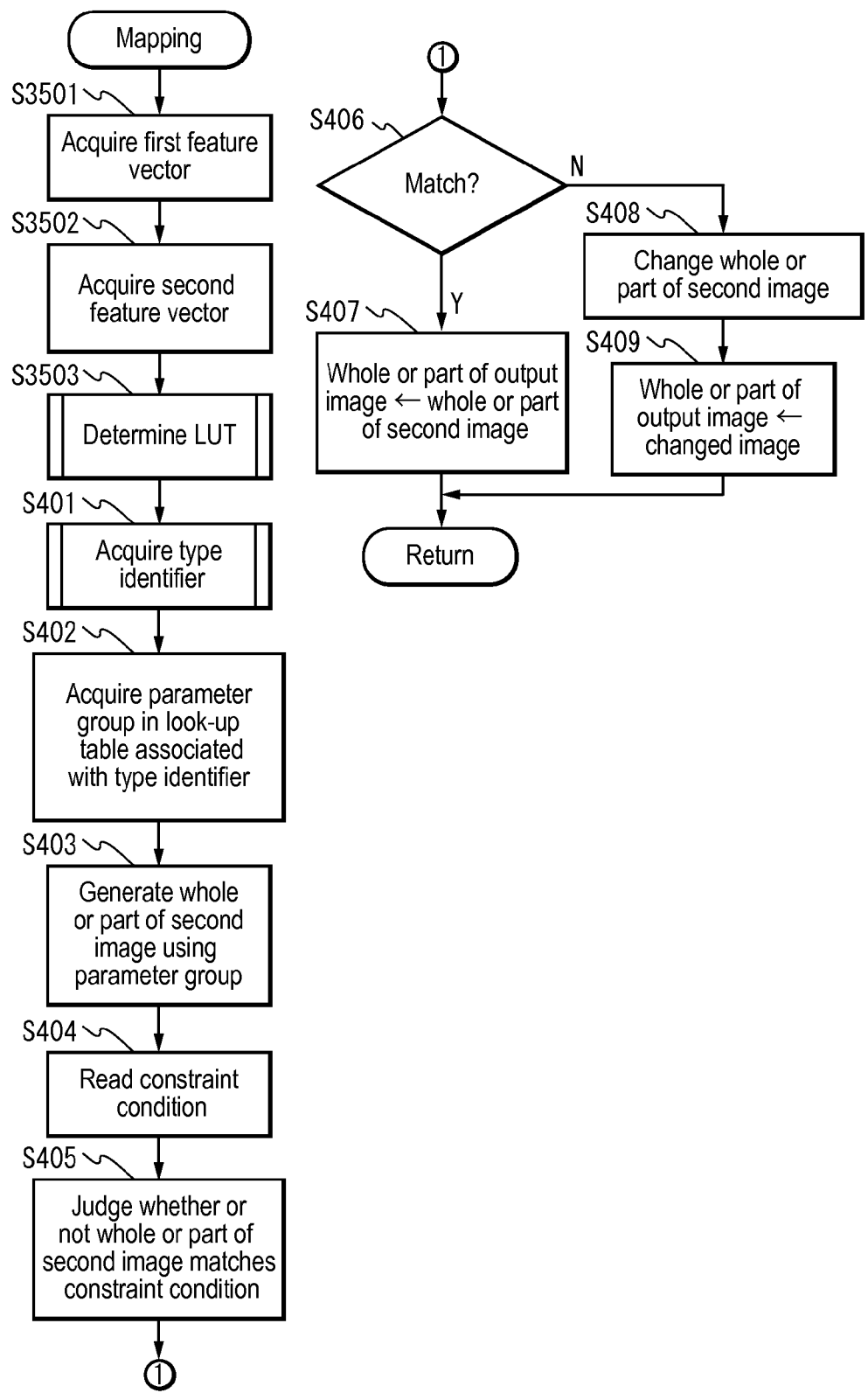
FIG. 35 is a flowchart illustrating a mapping process in this embodiment.

Next, the mapping process in step S3401 will be described with reference to the flowchart in FIG. 35. Hereinafter, the description of the flowchart in FIG. 35 will be given regarding the steps different from those in the flowchart in FIG. 4.

(Step S3501) The first feature value acquiring part 6071 of the mapping unit 607 acquires a first feature vector from the input image accepted by the image accepting unit 104.

(Step S3502) The second feature value acquiring part 6072 acquires a second feature vector from the output image acquired by the output image acquiring part 1075. Herein, the output image from which the second feature vector is acquired is typically an output image that was output immediately before.

(Step S3503) The LUT determining part 6074 determines an LUT, using the first feature vector acquired in step S3501 and the second feature vector acquired in step S3502. This LUT determination process will be described with reference to the flowchart in FIG. 36.

Figure 36:
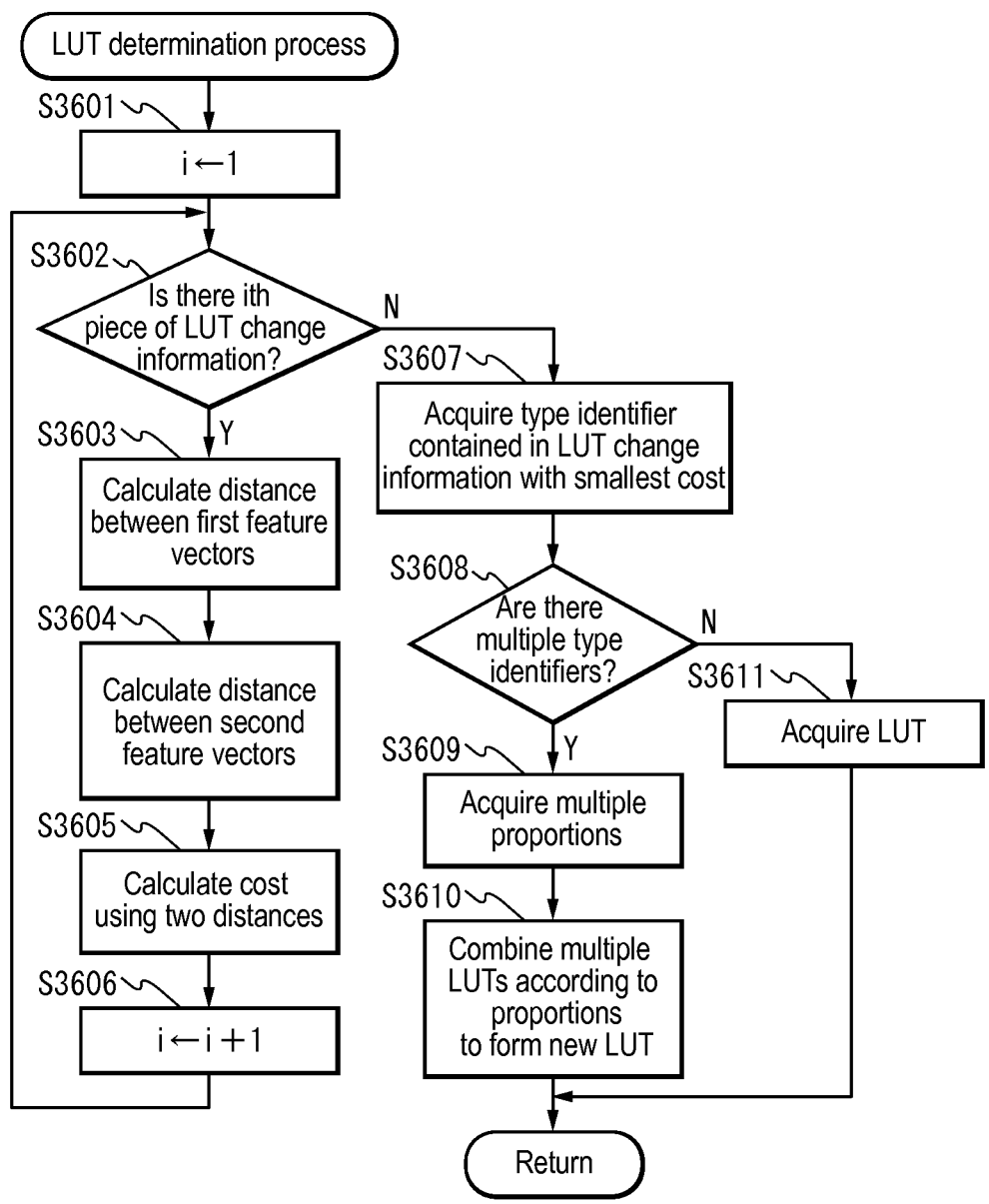
FIG. 36 is a flowchart illustrating an LUT determination process in this embodiment.

Next, the LUT determination process in step S3503 will be described with reference to the flowchart in FIG. 36.

(Step S3601) The LUT determining part 6074 substitutes 1 for a counter i.

(Step S3602) The LUT determining part 6074 judges whether or not there is an ith piece of LUT change information. If there is an ith piece of LUT change information, the procedure advances to step S3603 and, if there is not an ith piece of LUT change information, the procedure advances to step S3607.

(Step S3603) The LUT determining part 6074 acquires a first feature vector of the ith piece of LUT change information. Then, the LUT determining part 6074 calculates a distance (d1) between the acquired first feature vector and the first feature vector acquired in step S3501.

(Step S3604) The LUT determining part 6074 acquires a second feature vector of the ith piece of LUT change information. Then, the LUT determining part 6074 calculates a distance (d2) between the acquired second feature vector and the second feature vector acquired in step S3502.

(Step S3605) The LUT determining part 6074 substitutes the distance (d1) calculated in step S3603 and the distance (d2) calculated in step S3604 for a calculation formula, thereby executing the calculation formula. Thus, the LUT determining part 6074 acquires a cost (C) of the ith piece of LUT change information. Then, the LUT determining part 6074 at least temporarily stores the cost (C) in association with the ith piece of LUT change information. Note that the calculation formula is a calculation formula in which the two distances are taken as parameters, and is a function in which distances are taken as parameters. In this example, such a function is typically an increasing function in which distances are taken as parameters. The calculation formula is, for example, "C=a1×d1+(1−a1)×d2". Here, a1 is, for example, 0.5, 0.8, or the like.

(Step S3606) The LUT determining part 6074 increments the counter i by 1. The procedure returns to step S3602.

(Step S3607) The LUT determining part 6074 acquires one or more type identifiers contained in the LUT change information with the smallest cost calculated in step S3605.

(Step S3608) The LUT determining part 6074 judges whether or not there are multiple type identifiers acquired in step S3607. If there are multiple type identifiers, the procedure advances to step S3609, and, if there is only one type identifier, the procedure advances to step S3611.

(Step S3609) The LUT determining part 6074 acquires the multiple proportions contained in the LUT change information with the smallest cost from the LUT change information storage part 6073 in association with the type identifiers.

(Step S3610) The LUT determining part 6074 acquires LUTs associated with the multiple type identifiers, from the storage unit 101. Then, the LUT determining part 6074 combines the acquired LUTs according to the proportions acquired in step S3609, thereby forming a new LUT. This new LUT is an LUT that is to be used by the output image candidate acquiring part 1072.

In this example, combining LUTs refers to, for example, the following process. For example, it is assumed that the association information forming LUTs includes a feature vector and a parameter group (e.g., a group of filtering factors). Furthermore, it is assumed that the multiple LUTs have the same feature vector. Then, the LUT determining part 6074 acquires parameter groups of the multiple LUTs associated with the same feature vector, and combines the parameters forming the parameter groups according to the proportions. For example, it is assumed that an LUT "A" has association information including a feature vector V1 and a parameter group (4, 10, 7, . . . ). Furthermore, it is assumed that an LUT "B" has association information including a feature vector V1 and a parameter group (10, 8, 17, . . . ). Furthermore, it is assumed that the proportion associated with the LUT "A" is "a1", and the proportion associated with the LUT "B" is "1−a1". In this case, the LUT determining part 6074 acquires a parameter group (4×a1+10×(1−a1), 10×a1+8×(1−a1), 7×a1+17×(1−a1), . . . ). Such a process is performed on all pieces of association information.

(Step S3611) The LUT determining part 6074 acquires an LUT identified with the type identifier contained in the LUT change information with the smallest cost, from the LUT change information storage part 6073. This LUT is an LUT that is to be used by the output image candidate acquiring part 1072.

As described above, according to this embodiment, it is possible to output an extremely high quality image, by changing the look-up table that is to be applied, according to the input image, the output image, or the input image and the output image, and forming an output image.

Embodiment 8

In this embodiment, an image learning apparatus 7 will be described. The image learning apparatus 7 is an apparatus that acquires a first image and a second image that are to be used by the look-up table acquiring apparatus 3 for constructing a look-up table. Note that the image learning apparatus 7 described here is an apparatus mainly for a look-up table that is to be used by an image processing apparatus for improving the entertaining level.

Figure 37:
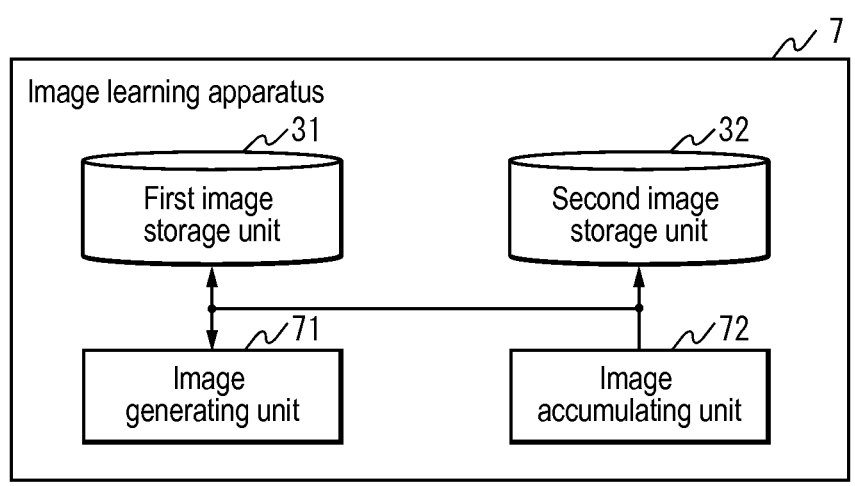
FIG. 37 is a block diagram of an image learning apparatus 7 in Embodiment 8.

FIG. 37 is a block diagram of the image learning apparatus 7. The image learning apparatus 7 includes the first image storage unit 31, the second image storage unit 32, an image generating unit 71, and an image accumulating unit 72. Note that the first image storage unit 31 and the second image storage unit 32 form apparatuses such as the look-up table acquiring apparatus 3.

In the first image storage unit 31, one or more first images can be stored. In the first image storage unit 31, a first image that is a moving image may be stored.

In the second image storage unit 32, one or more second images can be stored. In the second image storage unit 32, a second image that is a moving image may be stored.

The image generating unit 71 generates a second image from the first image stored in the first image storage unit 31. Furthermore, the image generating unit 71 may generate a first image from the second image stored in the second image storage unit 32.

For example, the image generating unit 71 generates a second image or a first image as follows.

(1) Generation of Second Image into which White Flash Image has been Inserted

The image generating unit 71 reads a first image that is a moving image, from the first image storage unit 31. Next, the image generating unit 71 inserts a frame with a white image into a feely selected frame position of the first image, thereby acquiring a second image.

(2) Generation of Second Image into which Flash Image with Increased Brightness has been Inserted The image generating unit 71 reads a first image that is a moving image, from the first image storage unit 31. Next, the image generating unit 71 increases the brightness of a frame at a feely selected frame position of the first image, thereby acquiring a second image.

(3) Generation of Second Image into which High-Contrast Flash Image has been Inserted The image generating unit 71 reads a first image that is a moving image, from the first image storage unit 31. Next, the image generating unit 71 inserts a high-contrast image into a feely selected frame position of the first image, thereby acquiring a second image.

(4) Generation of Second Image in which Image has been Enhanced Non-Uniformly on Screen The image generating unit 71 reads a first image that is a moving image, from the first image storage unit 31. Next, the image generating unit 71 performs edge enhancement, contrast change, or the like on a frame at a freely selected position of the first image, thereby acquiring a second image. The processing such as edge enhancement or contrast change is a known art, and, thus, a description thereof has been omitted.

(5) Film-Like Video Processing

The image generating unit 71 reads a second image that is a film-source moving image, from the second image storage unit 32. Next, the second image is converted to form a first image.

The image accumulating unit 72 accumulates the second image generated by the image generating unit 71 in the second image storage unit 32. Furthermore, the image accumulating unit 72 accumulates the first image generated by the image generating unit 71 in the first image storage unit 31.

Next, the mapping process of the image processing apparatus will be described. The mapping process is performed by the mapping unit of the image processing apparatus.

If the second image is a flash image generated in any one of (1) to (3) above, the mapping unit 107 acquires association information associated with a feature vector of the input image (e.g., vector having a brightness distribution, a full-screen movement amount, and the like as an element), from the LUT, using the feature vector. Then, the mapping unit 107 inserts a special frame using the acquired association information. Note that the feature vector of the input image is acquired by the image analysis unit 106. Furthermore, the mapping unit 107 may insert the special frame, if the feature vector of the input image satisfies a predetermined condition (which may be the association information). The special frame refers to a frame with a flash image.

Furthermore, if the second image is a non-uniformly enhanced image generated in (4) above, the mapping unit 107 performs the above-described processing, so that the enhancement method is not uniform throughout the screen, e.g., different enhancement methods are automatically selected according to wave shapes.

Furthermore, if the second image is a film-like image generated in (5) above, the mapping unit 107 performs the above-described processing, so that an output image converted to a film-like image can be output.

Note that, for example, a first image and a second image acquired by capturing images of the same object in different illumination environments may be respectively accumulated in the first image storage unit 31 and the second image storage unit 32. The different illumination environments refer to, for example, environments that are different in the intensity of illumination according to an object whose image is to be captured, as described above. Furthermore, the different illumination environments refer to, for example, environments that are different in the position of the light source.

In this case, the mapping unit 107 performs the above-described processing, so that images having an improved appearance or having totally different surface reflection characteristics can be obtained. For example, an image of a new stringed instrument in an input image is output as an image of a stringed instrument having an austerely elegant varnish color like an old instrument.

Figure 38:
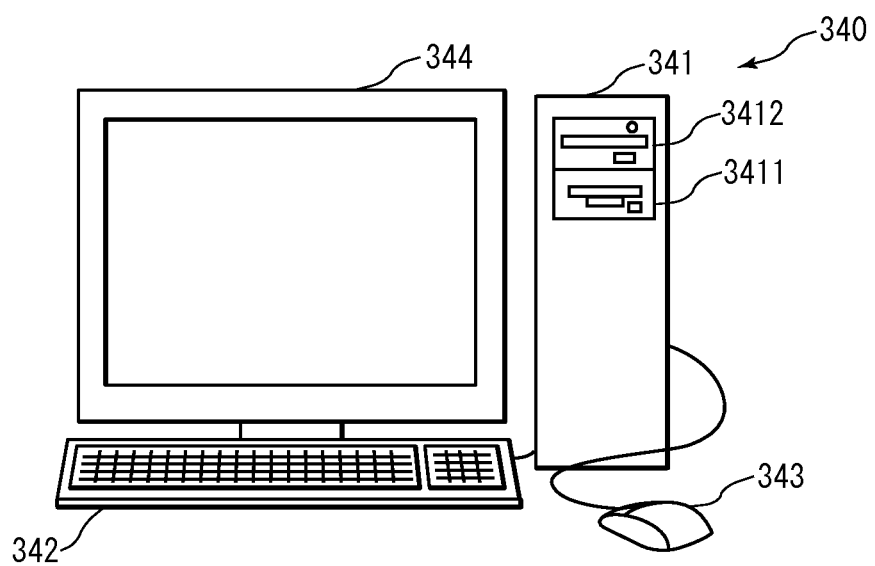
FIG. 38 is a schematic view of a computer system in this embodiment.
Figure 39:
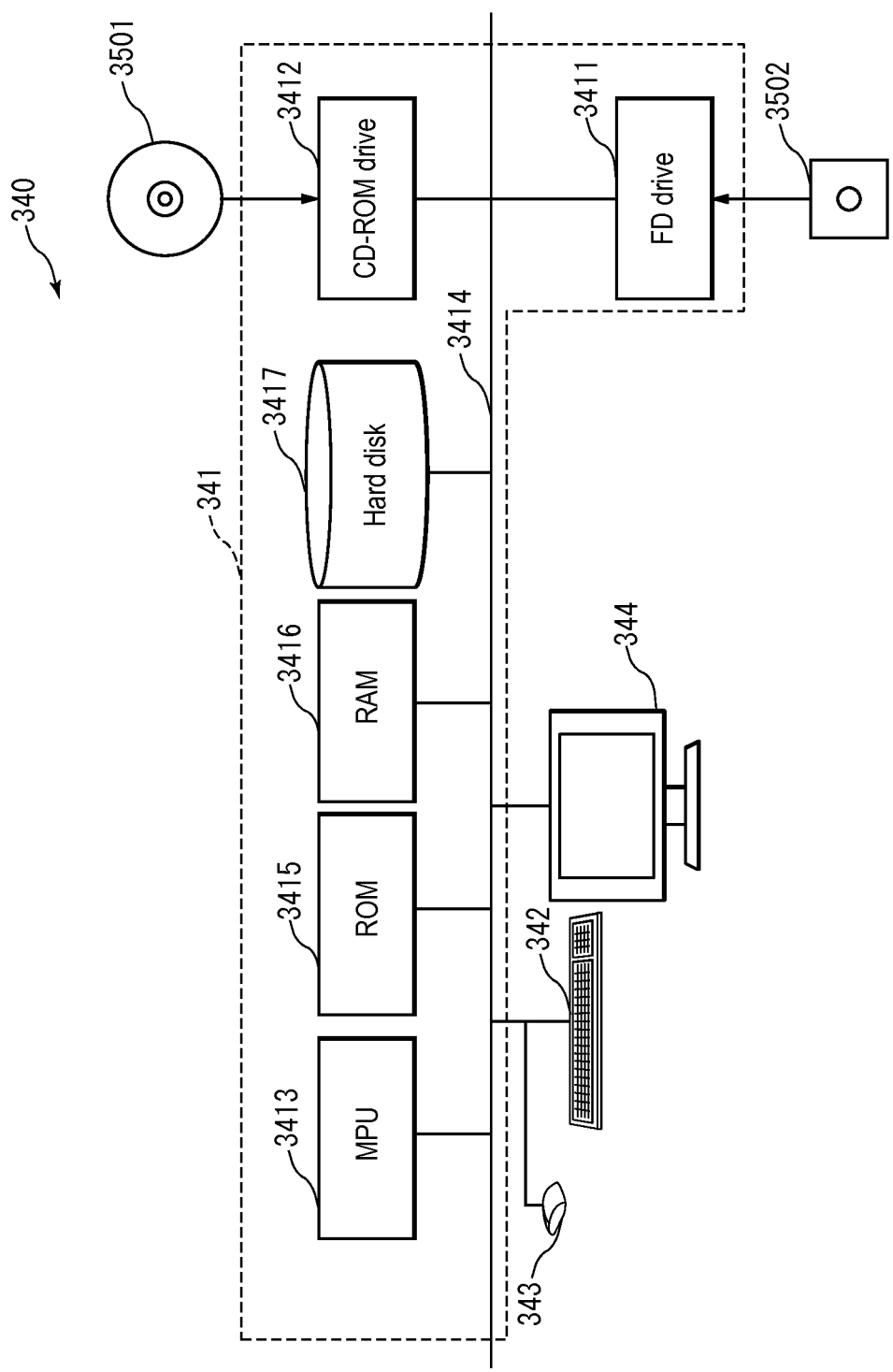
FIG. 39 is a block diagram of the computer system in this embodiment.

FIG. 38 shows the external appearance of a computer that executes the programs described in this specification to realize the look-up table acquiring apparatus and the like in the foregoing embodiments. The foregoing embodiments may be realized using computer hardware and a computer program executed thereon. FIG. 38 is a schematic view of a computer system 340. FIG. 39 is a block diagram of the computer system 340.

In FIG. 38, the computer system 340 includes a computer 341 including an FD drive and a CD-ROM drive, a keyboard 342, a mouse 343, and a monitor 344.

In FIG. 39, the computer 341 includes not only the FD drive 3411 and the CD-ROM drive 3412, but also an MPU 3413, a bus 3414 that is connected to the CD-ROM drive 3412 and the FD drive 3411, a RAM 3416 in which a command of an application program is temporarily stored and a temporary storage area is to be provided, and that is connected to a ROM 3415 in which a program such as a startup program is to be stored, and a hard disk 3417 in which an application program, a system program, and data are to be stored. Although not shown, the computer 341 may further include a network card that provides connection to a LAN.

The program for causing the computer system 340 to execute the functions of the look-up table acquiring apparatus and the like in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the look-up table acquiring apparatus and the like in the foregoing embodiments. The program may only include a command portion to call an appropriate function (module) in a controlled mode and obtain the desired results. The manner in which the computer system 340 operates is well known, and, thus, a detailed description thereof has been omitted.

Furthermore, the computer that executes this program may be a single computer, or may be multiple computers. More specifically, centralized processing may be performed, or distributed processing may be performed.

Furthermore, in the foregoing embodiments, each process (each function) may be realized as an integrated process using a single apparatus (system), or may be realized as a distributed process using multiple apparatuses.

It will be appreciated that the present invention is not limited to the embodiments set forth herein, and various modifications are possible within the scope of the present invention.

INDUSTRIAL APPLICABILITY

As described above, the image processing apparatus according to the present invention has an effect that this apparatus can output an image whose load on the brain has been adjusted, and, thus, this apparatus is useful as a television and the like.

LIST OF REFERENCE NUMERALS

1, 2, 4, 5, 6 Image processing apparatus
3 Look-up table acquiring apparatus
7 Image learning apparatus
31 First image storage unit
32 Second image storage unit
33 Second image information candidate group storage unit
34 Candidate output unit
35 Second image accumulating unit
36 First image-related information acquiring unit
37 Second image-related information acquiring unit
38 Look-up table constructing unit
39 Look-up table accumulating unit
71 Image generating unit
72 Image accumulating unit
101 Storage unit
102, 502 Constraint condition storage unit
103, 503, 603 Instruction accepting unit
104 Image accepting unit
105 Dividing unit
106 Image analysis unit
107, 507, 607 Mapping unit
108 Synthesis unit
109 Image output unit
110 Look-up table update unit
510 Constraint condition changing unit
610 LUT change information changing unit
1071 Type identifier acquiring part
1072 Output image candidate acquiring part
1073 Judging part
1074, 5074 Changing part
1075 Output image acquiring part
5071 Feature value acquiring part
5072 Constraint condition determining part
6071 First feature value acquiring part
6072 Second feature value acquiring part
6073 LUT change information storage part
6074 LUT determining part

The invention claimed is:

1. An image processing apparatus, comprising:
   a storage unit that stores a look-up table having at least two pieces of association information for associating part of at least one first image with part of at least one second image, which is an image whose load on the brain has been adjusted compared with that of the first image and which is an image of the same object as the first image;
   an image accepting unit that accepts a video;
   a dividing unit that spatially, temporally, or spatially and temporally divides the video accepted by the image accepting unit into at least two portions, thereby acquiring at least two first spatiotemporal blocks;
   a mapping unit that acquires, for each of the at least two first spatiotemporal blocks acquired by the dividing unit, an associated second spatiotemporal block, using association information from among the at least two pieces of association information; and
   an image output unit that outputs at least one output image, which is the whole of the at least two second spatiotemporal blocks acquired by the mapping unit or a group of part of the at least two second spatiotemporal blocks acquired by the mapping unit.

2. The image processing apparatus according to claim 1, wherein
   the association information for associating the part of the at least one first image with the part of at least one second image, which is an image whose load on the brain at the time of watching the image is smaller than that of the first image load on the brain at the time of watching the image is smaller than that of the first image and which is an image of the same object as the first image.

3. The image processing apparatus according to claim 2, wherein
   the first image refers to an image of one object acquired in one environment,
   the second image refers to an image of the one object acquired in another environment, and
   the another environment refers to one of
   an environment in which the light intensity of illumination is larger than that in the one environment,
   an environment in which a light source is positioned such that the shadow of an object in the image is expressed more clearly than in the one environment,
   an environment in which a light source is positioned such that the sense of three dimensions of an object in the image is expressed more clearly than in the one environment, an environment in which a camera is positioned such that the sense of three dimensions of an object in the image is expressed more clearly than in the one environment, an environment in which the color of illumination is different from that in the one environment, an environment in which the weather is different from that in the one environment, an environment in which the temperature or the humidity is different from that in the one environment, an environment in which the depth of field is different from that in the one environment, and an environment in which the shutter speed is different from that in the one environment.

4. The image processing apparatus according to claim 1, wherein the association information for associating the part of the at least one first image with the part of the at least one second image, which is an image whose load on the brain at the time of watching the image is larger than that of the first image load on the brain at the time of watching the image is smaller than that of the first image and which is an image of the same object as the first image.

5. The image processing apparatus according to claim 4, wherein the second image is one of an image whose entertaining level is higher than that of the first image, an image acquired by deforming the first image, an image acquired by capturing an image of a painting illustrating one object, whereas the first image is acquired by capturing an image of the one object, and a CG image of the first image.

6. The image processing apparatus according to claim 1, wherein the look-up table has at least two pieces of association information, the image processing apparatus further comprises an image analysis unit that determines the whole or part of a first image associated with the whole or part of the at least one image accepted by the image accepting unit, and the mapping unit acquires a second image associated with the whole or part of the first image determined by the image analysis unit, using the association information associated with the whole or part of the first image determined by the image analysis unit.

7. The image processing apparatus according to claim 6, wherein the whole or part of the first image is a first spatiotemporal block, which is part of the video that is accepted as input by the image accepting unit, and which is a group of at least one image, the whole or part of the second image is a second spatiotemporal block, which is part of video that is to be output to a screen, the image analysis unit determines, for each of the at least two first spatiotemporal blocks acquired by the dividing unit, the whole or part of a first image associated with each first spatiotemporal block, the at least two second spatiotemporal blocks are associated with the whole or part of the first image determined by the image analysis unit, using the association information associated with the whole or part of the first image determined by the image analysis unit, the image processing apparatus further comprises a compositing unit that arranges each of the at least two second spatiotemporal blocks acquired by the mapping unit at a temporal, spatial, or spatial and temporal position of the first spatiotemporal block associated with each of the at least two second spatiotemporal blocks, thereby generating an output image, and the image output unit outputs the output image generated by the compositing unit.

8. The image processing apparatus according to claim 7, wherein the image analysis unit analyzes the at least one image accepted by the image accepting unit or each of the at least two first spatiotemporal blocks acquired by the dividing unit, acquires at least one feature amount thereof, and determines the whole or part of a first image associated with the at least one feature amount.

9. The image processing apparatus according to claim 1, wherein the association information is information having at least one feature amount of the whole or part of a first image of one object acquired in one environment, and an arithmetic expression for generating the whole or part of a second image associated with the whole or part of the first image or a parameter group that is to be substituted for the arithmetic expression.

10. The image processing apparatus according to claim 1, further comprising:

an instruction accepting unit that accepts an instruction from a user; and a look-up table update unit that changes any of the at least two pieces of association information contained in the look-up table, according to the instruction.

11. The image processing apparatus according to claim 1, wherein the look-up table stored in the storage unit is a look-up table acquired by a look-up table acquiring apparatus that comprises:

a first image storage unit that stores at least one first image;

a second image storage unit that stores at least one second image, which is an image whose load on the brain has been adjusted compared with that of the first image and which is an image of the same object as the at least one first image, in association with each of the at least one first image;

a first image-related information acquiring unit that acquires at least one piece of first image-related information relating to the whole or part of the at least one first image stored in the first image storage unit, from the whole or part of the at least one first image;

a second image-related information acquiring unit that acquires at least one piece of second image-related information relating to the whole or part of the at least one second image stored in the second image storage unit, from the whole or part of the at least one second image; and a look-up table constructing unit that constructs a look-up table having one or at least two pieces of association information, which is information having the first image-related information acquired by the first image-related information acquiring unit and the second image-related information associated with the first image-related information and acquired by the second image-related information acquiring unit, and which is information indicating association between the whole or part of the at least one first image and the whole or part of the at least one second image.

12. The image processing apparatus according to claim 11, wherein
the association information is information containing first image-related information relating to the whole or part of the at least one first image, and second image-related information relating to the whole or part of the at least one second image and associated with the first image-related information.

13. The image processing apparatus according to claim 11, wherein
the association information has a feature amount vector associated with the whole or part of the at least one first image, and a conversion filter for converting the whole or part of the at least one first image into the whole or part of the at least one second image, and
the look-up table constructing unit forming the look-up table acquiring apparatus acquires a feature amount vector from the whole or part of the at least one first image, acquires a conversion filter for converting the whole or part of the at least one first image into the whole or part of the at least one second image, and constructs a look-up table having one or at least two pieces of association information having the feature amount vector and the conversion filter.

14. The image processing apparatus according to claim 11, wherein
the look-up table acquiring apparatus further comprises:
a second image information candidate group storage unit that stores at least one second image information candidate group, which is a group of at least two candidates for second image information, in association with each of the at least one first image, the second image information being information relating to the second image;
a candidate output unit that outputs the at least one second image information candidate group;
an instruction accepting unit that accepts an instruction to select at least one candidate for the second image information from among the at least two candidates for the second image information contained in the at least one second image information candidate group output by the candidate output unit; and
a second image accumulating unit that acquires at least one second image using at least one candidate for the second image information corresponding to the instruction accepted by the instruction accepting unit, and accumulates the at least one second image in association with the first image associated with the second image information candidate group in the second image storage unit.

15. An image processing method using a non-transitory computer-readable storage medium in which a look-up table having at least two pieces of association information for associating part of at least one first image with part of at least one second image, which is an image whose load on the brain has been adjusted compared with that of the first image and which is an image of the same object as the first image, is stored, and realized with an image accepting unit, a dividing unit, a mapping unit, and an image output unit, the image processing method comprising:
an image accepting step of the image accepting unit accepting a video;
a dividing step of the dividing unit that spatially, temporally, or spatially and temporally divides the video accepted by the image accepting unit into at least two portions, thereby acquiring at least two first spatiotemporal blocks;
a mapping step of the mapping unit that acquires, for each of the at least two first spatiotemporal blocks acquired in the dividing step, an associated second spatiotemporal block, using association information from among the one or at least two pieces of association information; and
an image output step of the image output unit outputting at least one output image, which is the whole of the at least two second spatiotemporal blocks acquired in the mapping step or a group of part of the at least two second spatiotemporal blocks acquired in the mapping step.

16. A non-transitory computer-readable storage medium in which a program is stored, and in which a look-up table having at least two pieces of association information for associating part of at least one first image with part of at least one second image, which is an image whose load on the brain has been adjusted compared with that of the first image and which is an image of the same object as the first image, is stored, the program causing a computer to function as:
an image accepting unit that accepts a video;
a dividing unit that spatially, temporally, or spatially and temporally divides the video accepted by the image accepting unit into at least two portions, thereby acquiring at least two first spatiotemporal blocks;
a mapping unit that acquires, for each of the at least two first spatiotemporal blocks acquired by the dividing unit, an associated second spatiotemporal block, using association information from among the at least two pieces of association information; and
an image output unit that outputs at least one output image, which is the whole of the at least two second spatiotemporal blocks acquired by the mapping unit or a group of part of the at least two second spatiotemporal blocks acquired by the mapping unit.

* * * * *